(12) United States Patent
Hamada et al.

(10) Patent No.: US 7,513,661 B2
(45) Date of Patent: Apr. 7, 2009

(54) BACKLIGHT UNIT AND LIQUID CRYSTAL DISPLAY DEVICE HAVING THE SAME

(75) Inventors: Tetsuya Hamada, Matsusaka (JP);
Toshihiro Suzuki, Hadano (JP); Masaru Ishiwa, Yokohama (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/023,311

(22) Filed: Jan. 31, 2008

(65) Prior Publication Data

US 2008/0129927 A1 Jun. 5, 2008

Related U.S. Application Data

(60) Division of application No. 11/562,181, filed on Nov. 21, 2006, which is a continuation of application No. PCT/JP2005/005952, filed on Mar. 29, 2005.

(30) Foreign Application Priority Data

| May 21, 2004 | (JP) | ............................. 2004-151963 |
| Nov. 5, 2004 | (JP) | ............................. 2004-322184 |
| Feb. 28, 2005 | (JP) | ............................. 2005-053978 |

(51) Int. Cl.
*F21V 29/00* (2006.01)
(52) U.S. Cl. .................. 362/373; 362/294; 362/632
(58) Field of Classification Search ......... 362/600–634, 362/330, 580, 547, 126, 218, 264, 294, 345, 362/373, 800, 231
See application file for complete search history.

(56) References Cited

U.S. PATENT DOCUMENTS

| 5,835,173 A | 11/1998 | Inbar et al. |
| 6,134,092 A | 10/2000 | Pelka et al. |
| 6,386,720 B1 | 5/2002 | Mochizuki |
| 6,697,130 B2 | 2/2004 | Weindorf et al. |
| 6,717,559 B2 | 4/2004 | Weindorf |
| 6,840,646 B2 | 1/2005 | Cornelissen et al. |

(Continued)

FOREIGN PATENT DOCUMENTS

DE 100 65 728 A1 9/2002

(Continued)

OTHER PUBLICATIONS

Hamada; "Backlight Unit and Liquid Crystal Display Device Having the Same"; U.S. Appl. No. 11/562,181, filed Nov. 21, 2006.

(Continued)

*Primary Examiner*—Bao Q Truong
(74) *Attorney, Agent, or Firm*—Keating & Bennett, LLP

(57) ABSTRACT

A backlight unit has a light source, a reflection sheet, a light guide plate, an air space, and a diffuser, wherein the reflection sheet, the light guide plate, the air space, and the diffuser are overlaid in this order. The light source is configured to arrange individual light sources having different spectra or different light emission quantities near an incident plane of the light guide plate, and on a plane facing the reflection sheet of the light guide plate, scatter dots are disposed which take light propagating through the light guide plate out of the reflection sheet side. The backlight unit and a liquid crystal display device including the same have excellent display quality.

49 Claims, 57 Drawing Sheets

U.S. PATENT DOCUMENTS

| | | |
|---|---|---|
| 6,930,737 B2 | 8/2005 | Weindorf et al. |
| 6,966,674 B2 * | 11/2005 | Tsai .......................... 362/294 |
| 7,001,035 B2 | 2/2006 | Kawakami |
| 7,193,248 B2 | 3/2007 | Weindorf et al. |
| 7,262,752 B2 | 8/2007 | Weindorf |
| 7,281,816 B2 * | 10/2007 | Suzuki ....................... 362/231 |
| 7,367,706 B2 * | 5/2008 | Ura ............................ 362/632 |
| 2002/0167016 A1 | 11/2002 | Hoelen et al. |
| 2003/0156233 A1 | 8/2003 | Ohsumi |
| 2005/0141244 A1 | 6/2005 | Hamada et al. |

OTHER PUBLICATIONS

Official communication issued in counterpart German Application No. 11 2005 001 170.4, mailed on Nov. 19, 2007.

* cited by examiner

24

25

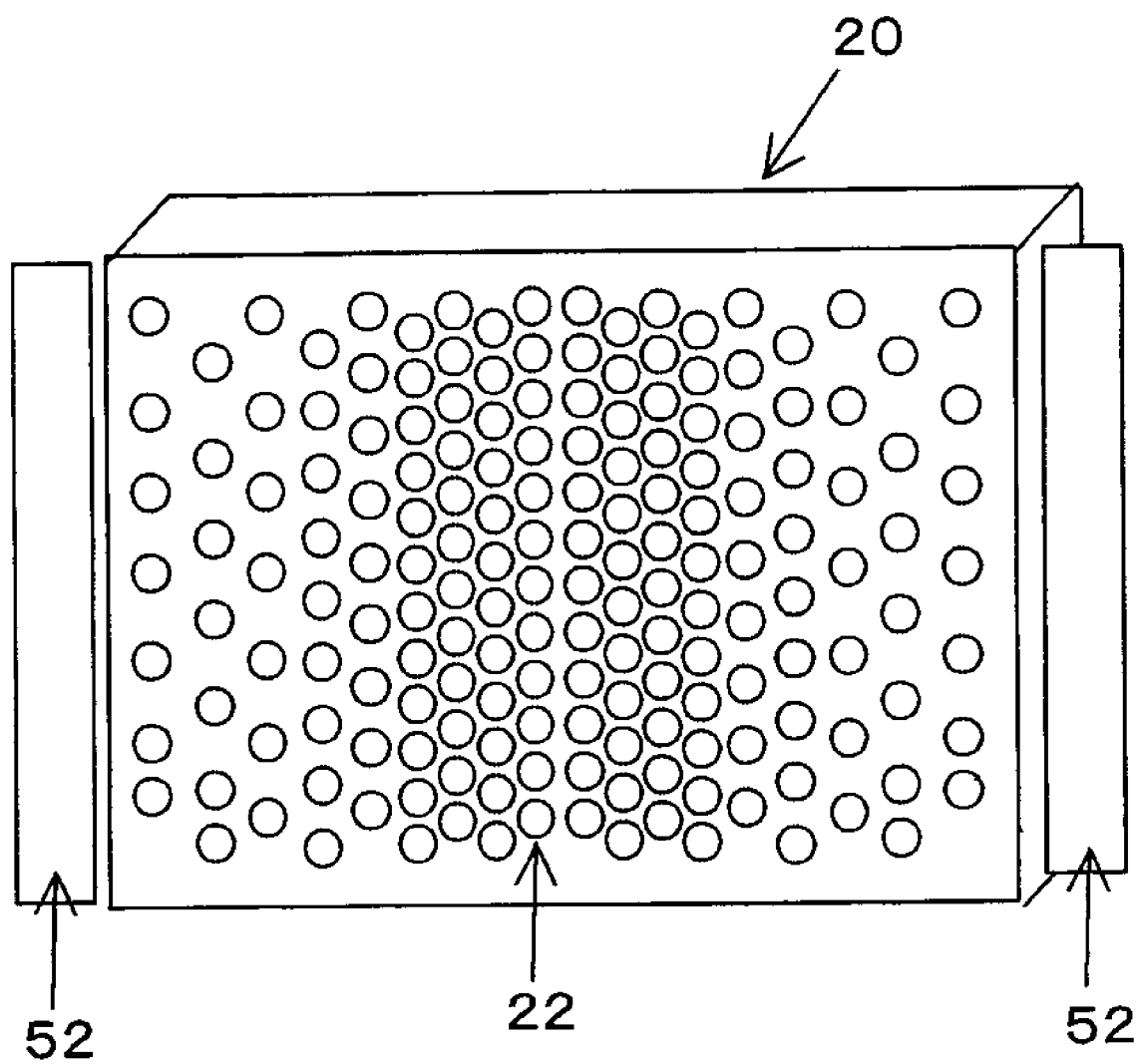

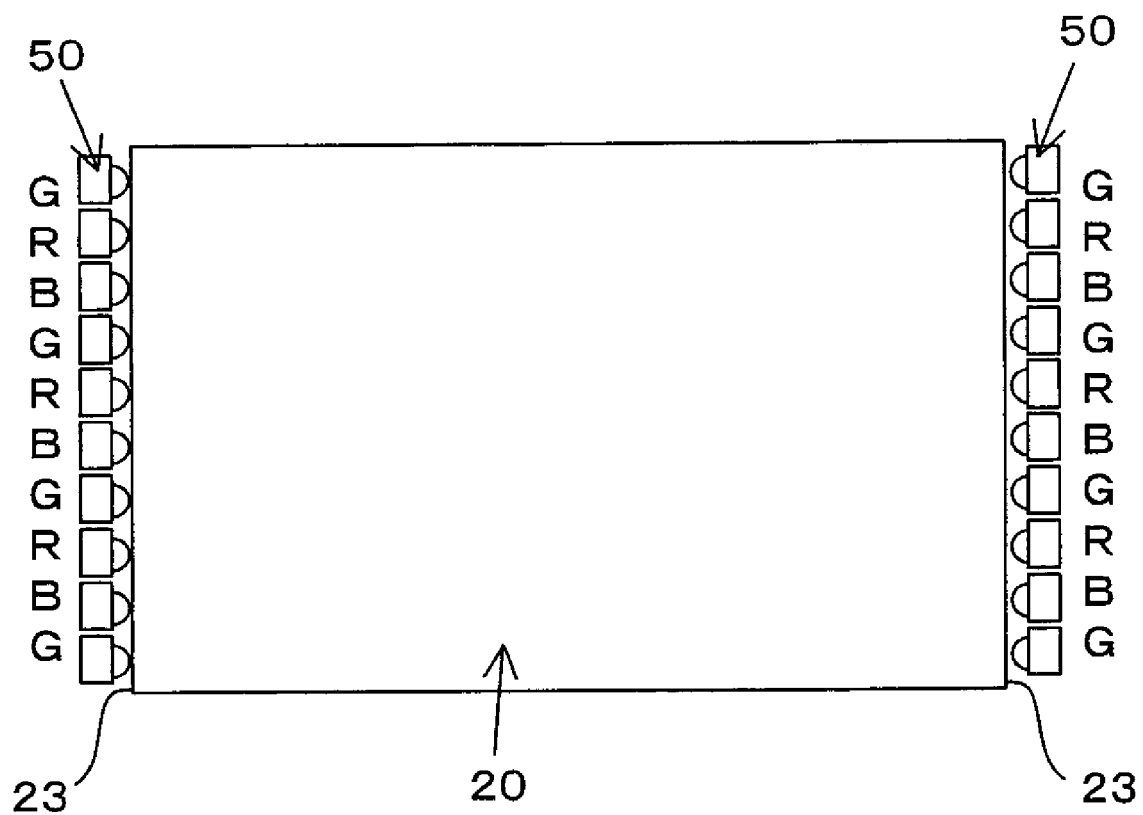

FIG.25A
FIG.25B
FIG.25C
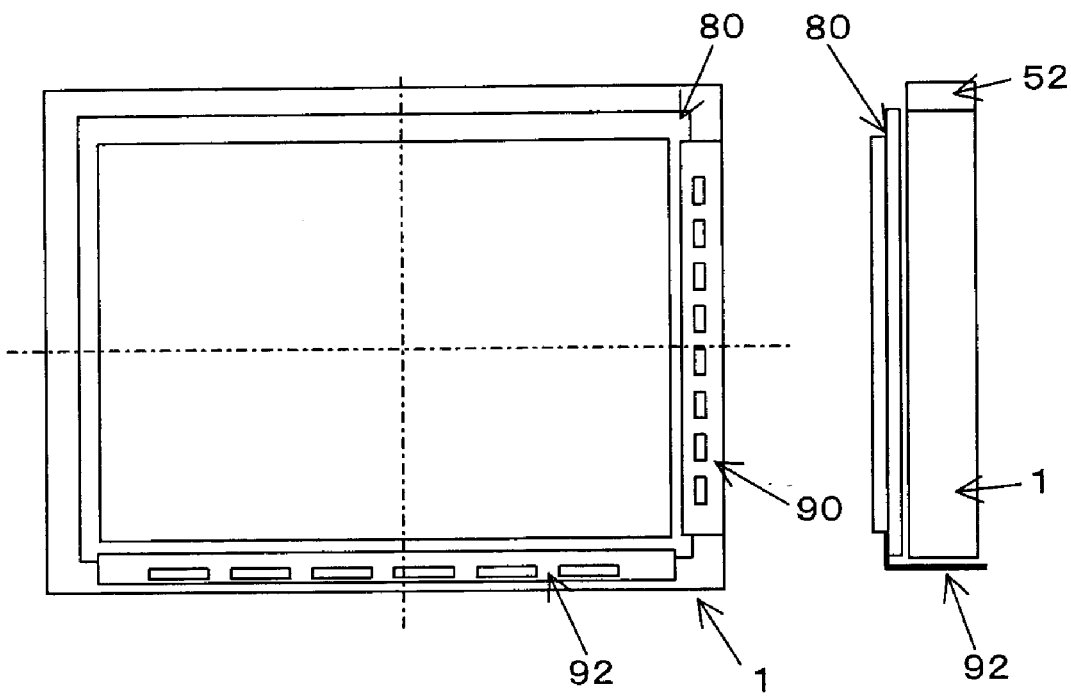
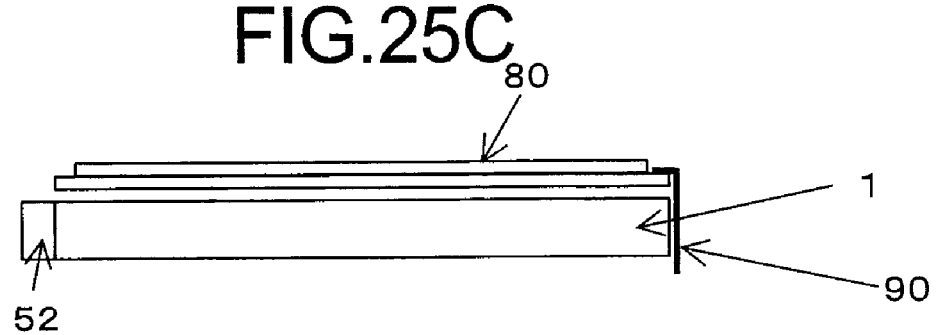

FIG.39A
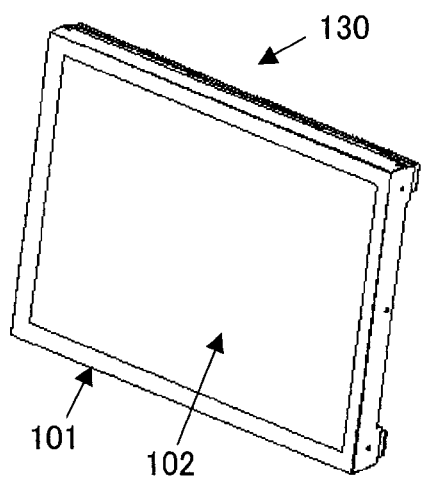
FIG.39B
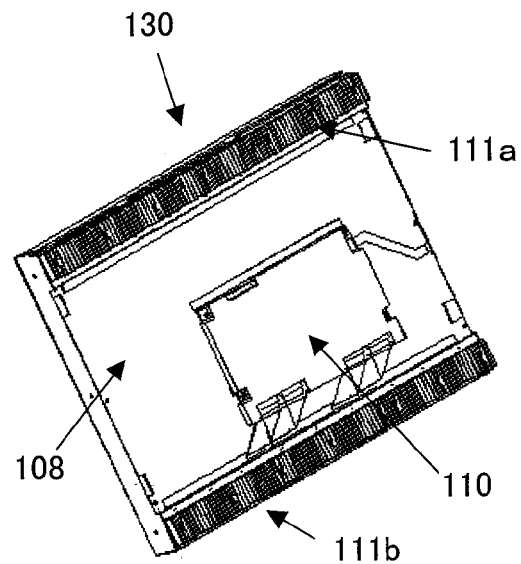
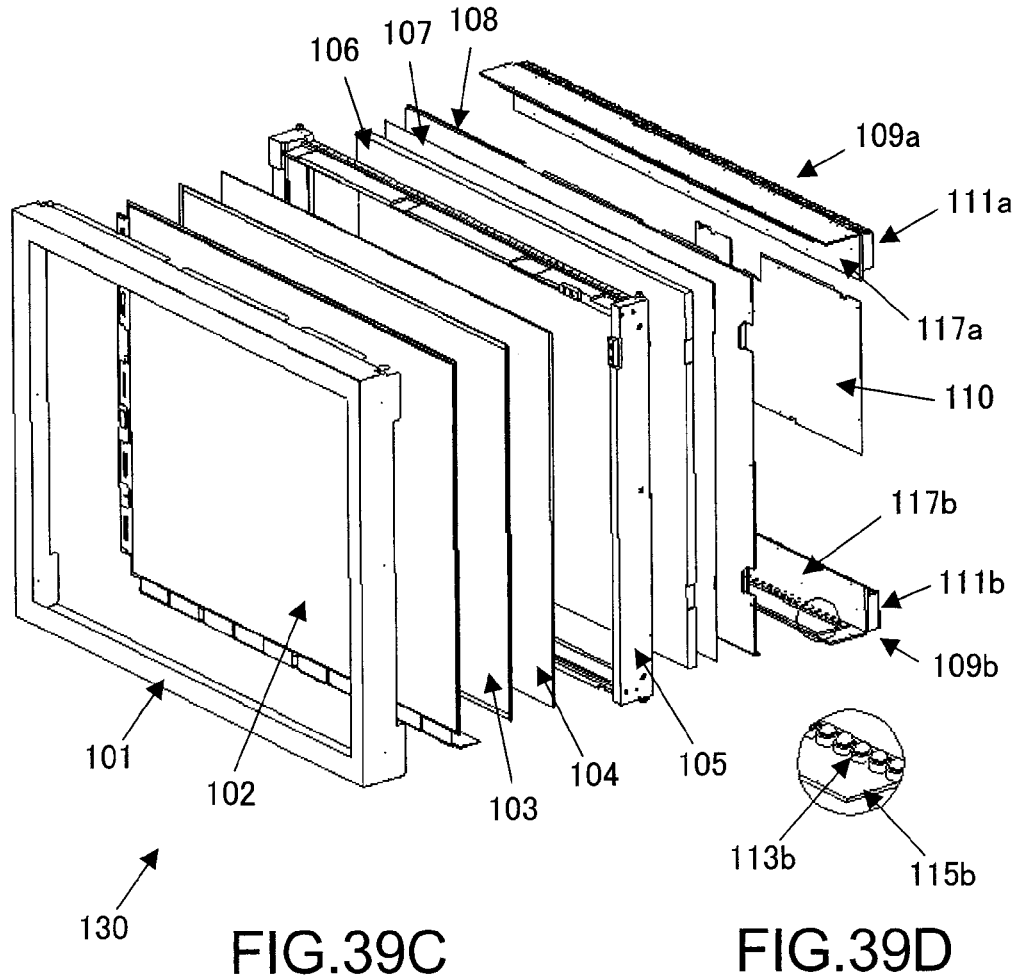
FIG.39C
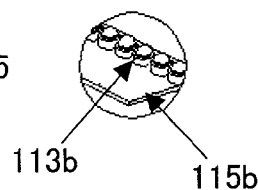
FIG.39D

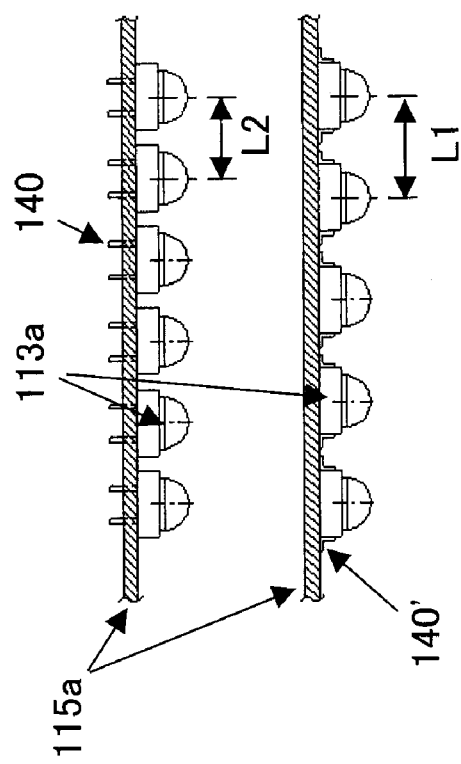
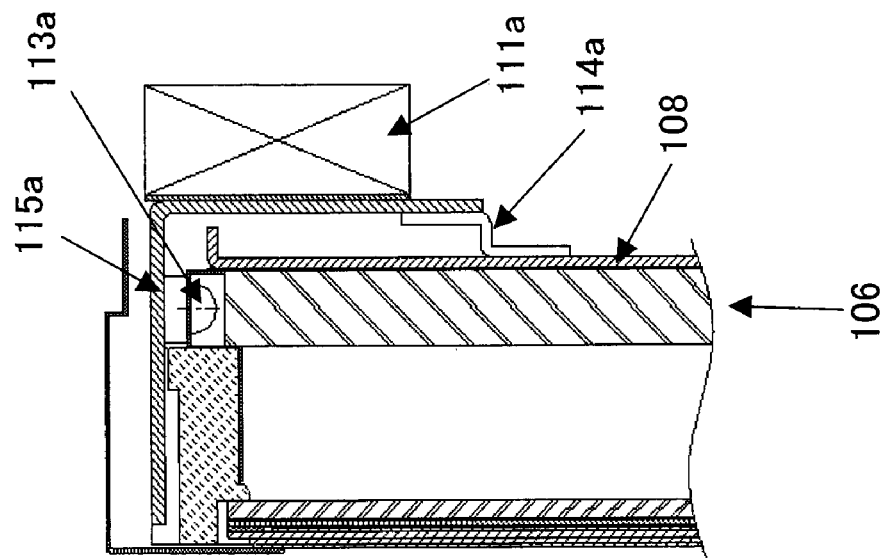

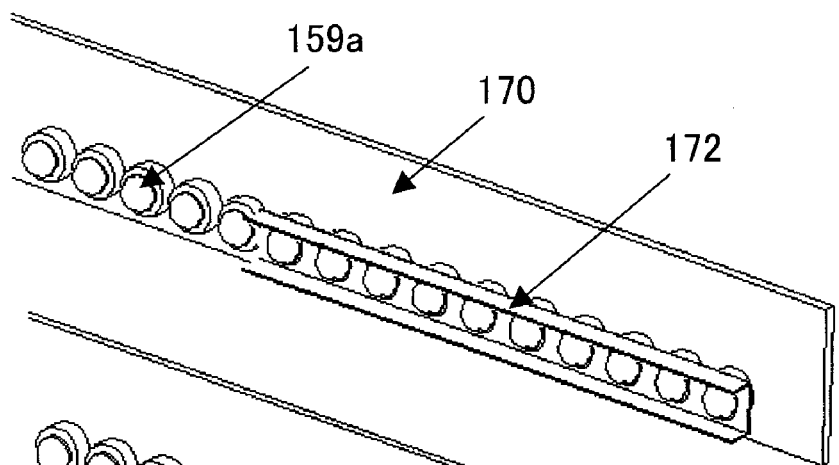
FIG.47A
PRIOR ART
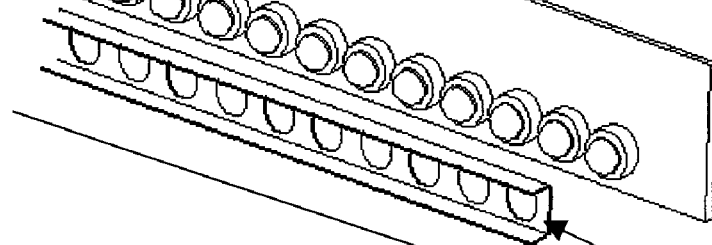
FIG.47B
PRIOR ART
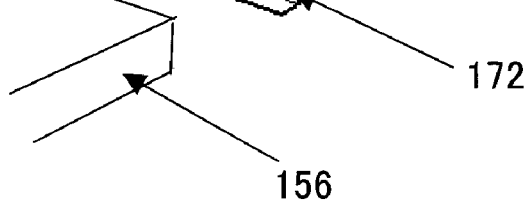

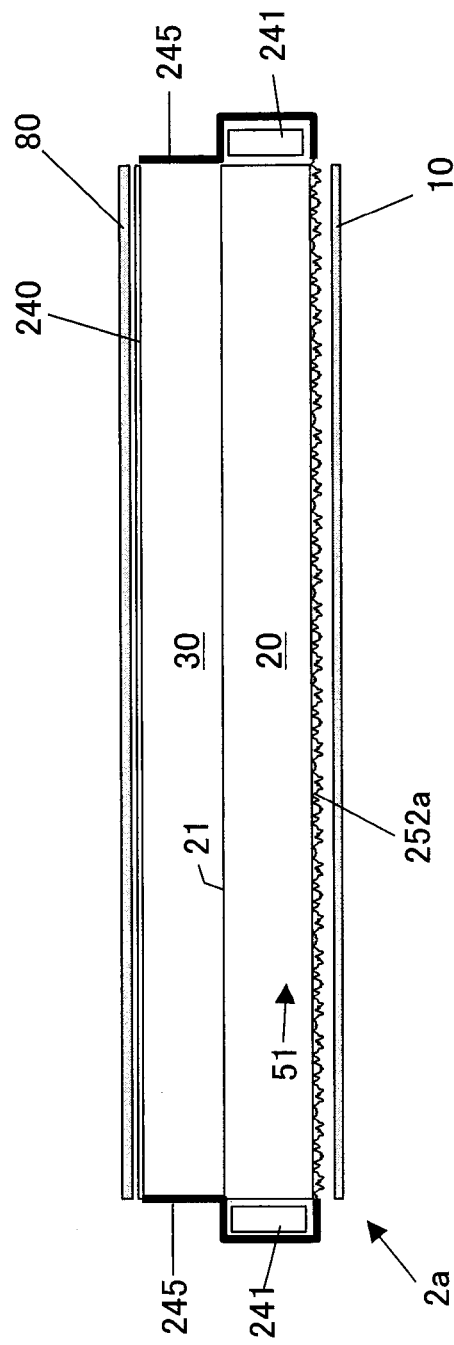
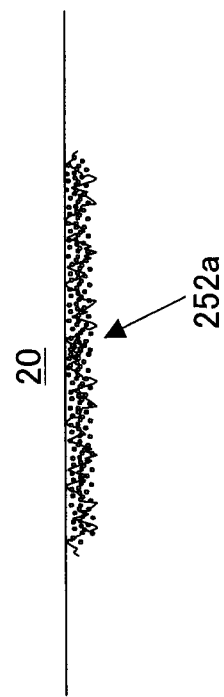
FIG.53A
FIG.53B

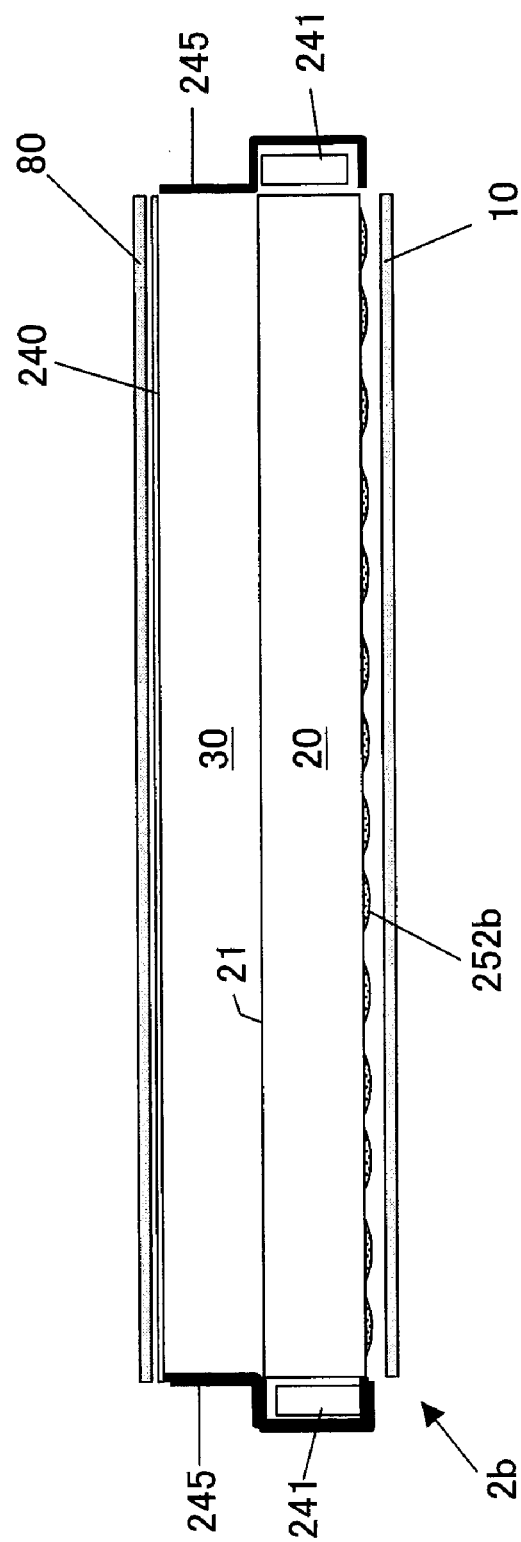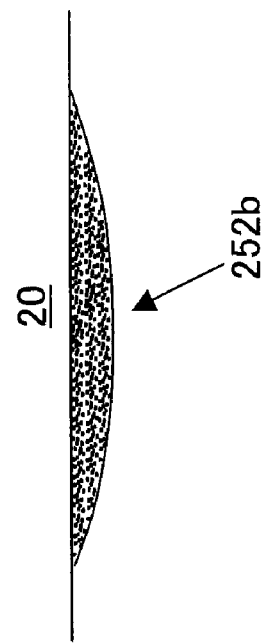
FIG.54A
FIG.54B

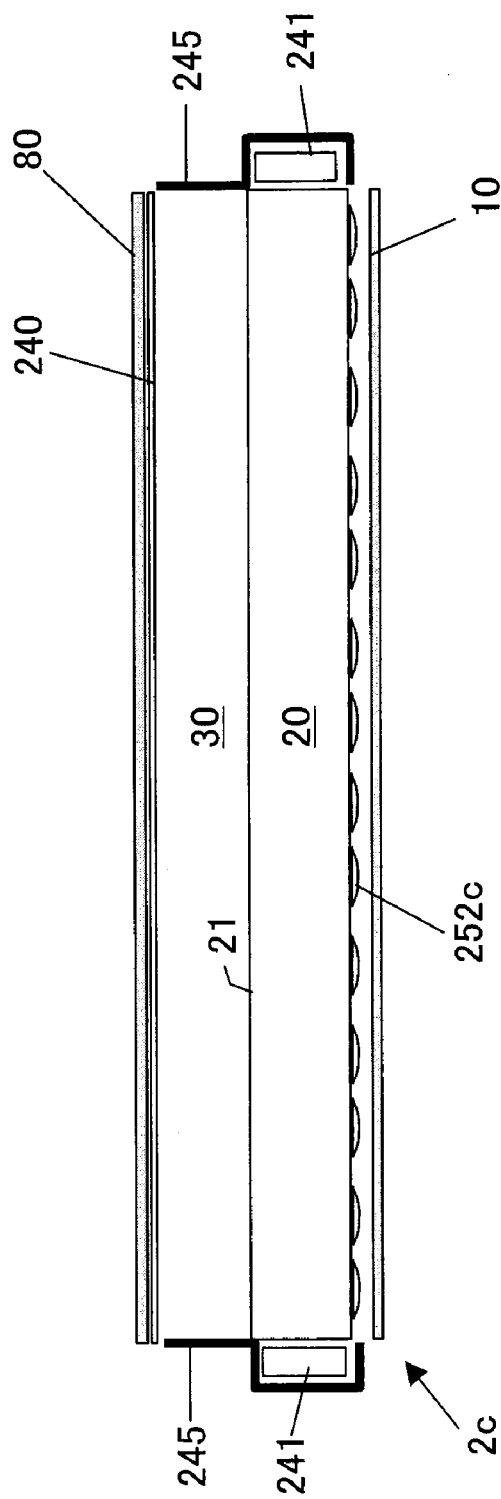
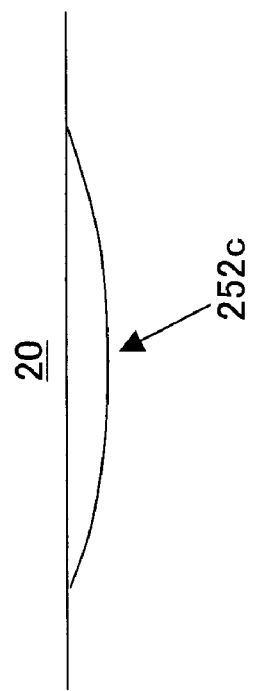
FIG.55A
FIG.55B

BACKLIGHT UNIT AND LIQUID CRYSTAL DISPLAY DEVICE HAVING THE SAME

BACKGROUND OF THE INVENTION

1. Field of the Invention

The present invention relates to a backlight unit and a liquid crystal display device including the same.

2. Description of the Related Art

FIG. 70 shows the schematic structure of a conventional liquid crystal display device. The liquid crystal display device has a liquid crystal display panel 110 and a backlight unit. The backlight unit is provided with a light guide plate 114 and cold-cathode tubes 116 disposed at two end surfaces opposite to each other of the light guide plate 114. Around the cold-cathode tubes 116, reflectors 117 are disposed which efficiently transmit light into the light guide plate 114. Lens sheets 111 and 112 and a diffuser sheet 113 are disposed between the liquid crystal display panel 110 and the backlight unit. In addition, a reflection sheet 115 is disposed on the back side of the light guide plate 114.

For the backlight unit used in the liquid crystal display device, the side lit backlight unit shown in FIG. 70 and a direct backlight unit are generally used, in which a direct backlight unit includes a light source disposed directly below a liquid crystal display panel. They are separately used in such a way that the side lit backlight unit is used for a liquid crystal display device having a screen size of 20 inches (20-inch diagonal screen) or under, in general, and for a liquid crystal display device particularly requiring a reduced thickness. In both of these configurations, a cold-cathode tube is generally used for the light source. With the single exception of a liquid crystal display device having a small screen size for use in a cellular telephone and a personal digital assistant (PDA), a white LED is used for a light source because it does not need much light quantity and it is the most suited for a reduction in size and weight.

Although the cold-cathode tube is mainly used for a liquid crystal having a larger screen size than a cellular telephone and a PDA, environmental issues are increasingly important in recent years, and it is considered to be undesirable to use a cold-cathode tube using mercury.

As a light source replacing the cold-cathode tube, various light sources such as a mercury-free fluorescent tube and an LED are being developed. Among them, an LED is considered to be a promising next-generation light source. In the side lit backlight unit, when an LED is the light source, configurations are considered in which a plurality of white LEDs are arranged and in which a plurality of single color LEDs in red, green, and blue are arranged. In particular, attention is greatly focused on a backlight unit using the combination of red, green, and blue single color LEDs in that it can be used as a backlight for a field sequential display device that sequentially lights single color LEDs and that can implement wide color reproduction which cannot be realized by white LEDs. However, the liquid crystal display device including this backlight unit has a problem that the colors of individual LEDs can be visually recognized in the area corresponding to the vicinity of the incident plane of a light guide plate. This is because in the vicinity of the incident plane, the light from LEDs in different colors are taken out of the light guide plate as the light is not mixed, and the light immediately enters the liquid crystal display panel.

A backlight having a two-stage light guide plate structure using a sub-light guide plate is disclosed by Lumileds Lighting Company, LLC. (Nikkei Electronics, No. 844, pp. 126 to 127, Mar. 31, 2003) in which red, green, and blue lights are mixed in a sub-light guide plate to form uniform white light and then the light is allowed to enter an upper main light guide plate. A problem with this configuration is that efficiency is greatly decreased because the incident efficiency from LEDs to the sub-light guide plate and the incident efficiency of the sub-light guide plate to the main light guide plate are low. A low efficiency increases input electric power to require measures against heat, causes an increase in size due to a radiation fin, etc. In addition, the LEDs to be used are known to generate an increased cost.

Other related lighting and display devices are disclosed in JP-A-2003-215349 and JP-A-2004-95390.

SUMMARY OF THE INVENTION

In order to overcome the problems described above, preferred embodiments of the present invention provide a backlight unit and a liquid crystal display device including the same which can obtain excellent display quality.

According to a preferred embodiment of the present invention, a backlight unit preferably includes a discrete light source section, a reflecting section, a light guide section, an optical mixing section A, and an optical mixing section B, wherein the reflecting section, the light guide section, the optical mixing section A, and the optical mixing section B are overlaid in this order, the discrete light source section is a section in which individual light sources having different spectra or different light emission quantities are arranged near an incident plane of the light guide section, a light drawing section configured to take out light propagating through the light guide section out on a reflecting section side or on an optical mixing section A side is provided on a surface of the light guide section facing the reflecting section or on a surface facing the optical mixing section A, the optical mixing section A is a section configured to mix color lights of different spectra or lights of different light quantities mainly in an in-plane direction to make the light uniform, and the optical mixing section B is a section configured to mix lights at different angles in the same point in a plane to angularly realign the lights to make a luminous light color and a luminous light quantity uniform in the plane.

Another preferred embodiment of the present invention provides a liquid crystal display device including a backlight unit provided with a light guide plate and a light source portion, and a liquid crystal display panel disposed on a light emission plane side of the light guide plate, wherein for the backlight unit, the backlight unit according to any one of the preferred embodiments is used.

Another preferred embodiment of the present invention provides a liquid crystal display device including a side lit backlight unit provided with a light guide plate and a light source portion disposed near at least one side end surface of the light guide plate, and a liquid crystal display panel disposed on a light emission plane side of the light guide plate, wherein a flexible substrate or a printed circuit board is disposed in a peripheral portion of the liquid crystal display panel, and the flexible substrate or the printed circuit board is arranged so as not to cover the light source portion.

Another preferred embodiment of the present invention provides a liquid crystal display device including a backlight unit provided with a light guide plate, a light source portion, and a control portion, and a liquid crystal display panel disposed on a light emission plane side of the light guide plate, wherein the liquid crystal display panel has a micro area from which a red light, a green light, and a blue light are emitted from a backlight unit side separately from a display pixel, and a light quantity sensor configured to detect a light quantity is disposed in each of the micro areas on a viewer side, and the control portion controls the light source portion based on the light quantity.

Another preferred embodiment of the present invention provides a backlight unit including a discrete light source section configured to have individual light sources having different spectra or different light emission quantities, a light guide section configured to have one end surface which is provided with an incident plane which receives a light emitted from the discrete light source section, a light guiding area which guides the light having entered from the incident plane, and a light emission plane which emits the light guided in the light guiding area, a heat conduction section configured to conduct heat generated in the discrete light source section, and a heat dissipation section disposed on a back side of the light emission plane and configured to dissipate heat conducted through the heat conduction section.

Another preferred embodiment of the present invention provides a liquid crystal display device including a backlight unit provided with a discrete light source section configured to have individual light sources having different spectra or different light emission quantities, a light guide section configured to have one end surface provided with an incident plane which receives a light emitted from the discrete light source section, a light guiding area which guides the light having entered from the incident plane, and a light emission plane which emits the light guided in the light guiding area, a heat conduction section configured to conduct heat generated in the discrete light source section, and a heat dissipation section disposed on the back side of the light emission plane and configured to dissipate heat conducted through the heat conduction section; a liquid crystal display panel disposed on a light emission plane side of the light guide plate, and an accommodating section configured to accommodate the backlight unit and the liquid crystal display panel which is made of a material having a high heat radiating property to thermally contact with the backlight unit to dissipate heat generated in the discrete light source section.

Another preferred embodiment according to the present invention provides a backlight unit including a discrete light source section, a reflecting section A, a light guide section, an optical mixing section A, and an optical mixing section B, wherein the reflecting section A, the light guide section, the optical mixing section A, and the optical mixing section B are overlaid in this order, the discrete light source section is a section in which individual light sources having different spectra or different light emission quantities are arranged near an incident plane of the light guide section, and a light drawing section configured to take out light propagating through the light guide section out on a reflecting section A side or on an optical mixing section A side is provided on a surface of the light guide section facing the reflecting section A or a surface facing the optical mixing section A, wherein a relationship, $0 \leq Lp/H \leq 2.5$ is maintained, where a height of the optical mixing section A is H, and a length of a minimum unit of a cycle of an array of the discrete light source section is Lp.

Another preferred embodiment of the present invention provides a backlight unit including a discrete light source section configured to have individual light sources having different spectra or different light emission quantities, a light guide section configured to have one end surface provided with an incident plane which receives a light emitted from the discrete light source section, a light guiding area which guides the light having entered from the incident plane, and a light emission plane which emits the light guided in the light guiding area, a heat conduction section configured to conduct heat generated in the discrete light source section, and a heat insulating section configured to have a contact surface which covers and thermally contacts with a portion of an outer surface of the heat conduction section and to insulate heat as a temperature of the heat conduction section substantially uniformly.

In addition, another preferred embodiment of the present invention provides a liquid crystal display device including a liquid crystal display panel provided with a pair of substrates disposed facing each other, and liquid crystals sealed between the pair of the substrates, and the backlight unit according to any one of the preferred embodiments disposed on a back side of the liquid crystal display panel.

According to the various preferred embodiments of the invention, a backlight unit and a liquid crystal display device including the same can be implemented which obtain excellent display quality.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 7 shows a diagram depicting the configuration of the light guide plate of the backlight unit according to example 6 of the first preferred embodiment of the present invention.

FIG. 9 shows a diagram depicting the configuration of the backlight unit according to example 8 of the first preferred embodiment of the present invention.

FIGS. 25A to 25C show diagrams depicting another configuration of the liquid crystal display device according to example 22 of the first preferred embodiment of the present invention.

FIGS. 39A to 39D show diagrams depicting the configuration of the liquid crystal display device 130 according to example 1 of the second preferred embodiment of the present invention.

FIG. 45 shows a cross section depicting the essential portion of the configuration of the liquid crystal display device according to example 3 of the second preferred embodiment of the present invention.

FIG. 46 shows a diagram depicting the configuration of the LEDs of the backlight unit according to example 4 of the second preferred embodiment of the present invention.

FIGS. 47A and 47B show diagrams depicting the configuration in the vicinity of the light source fixing member of the conventional backlight unit.

FIGS. 53A and 53B show diagrams depicting the schematic configuration of the liquid crystal display device according to example 1 of the third preferred embodiment of the present invention.

FIGS. 54A and 54B show diagrams depicting the schematic configuration of the liquid crystal display device according to example 1 of the third preferred embodiment of the present invention.

FIGS. 55A and 55B show diagrams depicting the schematic configuration of the liquid crystal display device according to example 1 of the third preferred embodiment of the present invention.

DETAILED DESCRIPTION OF PREFERRED EMBODIMENTS

First Preferred Embodiment

Figure 1:
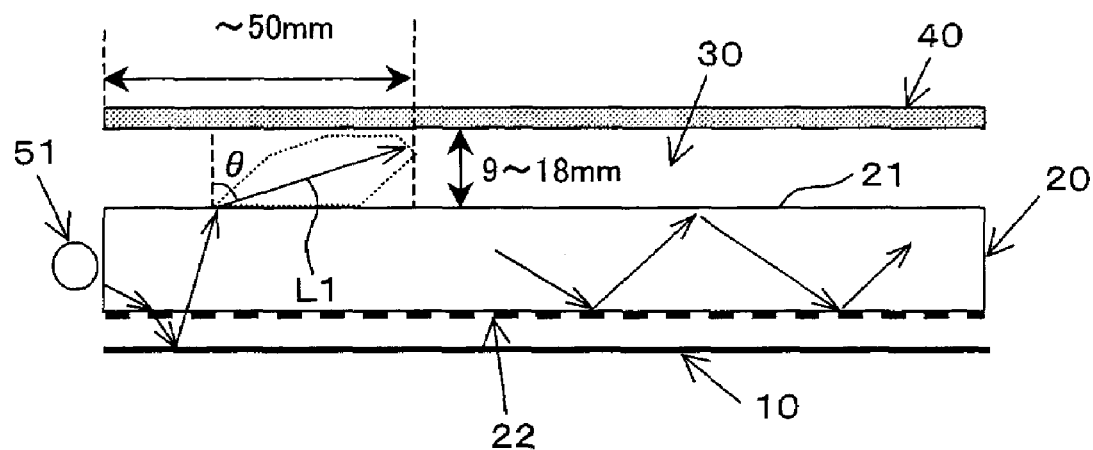
FIG. 1 shows a cross section depicting the basic configuration of the backlight unit according to the first preferred embodiment of the present invention.

A backlight unit and a liquid crystal display device including the same according to a first preferred embodiment of the present invention will be described with reference to FIGS. 1 to 37. FIG. 1 shows a cross section depicting the principle of the backlight unit according to the first preferred embodiment. As shown in FIG. 1, the backlight unit that is an area light source has an area light guide plate (the light guide section) 20 preferably having a substantially rectangular plane shape, for example. In the vicinity of at least one side end surface of the light guide plate 20, a light source (a discrete light source section) 51 is disposed. For example, the light source 51 is configured of a plurality of LEDs having light emission wavelengths of different spectra. Alternatively, the light source 51 is configured of a plurality of LEDs having different light emission quantities. In the drawing, above a light emission plane 21 of the light guide plate 20, optical sheets such as a diffuser (an optical mixing section B) 40 are disposed, and a liquid crystal display panel (not shown) is disposed further thereabove. Between the light emission plane 21 of the light guide plate 20 and the diffuser 40, an air space (an optical mixing section A) 30 having a predetermined thickness is provided. In the drawing, below the light guide plate 20, a reflection sheet (a reflecting section) 10 is disposed. More specifically, the backlight unit has the configuration in which the reflection sheet 10, the light guide plate 20, the air space 30, and the diffuser 40 are overlaid in this order. On the surface on the reflection sheet 10 side of the light guide plate 20, a light drawing section such as scatter dots 22 is disposed, and no light drawing section is disposed on the light emission plane 21.

The light that has been emitted from the light source 51, guided in the light guide plate 20 and taken out through the scatter dots 22 is emitted as a light L1 which mainly travels in the direction that is near the in-plane direction of the light emission plane 21 of the light guide plate 20 and has a greater angle θ from the normal direction of the light emission plane 21. Thus, the distance is kept between the light emission plane 21 and the optical sheets and the liquid crystal display panel that are disposed thereabove, whereby the light emitted from the light emission plane 21 does not immediately enter the liquid crystal display panel, and travels in the air space 30 for a while. Therefore, since the light which is taken out near the incident plane 23 and not mixed with the light from the other LEDs, is mixed with the other light and spread widely over the panel while the light is traveling in the air space 30, color irregularities and luminance variations are not visually recognized. More specifically, the air space 30 has a function that mixes and makes uniform the light having the light emission wavelength of different spectra, or the lights in different light quantities in the in-plane direction of the backlight unit. The diffuser 40 has a function that mixes the light traveling at different angles and angularly realigns the light at the same point in the plane, thereby making uniform the luminous light colors and the luminous light quantities in the plane.

The light actually going out of the light guide plate 20 is emitted substantially in the oblique direction (θ=about 70° to 80°) with respect to the normal direction of the light emission plane 21. Then, when it is desired that the light emitted from the light guide plate 20 at a certain emission point enters the diffuser 40 at the position going into the air space 30 in the in-plane direction about 50 mm, for example, from that emission point, the distance of about 9 mm to about 18 mm is preferred for the thickness of the air space 30 (the distance between the light emission plane 21 and the diffuser 40). Since the light is spread while it is traveling for about 50 mm and the light is mixed with the other light, it is difficult to visually recognize color irregularities and luminance variations.

In addition, the scatter dots 22 may be provided on the light emission plane 21 side of the light guide plate 20 (on the air space 30 side). However, when the scatter dots 22 are provided on the light emission plane 21 side of the light guide plate 20, the light impinged on the scatter dots 22 among the guided light is emitted from the light guide plate 20 toward the panel as the light holds the properties at the incident angle while the light is scattering mostly along the main light beam of the incident light. More specifically, the angle θ shown in FIG. 1 becomes small, and the distance traveling in the air space 30 becomes short. In addition, the optical path from the scatter dots 22 to the diffuser 40 is shortened by the thickness of the light guide plate 20. Therefore, the light which has been taken out near the incident plane 23 and has not been mixed with the light from the other LEDs cannot be sufficiently mixed with the other light in the air space 30 to enter the panel, and color irregularities and luminance variations are visually recognized. In order to sufficiently secure the distance of the light traveling in the air space 30, it is necessary to increase the thickness of the air space 30 more than that of the configuration shown in FIG. 1. However, when the thickness of the air space 30 is increased, the backlight unit is increased in size, and the number of reflections in each of the members increases to cause an increase in the light absorption and a reduction in the luminance. Accordingly, in order to implement a small-sized backlight unit in which color irregularities and luminance variations are not visually recognized, it is efficient that the light drawing function of the scatter dots 22 and other devices is provided on the plane on the reflection sheet 10 side, not on the light emission plane 21 side of the light guide plate 20.

Hereinafter, a backlight unit and a liquid crystal display device including the same according to the first preferred embodiment will be described more specifically with reference to examples.

EXAMPLE 1

Figure 2:
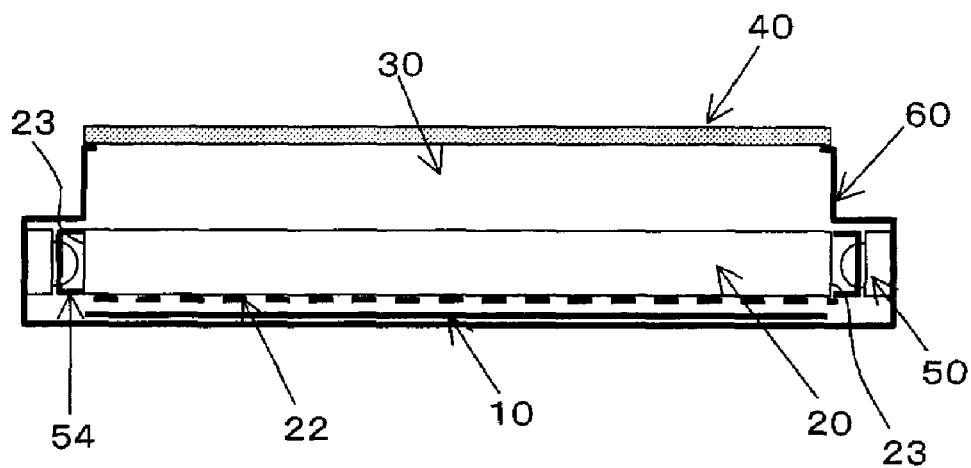
FIG. 2 shows a cross section depicting the configuration of the backlight unit according to example 1 of the first preferred embodiment of the present invention.

FIG. 2 shows the cross sectional configuration of a backlight unit according to example 1. As shown in FIG. 2, near the both end surfaces of a light guide plate 20 on which scatter dots 22 are printed, a plurality of LEDs 50 which configure a train of discrete light sources are disposed. The light guide plate 20 is disposed in such a way that the printed surface of the scatter dots 22 faces the reflection sheet 10 side. A reflector 54 covers the LEDs 50 so that the light from the LEDs 50 efficiently enter the light guide plate 20. On the top surface side of the light guide plate 20, a diffuser 40 is disposed from an air space 30 by a predetermined thickness. These components are fixed together by a housing 60. The light which has been taken out near the incident plane 23 of the light guide plate 20 travels in the direction opposite to the light guide plate 20 while traveling in the air space 30, and enters the diffuser 40. Thus, the light emitted from the individual LEDs 50 are mixed with the light emitted from the other LEDs 50 while passing through the air space 30, and then enter the diffuser 40. Accordingly, color irregularities and luminance variations in the backlight unit can be prevented.

EXAMPLE 2

Figure 3:
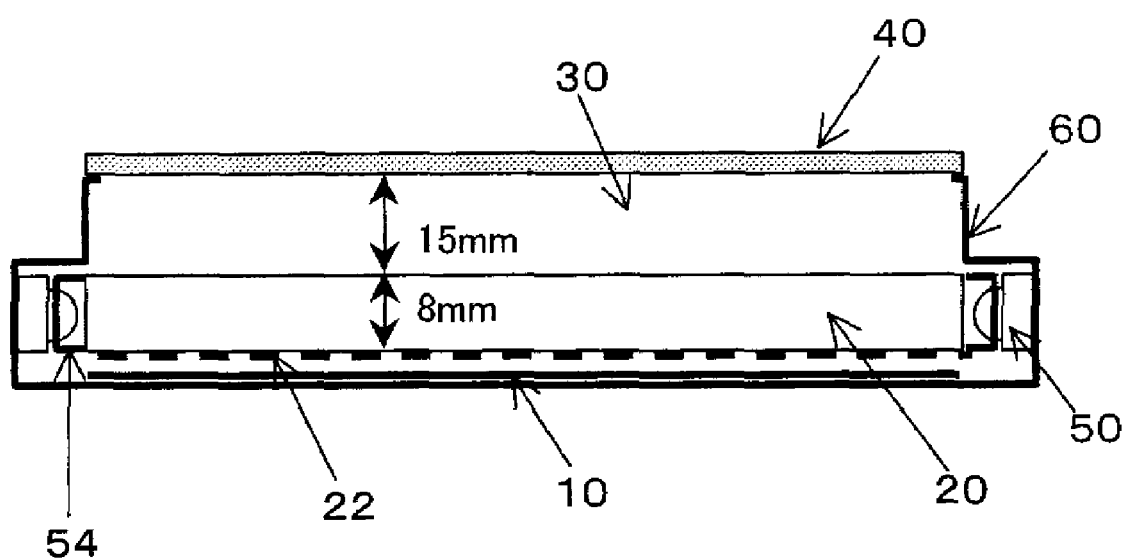
FIG. 3 shows a cross section depicting the configuration of the backlight unit according to example 2 of the first preferred embodiment of the present invention.

FIG. 3 shows the cross sectional configuration of a backlight unit according to example 2. In the example, the distance between individual LEDs 50 is about 9 mm, the size of the emission plane is about 6 mm in diameter, and the thickness of a light guide plate 20 is about 8 mm. The thickness of an air space 30 between the light guide plate 20 and a diffuser 40 is about 15 mm. Accordingly, color irregularities and luminance variations were improved to the extent that they were not visually recognized. In addition, the size and the arrangement of the LEDs 50 and the thickness of the light guide plate 20 are not limited thereto. In addition, the thickness of the air space 30 is not limited thereto. It is sufficient that there is a slight distance between the light guide plate and the optical members disposed thereabove. As an example, a sufficient advantage can be achieved by setting the distance ranging from about 2 mm to about 50 mm, particularly the distance ranging from about 10 mm to about 20 mm.

EXAMPLE 3

Figure 4A:
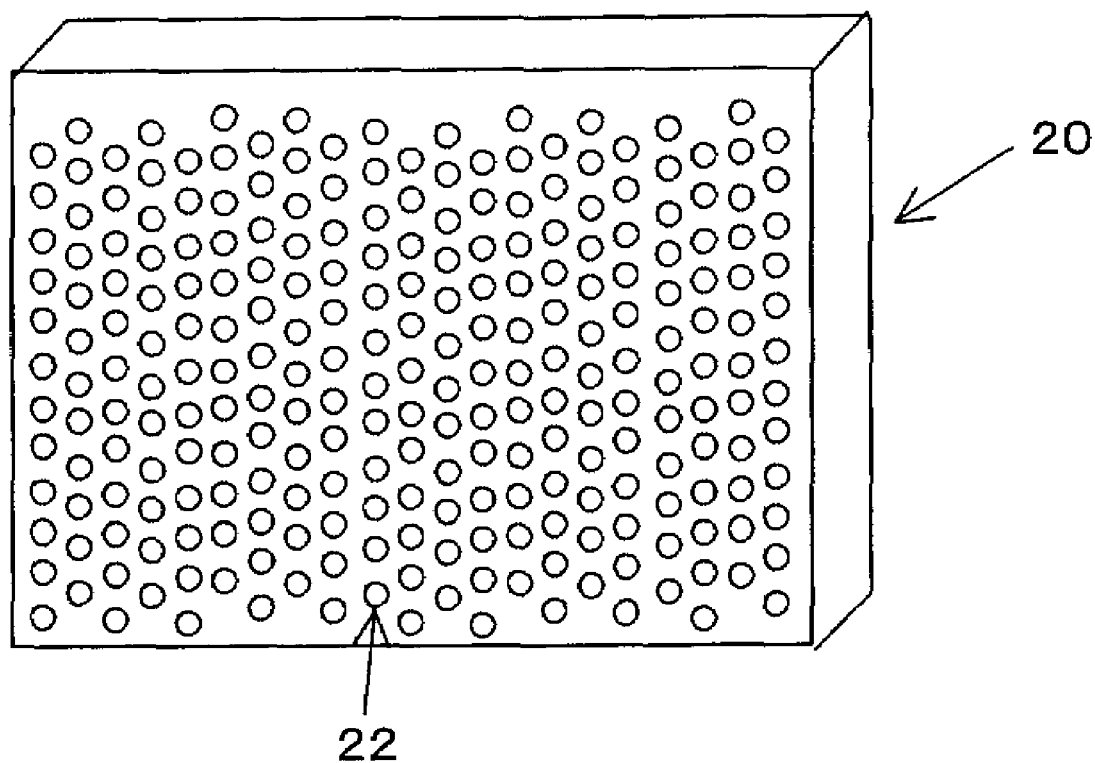
FIGS. 4A and 4B show diagrams depicting the configuration of the light guide plate of the backlight unit according to example 3 of the first preferred embodiment of the present invention.
Figure 4B:
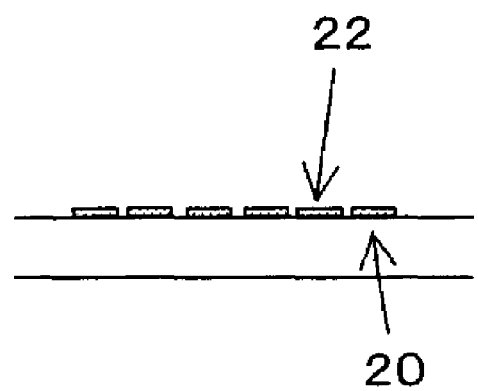

FIGS. 4A and 4B show the configuration of a light guide plate 20 of a backlight unit according to example 3. FIG. 4A shows a perspective view depicting a light guide plate 20, and FIG. 4B shows a cross section partially depicting the light guide plate 20. As shown in FIGS. 4A and 4B, on the back side of the light guide plate 20, the scatter dots 22 are printed as a light drawing section. For coating materials for printing dots, the materials that may be used including a material for use in the conventional backlight unit include, for example, a material of beads or fillers such as titanium oxide having different refractive indexes dispersed in a coating binder such as an acrylic. In addition, the print pattern and the size of the scatter dots 22 may be the same as those as before.

EXAMPLE 4

Figure 5A:
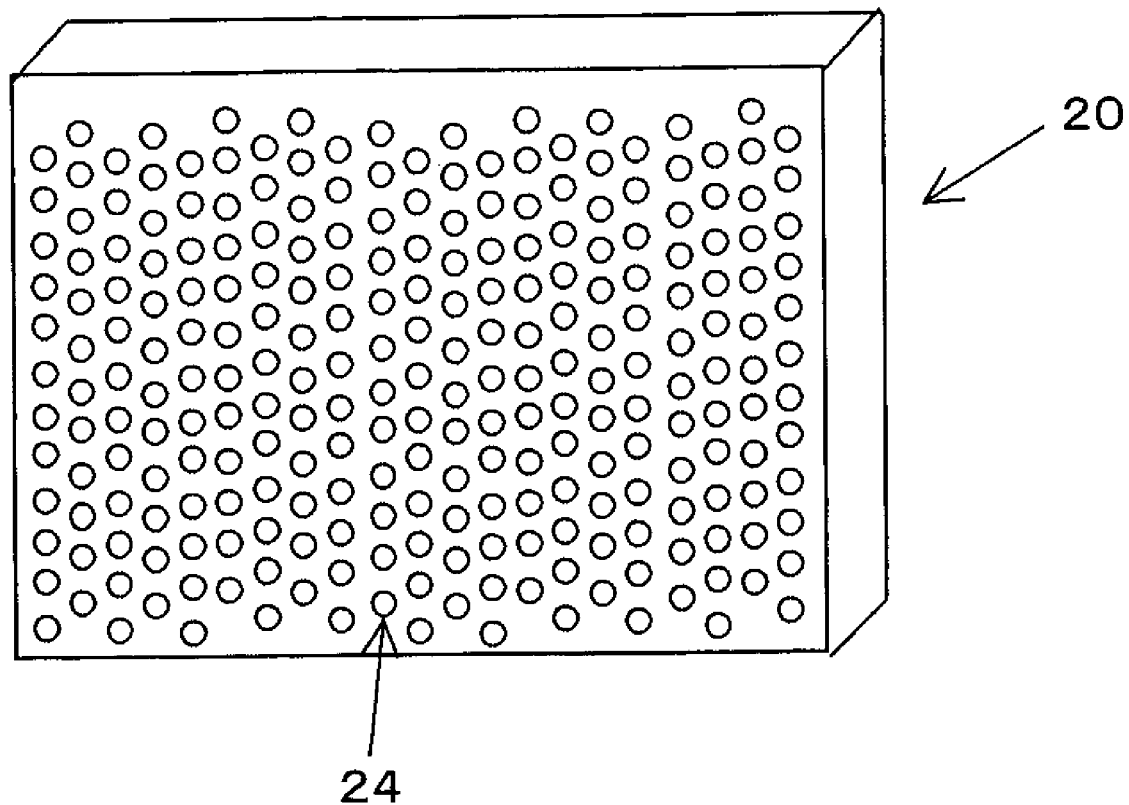
FIGS. 5A and 5B show diagrams depicting the configuration of the light guide plate of the backlight unit according to example 4 of the first preferred embodiment of the present invention.
Figure 5B:
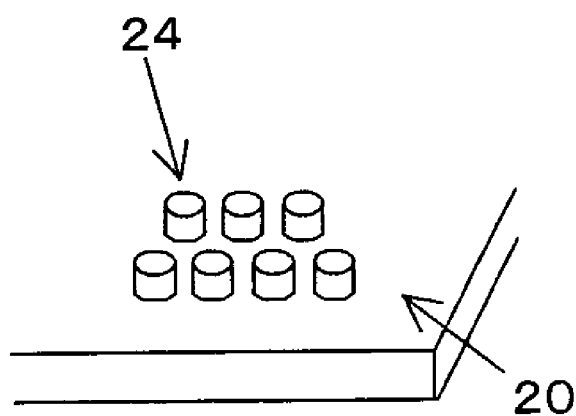

FIGS. 5A and 5B show the configuration of a light guide plate 20 of a backlight unit according to example 4. FIG. 5A shows a perspective view depicting the light guide plate 20, and FIG. 5B shows an enlarged view partially depicting the light guide plate 20. As shown in FIGS. 5A and 5B, on the back side of the light guide plate 20, projections and recesses such as fine projecting portions 24 are provided as a light drawing section. The projecting portions 24 can be formed by providing projections in a mold used for fabricating the light guide plate 20.

EXAMPLE 5

Figure 6A:
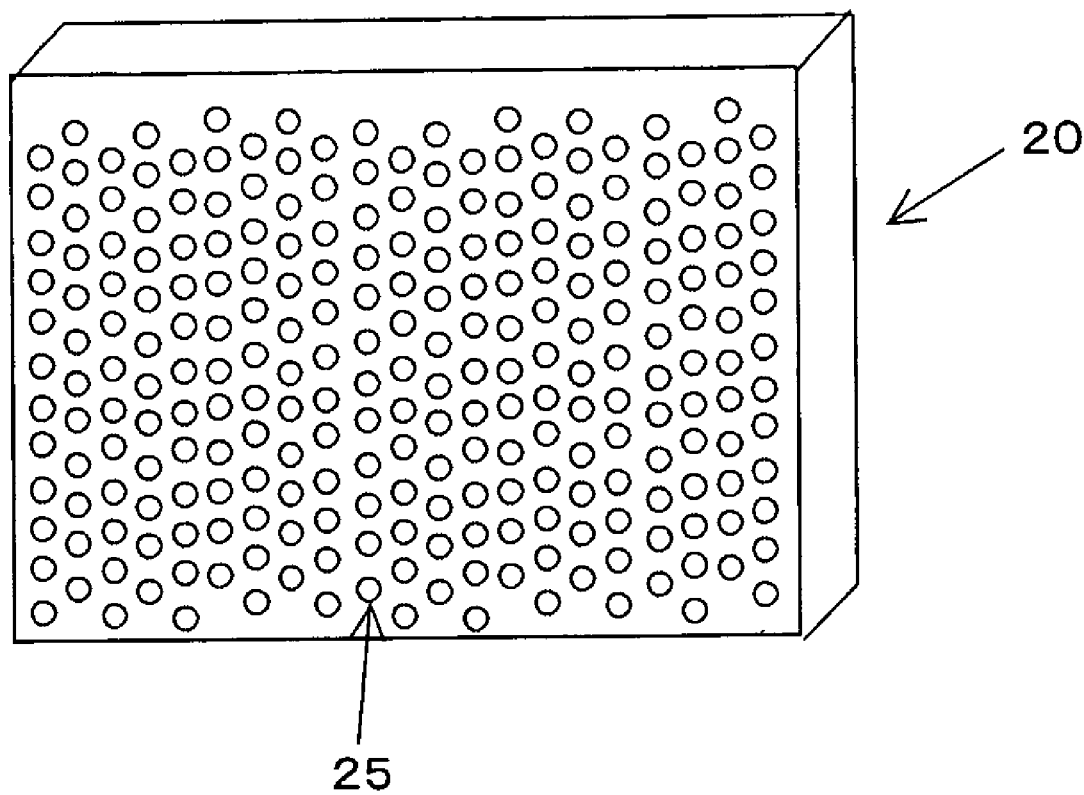
FIGS. 6A and 6B show diagrams depicting the configuration of the light guide plate of the backlight unit according to example 5 of the first preferred embodiment of the present invention.
Figure 6B:
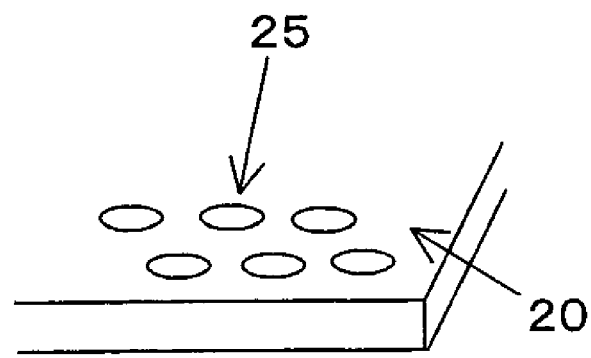

FIGS. 6A and 6B show the configuration of a light guide plate 20 of a backlight unit according to example 5. FIG. 6A shows a perspective view depicting the light guide plate 20, and FIG. 6B shows an enlarged view partially depicting the light guide plate 20. As shown in FIGS. 6A and 6B, on the back side of the light guide plate 20, fine projecting portions 25 in a lens shape are provided as a light drawing section. The projecting portions 25 can be formed by providing lens shapes in a mold for fabricating the light guide plate 20.

EXAMPLE 6

FIG. 7 shows the configuration of a light guide plate 20 of a backlight unit according to example 6. As shown in FIG. 7, the arrangement pattern of scatter dots 22 is designed in such a way that the arrangement density is low on the side near an LED module 52, the arrangement density is gradually increased away from the LED module 52 and the arrangement density is the highest near the center of the light guide plate 20. Accordingly, such a luminance distribution can be implemented that a uniform luminance distribution is provided throughout the plane or that the luminance is the highest at the center of the light guide plate 20 and the luminance is low in the peripheral area. In addition, even if the projecting portions 24 and 25 are used instead of the scatter dots 22, the density is formed low on the LED module 52 side and the density is high near the center of the light guide plate 20, whereby the similar luminance distribution can be implemented.

EXAMPLE 7

Figure 8A:
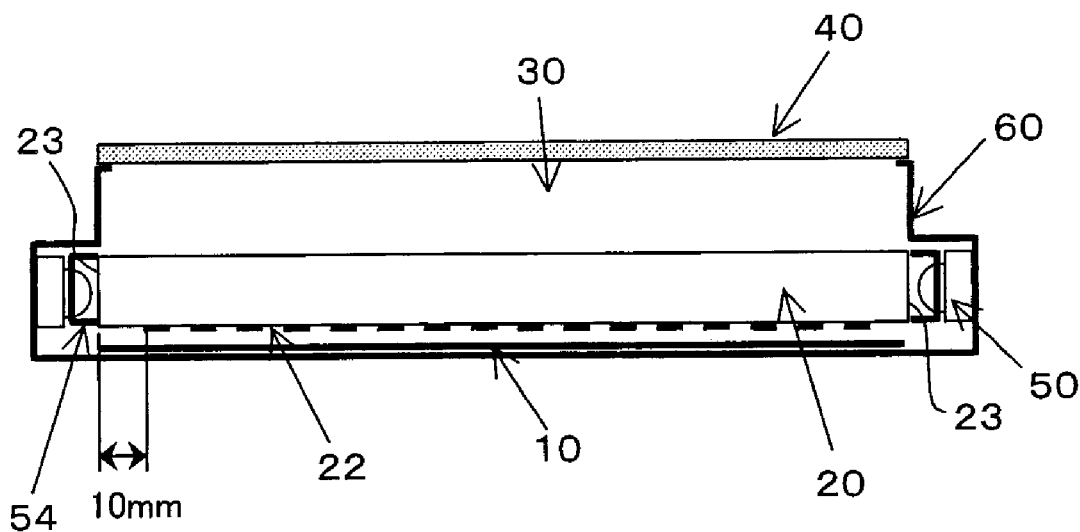
FIGS. 8A and 8B show diagrams depicting the configuration of the backlight unit according to example 7 of the first preferred embodiment of the present invention.
Figure 8B:
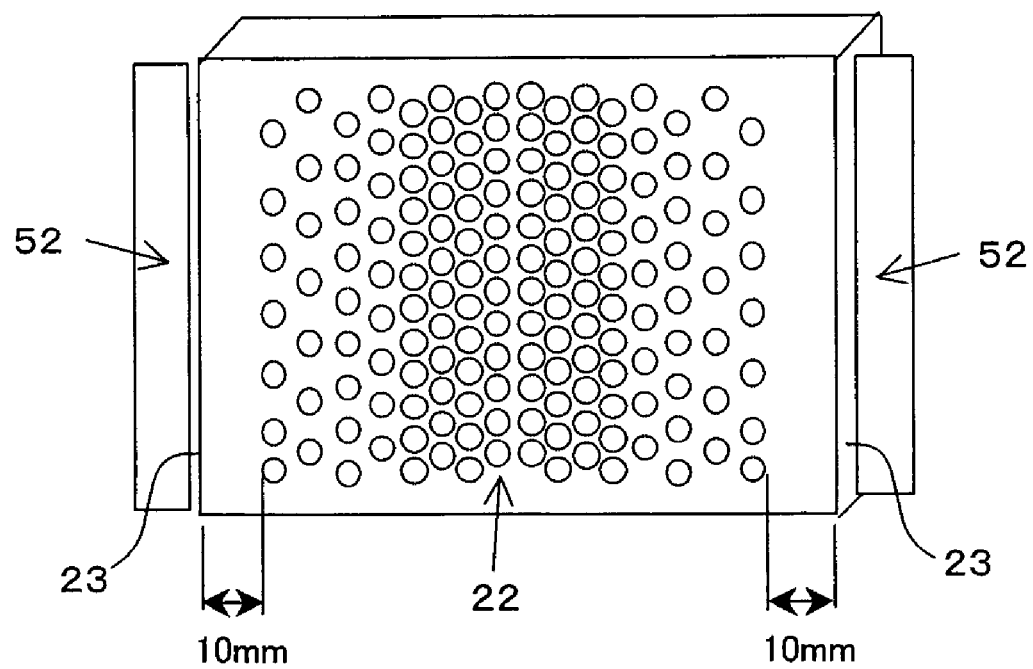

FIGS. 8A and 8B show the configuration of a backlight unit according to example 7. FIG. 8A shows a cross section depicting the backlight unit, and FIG. 8B shows a perspective view depicting a light guide plate 20 of the backlight unit. When the thickness of an air space 30 is thin, color irregularities are sometimes visually recognized. In the example, in order to suppress the color irregularities, scatter dots 22 are not provided in the area in which the distance from an incident plane 23 of the light guide plate 20 is about 10 mm or below. Accordingly, the light having entered the light guide plate 20 is guided in the area and is not emitted from the light guide plate 20. During that, since the light is mixed with the light from the other LEDs and emitted from the light guide plate 20 as it is mixed therewith, color irregularities are reduced. In addition, the distance is not limited to about 10 mm. For example, it is sufficient that the distance ranges from about 2 to about 50 mm. When the distance is set to about 50 mm, color irregularities are reduced to the extent that a problem is hardly generated in the case in which the thickness of the air space 30 is about a few mm.

EXAMPLE 8

FIG. 9 shows the configuration of a backlight unit according to example 8. As shown in FIG. 9, near incident planes 23 of a light guide plate 20, a plurality of red LEDs 50 (R), green LEDs 50 (G), and blue LEDs 50 (B) are substantially evenly arranged. The number of the LEDs 50 in individual colors is decided in consideration of the input electric power for the LEDs in each color and the illumination color of a target backlight unit. Generally, the number of the LEDs 50 (G) is the greatest. The LEDs 50 are arranged at even intervals, whereby the distances from the incident plane 23 at which the colors of the individual LEDs 50 are visually recognized are almost similar for any of the LEDs 50. Accordingly, the thickness of the air space 30 which is arranged not to visually recognize color irregularities can be established at the minimum. In addition, since color irregularities are more physiologically visually recognizable than luminance variations, this is an effective scheme in which a suitable number of LEDs in three primary colors is arranged closer to form a group of LEDs to provide whitish light and the group of LEDs is placed slightly apart.

EXAMPLE 9

Figure 10A:
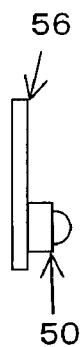
FIGS. 10A to 10C show diagrams depicting the configuration of the backlight unit according to example 9 of the first preferred embodiment of the present invention.
Figure 10B:
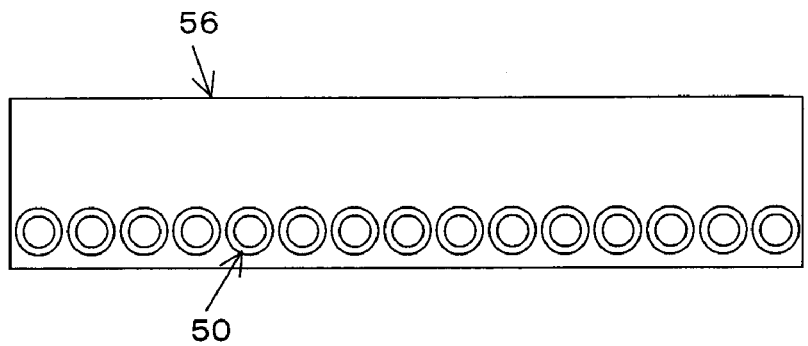
Figure 10C:
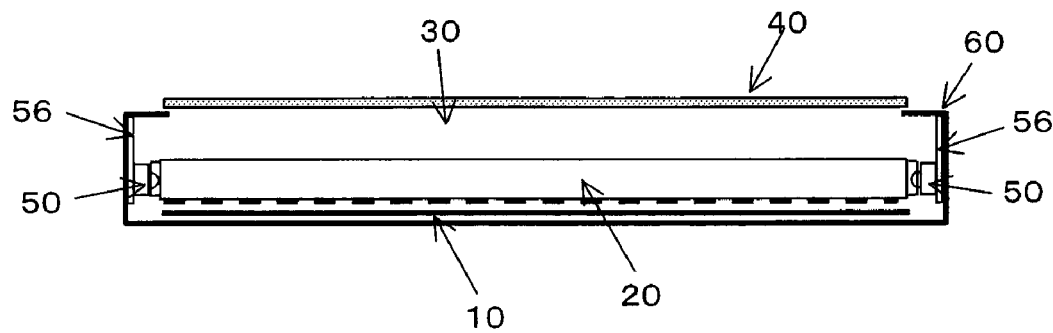

FIGS. 10A to 10C show the configuration of a backlight unit according to example 9. FIG. 10A shows the configuration when an LED circuit board 56 of the backlight unit is seen in parallel with the substrate plane, and FIG. 10B shows the configuration when the LED circuit board 56 is seen vertically to the substrate plane. FIG. 10C shows the cross sectional configuration of the backlight unit. As shown in FIGS. 10A to 10C, a plurality of LEDs 50 are linearly arranged along the longitudinal direction of the LED circuit board 56. The plurality of the LEDs 50 are arranged along the longitudinal direction of the incident plane of a light guide plate 20. The red, green, and blue LEDs 50 are arranged substantially evenly. Moreover, the LEDs 50 are mounted at the position (the lower end side in the drawing) on one side in the short direction of the LED circuit board 56. The LED circuit board 56 is incorporated in the backlight unit on the lower end side in the drawing as the LEDs 50 are placed on the under side. Accordingly, although an air space 30 is disposed between the light guide plate 20 and a diffuser 40, the thickness of the backlight unit can be reduced in thickness. The back side of the LED circuit board 56 is a metal plate to enhance the heat dissipation effect for the heat generated in the LEDs 50.

EXAMPLE 10

Figure 11A:
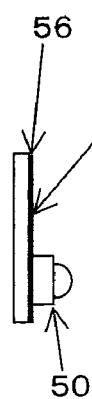
FIGS. 11A and 11B show diagrams depicting the configuration of the LED circuit board of the backlight unit according to example 10 of the first preferred embodiment of the present invention.
Figure 11B:
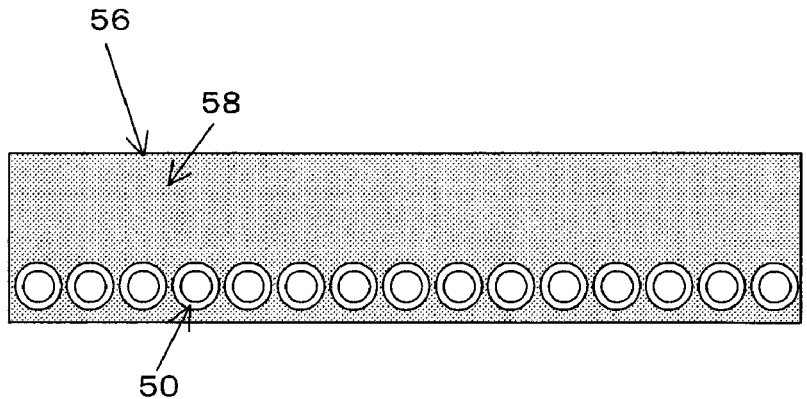

FIGS. 11A and 11B show the configuration of an LED circuit board 56 of a backlight unit according to example 10. FIG. 11A shows the configuration when the LED circuit board 56 is seen in parallel with the substrate plane, and FIG. 11B shows the configuration when the LED circuit board 56 is seen vertically to the substrate plane. As shown in FIGS. 11A and 11B, on the mounting surface side for LEDs 50 of the LED circuit board 56 (on the light guide plate 20 side), a mirror reflection sheet 58 is attached. Accordingly, the mounting surface of the LED circuit board 56 can be utilized as a portion of the side surface of the air space 30 between the light guide plate 20 and the diffuser 40 in the example 9. In addition, instead of the mirror reflection sheet 58, a diffusion reflection sheet may be used.

EXAMPLE 11

Figure 12:
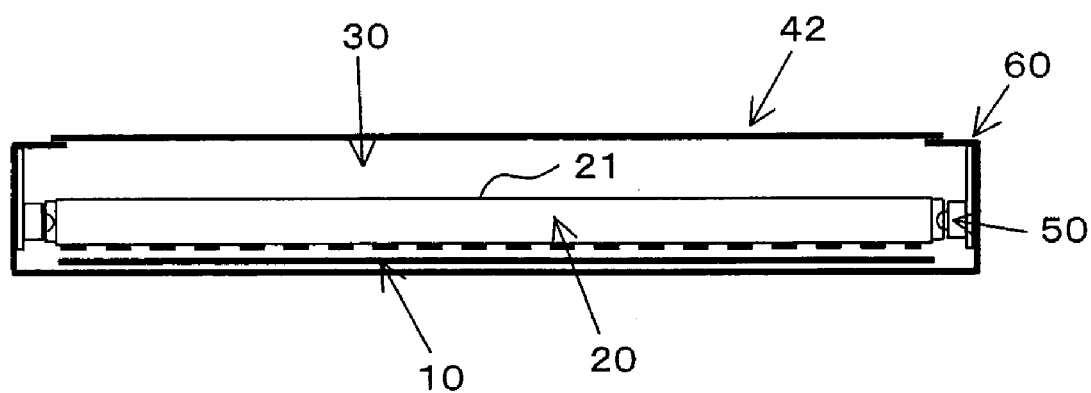
FIG. 12 shows a cross section depicting the configuration of the backlight unit according to example 11 of the first preferred embodiment of the present invention.

FIG. 12 shows the cross sectional configuration of a backlight unit according to example 11. As shown in FIG. 12, a thicker diffuser sheet 42 may be used instead of the diffuser 40. In this case, since it is likely to generate the deformation of the diffuser sheet 42 near the center, a transparent pin may be disposed on the light emission plane 21 side of a light guide plate 20 to hold the diffuser sheet 42.

EXAMPLE 12

Figure 13:
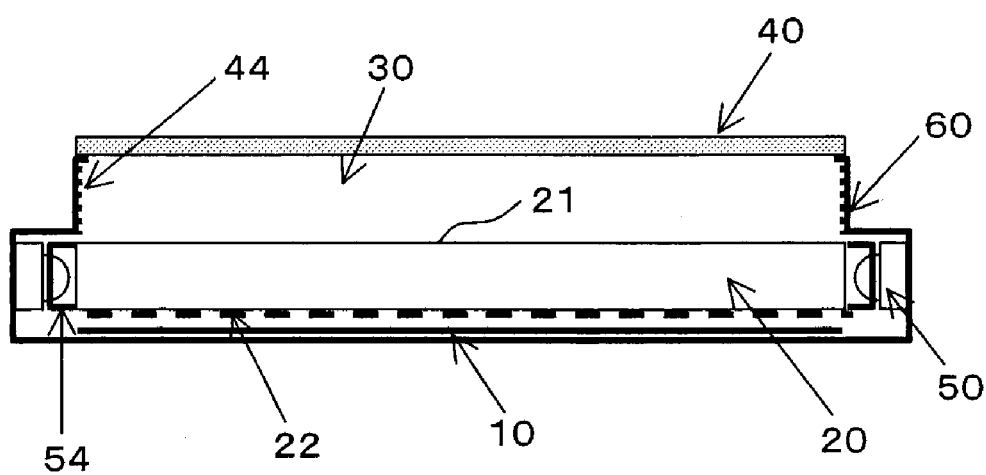
FIG. 13 shows a cross section depicting the configuration of the backlight unit according to example 12 of the first preferred embodiment of the present invention.

FIG. 13 shows the cross sectional configuration of a backlight unit according to example 12. As shown in FIG. 13, in the example, an LED circuit board has a compact configuration, and a housing 60 surrounds a light emission plane 21 of a light guide plate 20. A mirror reflection sheet 44 is attached to the surface corresponding to the side surface of an air space 30 along the inner surfaces of the housing 60. Accordingly, the light emitted from the light guide plate 20 to the air space 30 can be utilized with no loss. In addition, instead of the mirror reflection sheet 44, a diffusion reflection sheet may be used. Alternatively, the inner surface of the housing 60 itself may be a high reflecting mirror surface.

EXAMPLE 13

Figure 14A:
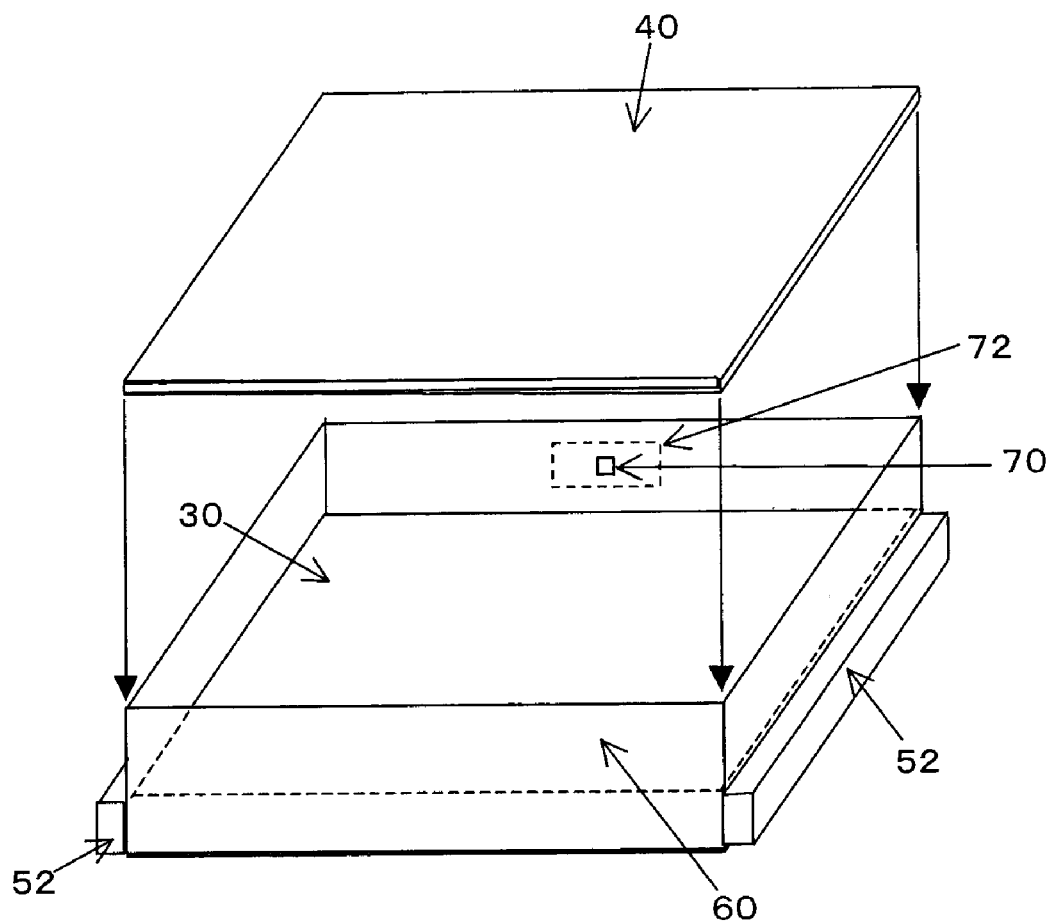
FIGS. 14A and 14B show diagrams depicting the configuration of the backlight unit according to example 13 of the first preferred embodiment of the present invention.

FIG. 14A shows an exploded perspective view depicting the configuration of a backlight unit according to example 13. As shown in FIG. 14A, a color sensor 70 is mounted near the center portion in the surface in which an LED module 52 is not built in the side surface covering an air space 30. The color sensor 70 is mounted on a sensor circuit board 72. The sensor circuit board 72 is mounted in such a way that the color sensor 70 is fit into an opening of the housing 60, the opening is formed to have substantially the same size as that of the color sensor 70. In addition, the position to mount the color sensor 70 is not limited thereto. In addition, the number of the color sensor 70 is not limited to one. A signal from the color sensor 70 conducts current control of an LED control portion for white balance control.

Figure 14B:
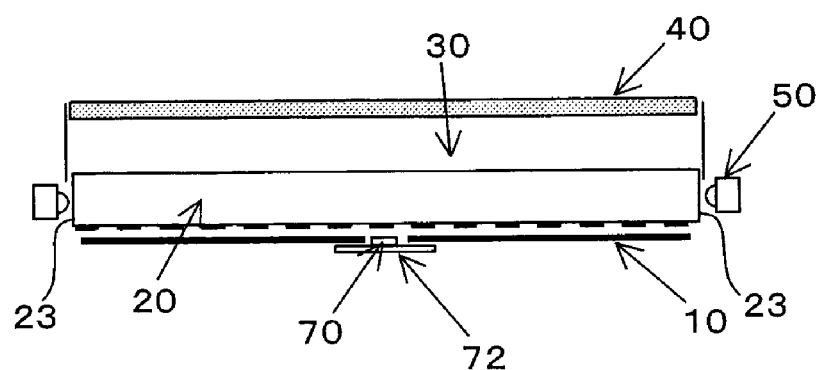

FIG. 14B shows a cross section depicting another configuration of the backlight unit according to the example. As shown in FIG. 14B, a color sensor 70 is placed on the back side of the light guide plate 20 as the sensor surface faces toward the light guide plate 20 side. The color sensor 70 is separated from an incident plane 23 to a sufficient degree to prevent the influence of color irregularities near the incident plane 23 in performing color control (for example, white balance control). For example, desirably, the color sensor 70 is separated from the incident plane 23 by about 10 mm or greater, preferably about 50 mm or greater.

EXAMPLE 14

Figure 15:
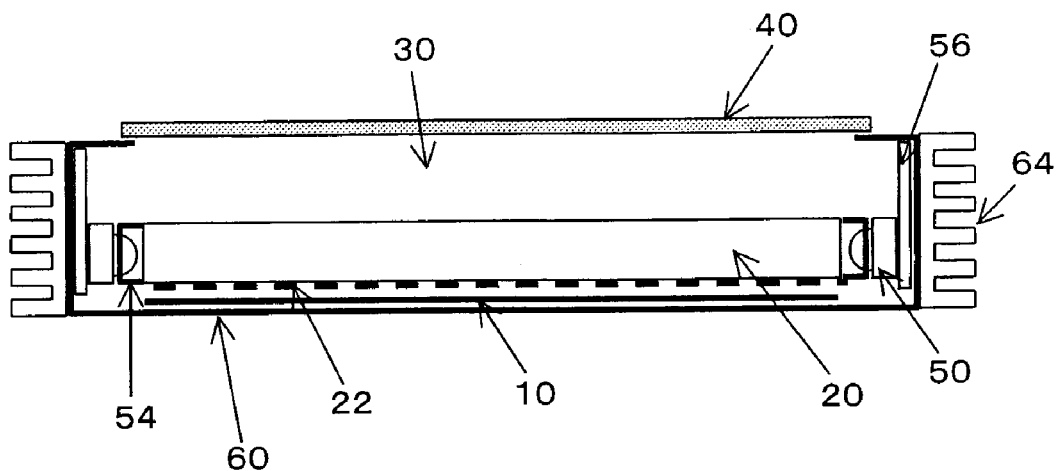
FIG. 15 shows a cross section depicting the configuration of the backlight unit according to example 14 of the first preferred embodiment of the present invention.

FIG. 15 shows the cross sectional configuration of a backlight unit according to example 14. As shown in FIG. 15, radiation fins (or a radiator plate) 64 are disposed on the back side of an LED circuit board 56 through a housing 60. Since the provision of the radiation fins 64 allow the heat generated in LEDs 50 to quickly escape out of the backlight unit, a reduction in the luminous efficiency caused by a temperature rise in the LEDs 50 can be prevented. On the radiation fins 64, a high heat radiating sheet may be attached, or a high heat radiating material may be coated.

EXAMPLE 15

Figure 16:
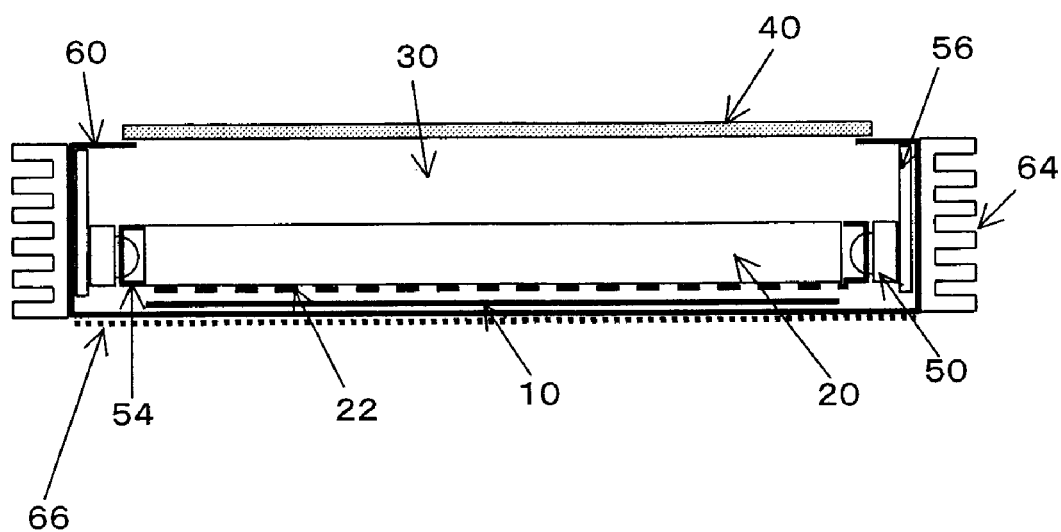
FIG. 16 shows a cross section depicting the configuration of the backlight unit according to example 15 of the first preferred embodiment of the present invention.

FIG. 16 shows the cross sectional configuration of a backlight unit according to example 15. As shown in FIG. 16, in the area corresponding to the back side of the light guide plate 20 in the outer surface of a housing 60, a high infrared emissivity sheet 66 is attached, or a high infrared emissivity sheet material is coated. Accordingly, the heat dissipation effect from the back side of the light guide plate 20 can be also enhanced.

EXAMPLE 16

Figure 17:
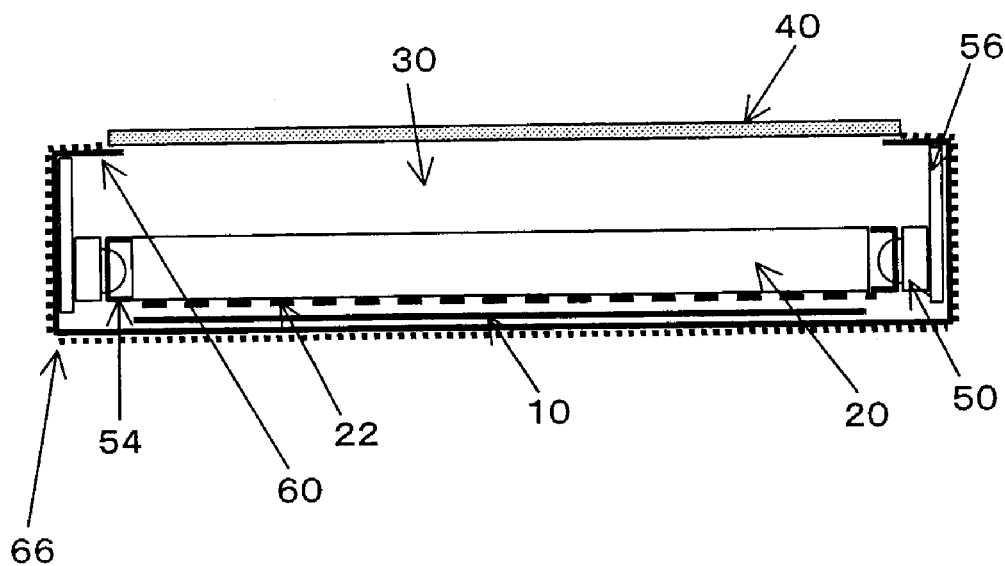
FIG. 17 shows a cross section depicting the configuration of the backlight unit according to example 16 of the first preferred embodiment of the present invention.

FIG. 17 shows the cross sectional configuration of a backlight unit according to example 16. As shown in FIG. 17, on substantially the entire outer surface of the housing 60, a high infrared emissivity sheet 66 is attached, or a high infrared heat emissivity material is coated thereon. Accordingly, the heat dissipation effect can be enhanced as well as the backlight unit can be more reduced in size than the configuration provided with the radiating fins 64 (see FIG. 16). The housing 60 may be formed of a high infrared heat emissivity member.

EXAMPLE 17

Figure 18:
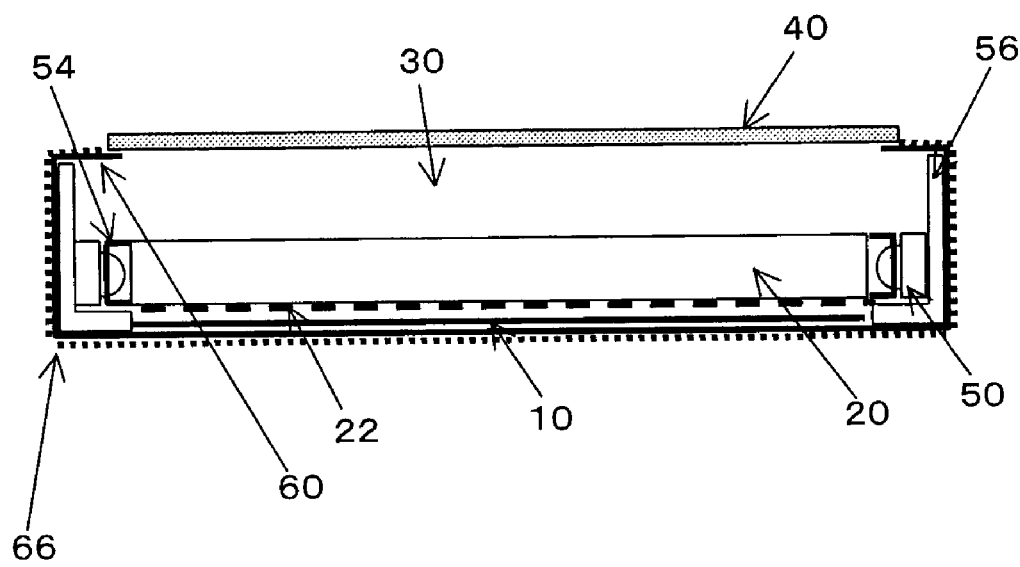
FIG. 18 shows a cross section depicting the configuration of the backlight unit according to example 17 of the first preferred embodiment of the present invention.

FIG. 18 shows the cross sectional configuration of a backlight unit according to example 17. As shown in FIG. 18, an LED circuit board 56 has a substantially L-shaped cross section. The LED circuit board 56 is closely contacted with the side surface portion and the bottom portion of a housing 60. Accordingly, the substrate area of the LED circuit board 56 in which the heat from LEDs 50 is transferred by heat conduction is increased, and heat can be directly transferred from the LED circuit board 56 to the housing 60 on the back side of a light guide plate 20. Thus, the heat generated in the LEDs 50 can be efficiently released to outside.

EXAMPLE 18

Figure 19:
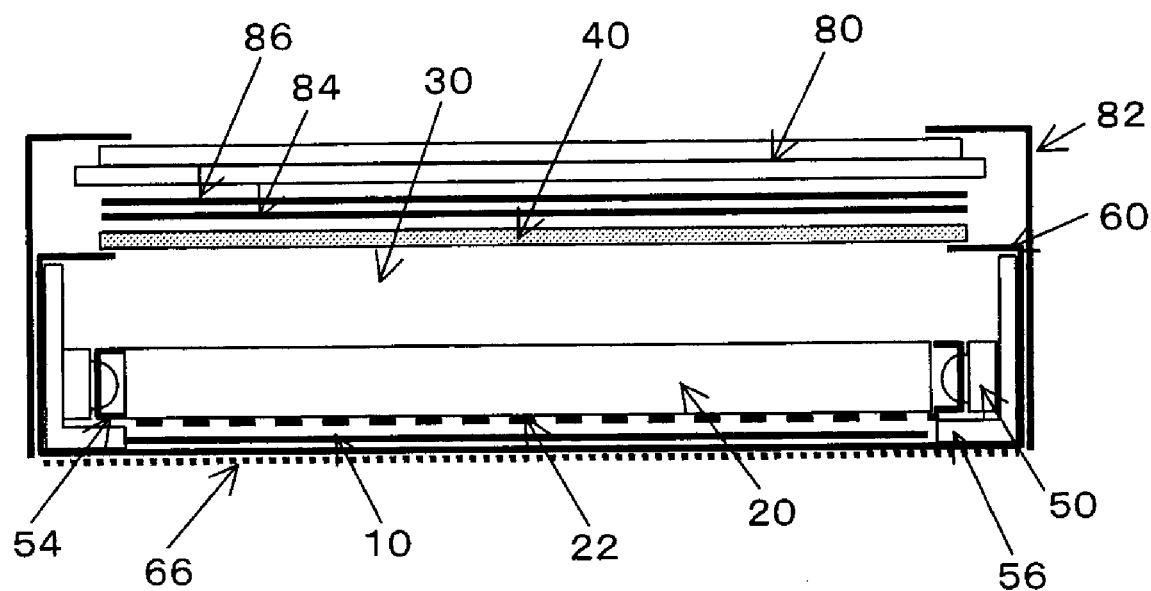
FIG. 19 shows a cross section depicting the configuration of the liquid crystal display device according to example 18 of the first preferred embodiment of the present invention.

FIG. 19 shows the cross sectional configuration of a liquid crystal display device according to example 18. As shown in FIG. 19, the liquid crystal display device has the backlight unit according to any one of the examples 1 to 17. On a diffuser 40, optical sheets such as a lens sheet 84 (for example, a Brightness Enhancement Film produced by Minnesota Mining & Manufacturing Co.) and a polarizer sheet 86 (for example, a Dual Brightness Enhancement Film produced by Minnesota Mining & Manufacturing Co.) are disposed. The optical sheets are not limited to those described above, which can be used in various combinations as necessary. On the optical sheets, a liquid crystal display panel 80 is disposed. In addition, a cover 82 is mounted which covers the frame area of the liquid crystal display panel 80.

EXAMPLE 19

Figure 20A:
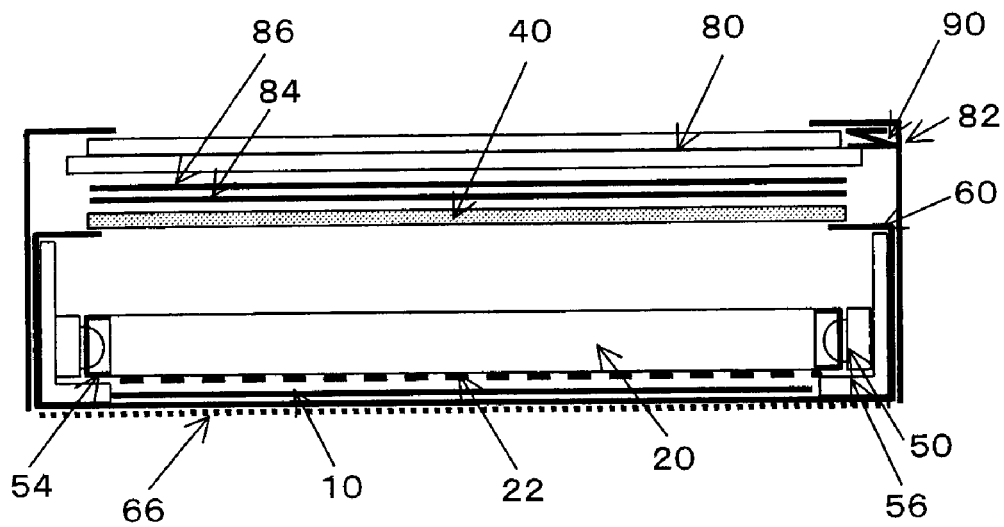
FIGS. 20A to 20D show diagrams depicting the configuration of the liquid crystal display device according to example 19 of the first preferred embodiment of the present invention.
Figures 20B, 20C:
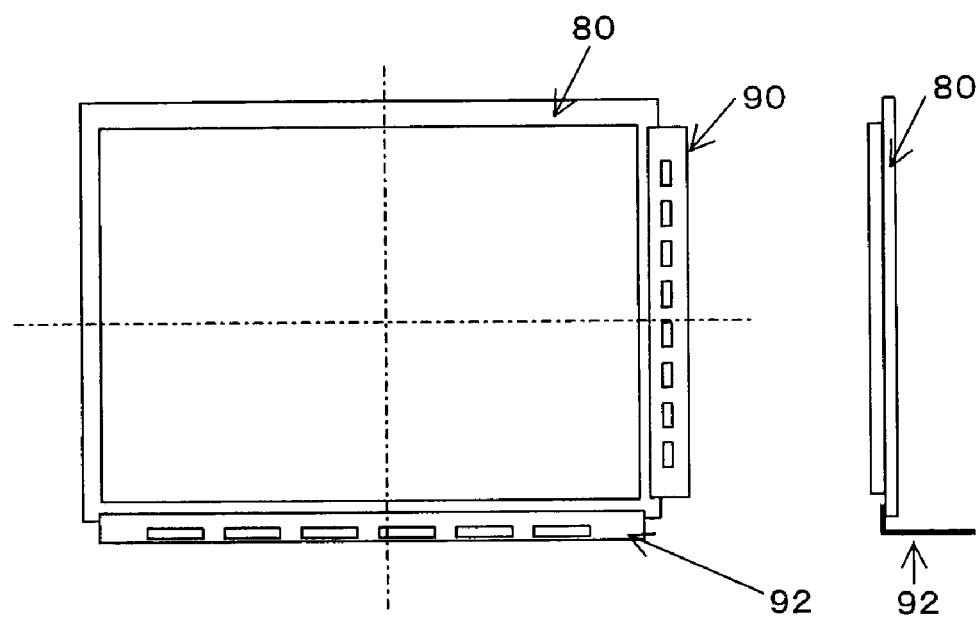
Figure 20D:

FIG. 20A shows the configuration of a liquid crystal display device according to example 19. FIG. 20B shows the configuration of a liquid crystal display panel 80 on which a driver is mounted, FIG. 20C shows the cross sectional configuration of the liquid crystal display panel 80 which is cut in parallel with the data bus, and FIG. 20D shows the cross sectional configuration of the liquid crystal display panel 80 which is cut in parallel with the scan bus line. As shown in FIGS. 20A to 20D, on the liquid crystal display panel 80, a data driver and a scan driver for driving liquid crystals at every pixel are mounted through a flexible substrate or a printed circuit board. The scan driver is disposed on the side on which LEDs 50 are arranged. When the liquid crystal display panel 80 is incorporated in a backlight unit, a scan driver flexible substrate 90 on which the scan driver is mounted is folded and housed in the space above the LEDs 50 and an LED circuit board 56. Accordingly, since the scan driver flexible substrate 90 is not disposed on the back side of the LED circuit board 56, heat can be easily dissipated from the side surface of the backlight unit. On the other hand, the data driver is disposed on the side on which the LEDs 50 are not arranged. Therefore, a data driver flexible substrate 92 on which the data driver is mounted is housed so as to cover the side surface of the light guide plate 20. Although not shown in the drawings, radiation fins may be disposed on the side surface of the backlight unit on the back side of the LED circuit board 56. In addition, in the example, it is the configuration in which the LEDs 50 are arranged on the scan driver side. However, in the case of the configuration in which the LEDs 50 are arranged on the data driver side, the data driver flexible substrate 92 may be folded.

EXAMPLE 20

Figure 21:
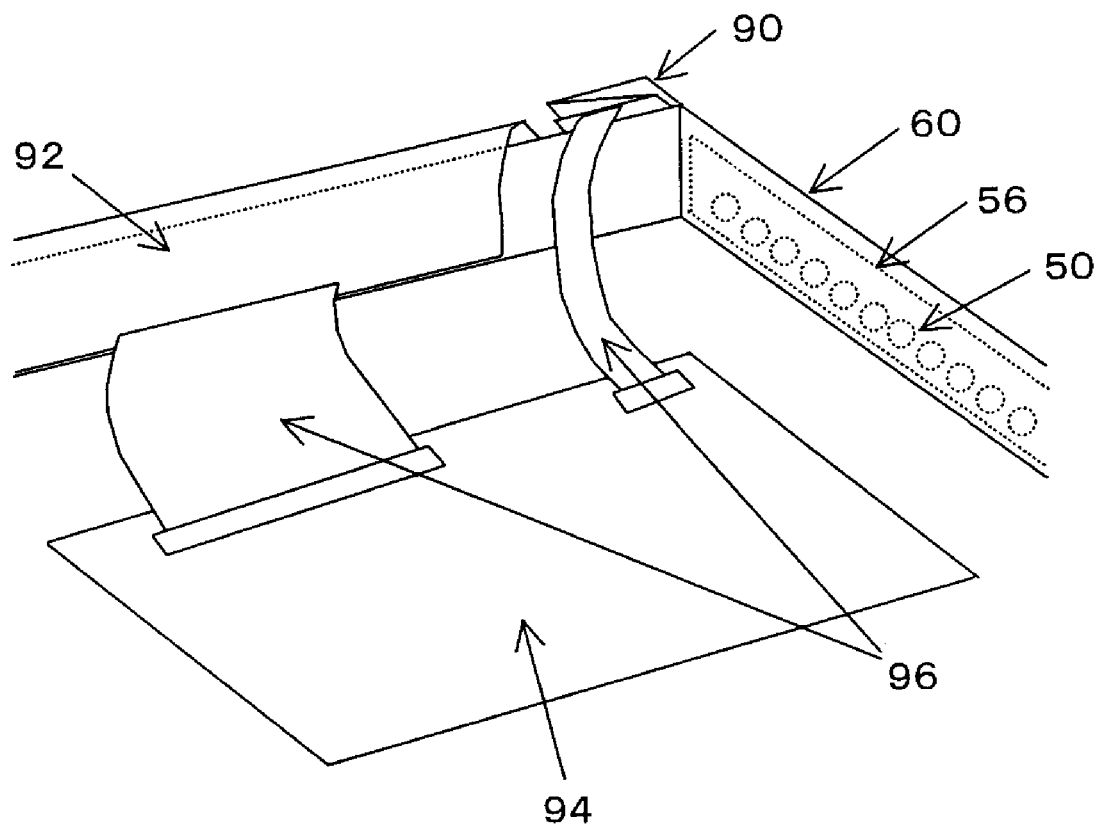
FIG. 21 shows a perspective view depicting the configuration of the liquid crystal display device according to example 20 of the first preferred embodiment of the present invention.

FIG. 21 shows a perspective view depicting the configuration of a liquid crystal display device according to example 20. As shown in FIG. 21, in the example, in addition to the configuration according to example 19, a scan driver flexible substrate 90 is connected to a control circuit board 94 by a flexible flat cable 96 which is routed from the scan driver flexible substrate 90 to the side surface side on the data driver side. Accordingly, since the flexible flat cable 96 does not cover the back side of an LED circuit board 56, heat can be easily dissipated from the side surface of the backlight unit.

EXAMPLE 21

Figure 22A:
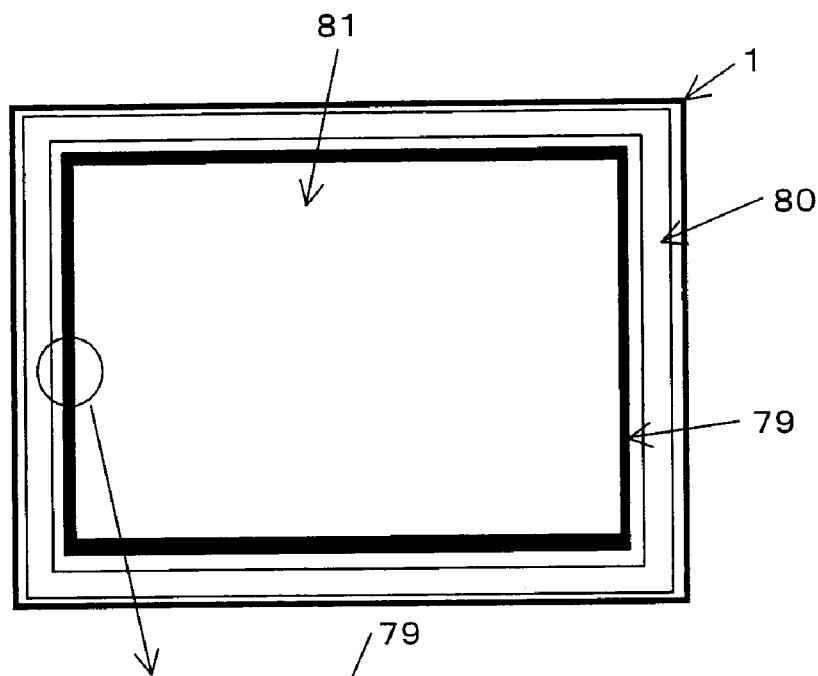
FIGS. 22A to 22C show diagrams depicting the configuration of the liquid crystal display device according to example 21 of the first preferred embodiment of the present invention.
Figure 22B:
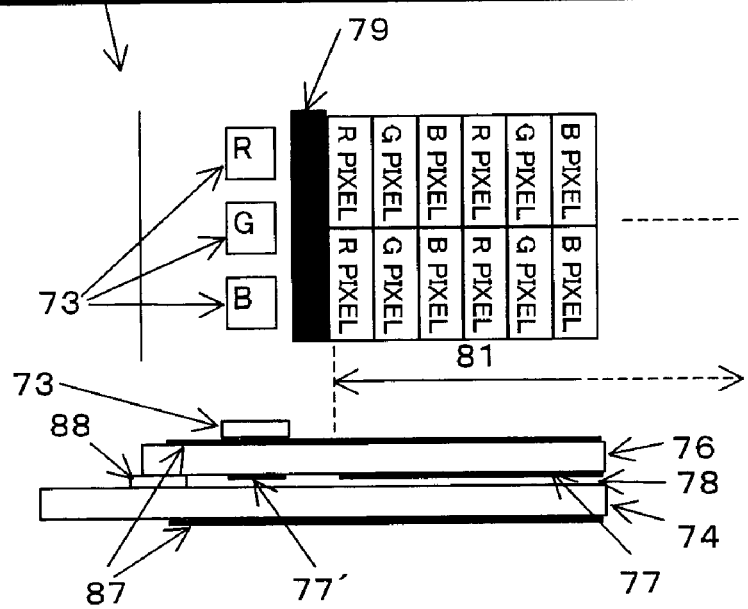
Figure 22C:
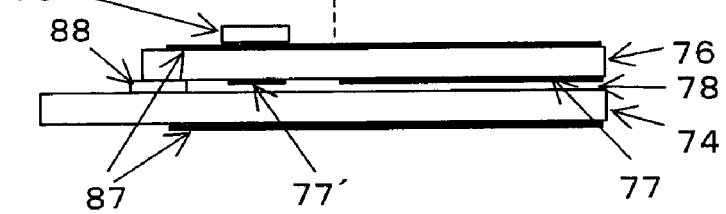

FIGS. 22A to 22C show the configuration of a liquid crystal display device according to example 21. FIG. 22A shows the configuration of the liquid crystal display device, and FIG. 22B shows the liquid crystal display device partially enlarged. FIG. 22C shows the cross sectional configuration of the liquid crystal display device. As shown in FIGS. 22A to 22C, the liquid crystal display device has a TFT substrate 74 on which a thin film transistor (TFT) is formed for every pixel, a counter substrate 76 on which a color filter (CF) layer 77 is formed, and a liquid crystal layer 78 which is sealed between the TFT substrate 74 and the counter substrate 76. On the outer surfaces of the TFT substrate 74 and the counter substrate 76, a pair of polarizers 87 is disposed in crossed nicol. In addition, the liquid crystal display device has a frame-shaped black matrix (BM) 79 outside a display area 81.

In the area between the outside of the BM 79 and the inside of a sealing material 88, three areas are provided in which red, green, and blue light are emitted, respectively. In each of the areas, a CF layer 77' (red, green and blue) is formed. The CF layer 77' (red, green, and blue) is formed of the same materials as those of the CF layer 77 (red, green, and blue) formed in the display area 81. In addition, in each of the areas, outside the polarizers 87 on the counter substrate 76 side (on the viewer side), a light quantity sensor 73 is arranged. To the liquid crystal layer 78 in each of the areas, a predetermined voltage is applied all the time (for example, the same voltage as that of a white display in the display area 81). Accordingly, the light quantity can be measured for each of red, green, and blue lights in almost the same state as a white display in the display area 81. The signals of the light quantities measured at individual light quantity sensors 73 are outputted to a control portion held by the backlight unit. The control portion controls the drive conditions of LEDs 50 such that the light quantities of red, green, and blue lights have a predetermined light quantity balance. Accordingly, white balance in the display area 81 can be adjusted properly.

Figures 23A, 23B:
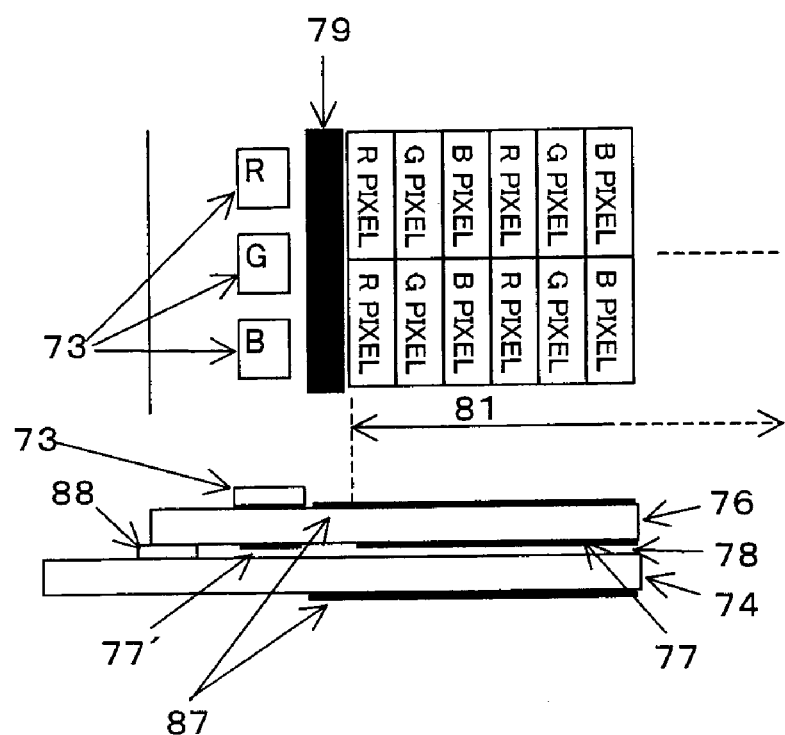
FIGS. 23A and 23B show diagrams depicting another configuration of the liquid crystal display device according to example 21 of the first preferred embodiment of the present invention.

FIGS. 23A and 23B show another configuration of the liquid crystal display device according to the example. FIG. 23A shows the liquid crystal display device partially enlarged, and FIG. 23B shows the cross sectional configuration of the liquid crystal display device. As shown in FIGS. 23A and 23B, polarizers 87 are not disposed in the area in which light quantity sensors 73 are disposed. To a liquid crystal layer 78 in each of the areas, a predetermined voltage is applied all the time (for example, the same voltage as that of a white display in a display area 81). Accordingly, the light quantities of red, green, and blue lights can be measured. The drive conditions of LEDs 50 are controlled in such a way that the measured light quantities of red, green, and blue lights have a predetermined light quantity balance, whereby a white balance in the display area 81 can be adjusted. In the configuration shown in FIG. 23, the white balance is adjusted with no influence of the wavelength dependency of the polarizers 87. When adjustment is done in consideration of the influence in advance, the adjustment can be done at almost the same accuracy as that of the configuration shown in FIG. 22.

EXAMPLE 22

Figure 24A:
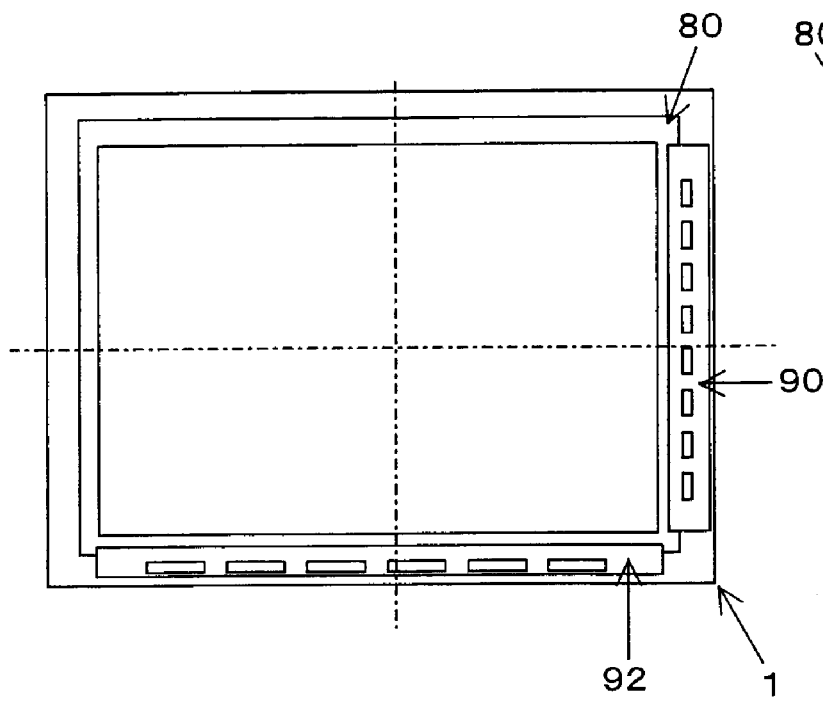
FIGS. 24A to 24C show diagrams depicting the configuration of the liquid crystal display device according to example 22 of the first preferred embodiment of the present invention.
Figure 24B:
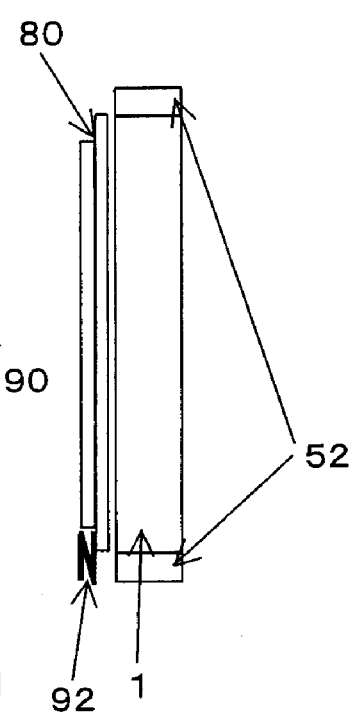
Figure 24C:
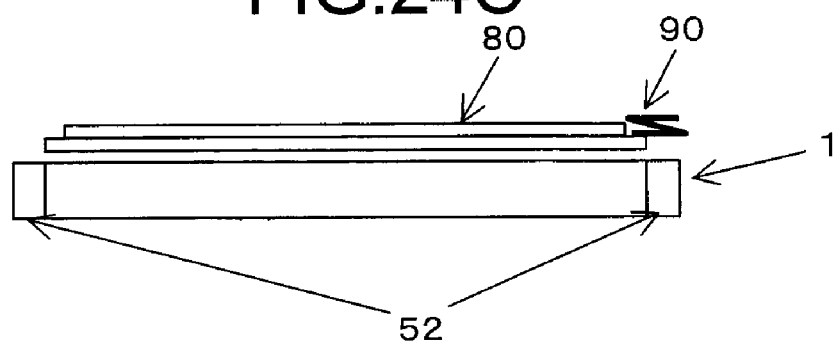

FIG. 24A shows the configuration of a liquid crystal display device according to example 22. FIG. 24B shows the cross sectional configuration of the liquid crystal display device which is cut in parallel with a data bus line, and FIG. 24C shows the cross sectional configuration of the liquid crystal display device which is cut in parallel with a scan bus line. As shown in FIGS. 24A to 24C, an LED module (light source portion) 52 is disposed near four side end surfaces of a light guide plate 20. Each of LEDs 50 of the LED module 52 is arranged in the direction along the long side of the side end surfaces of the light guide plate 20. Since a backlight unit according to the example can be mounted with the largest number of the LEDs 50 as the side lit backlight unit, a backlight of the highest luminance can be implemented.

The liquid crystal display device has a data driver and a scan driver. The data driver and the scan driver are positioned above where the LEDs 50 are mounted. Thus, a data driver flexible substrate 92 and a scan driver flexible substrate 90 are folded and housed near and above the LED module 52. Thus, cooling the LEDs 50 is not hampered, and the heat flow from the LEDs 50 to the driver side can be avoided. Accordingly, the liquid crystal display device can be reduced in size as well as the lifetime of the LEDs 50 and the driver IC can be prolonged.

FIG. 25A shows another configuration of the liquid crystal display device according to the example. FIG. 25B shows the cross sectional configuration of the liquid crystal display device which is cut in parallel with a data bus line, and FIG. 25C shows the cross sectional configuration of the liquid crystal display device which is cut in parallel with a scan bus line. As shown in FIGS. 25A to 25C, a data driver and a scan driver are disposed on two adjacent end sides of a liquid crystal display panel 80, and LEDs are arranged near two side end surfaces of a light guide plate 20 corresponding to another two end sides different from those two end sides. Accordingly, since a data driver flexible substrate 92 and a scan driver flexible substrate 90 can be disposed along the side surface of the backlight unit, the liquid crystal display device can be reduced in size. In addition, since an LED module 52 is not covered with the data driver flexible substrate 92 and the scan driver flexible substrate 90, cooling the LEDs 50 is not hampered. In addition, the LCD is provided in which the LED mounting portion is disposed above, whereby the heat dissipation effect of the LEDs can be enhanced.

EXAMPLE 23

Figure 26:
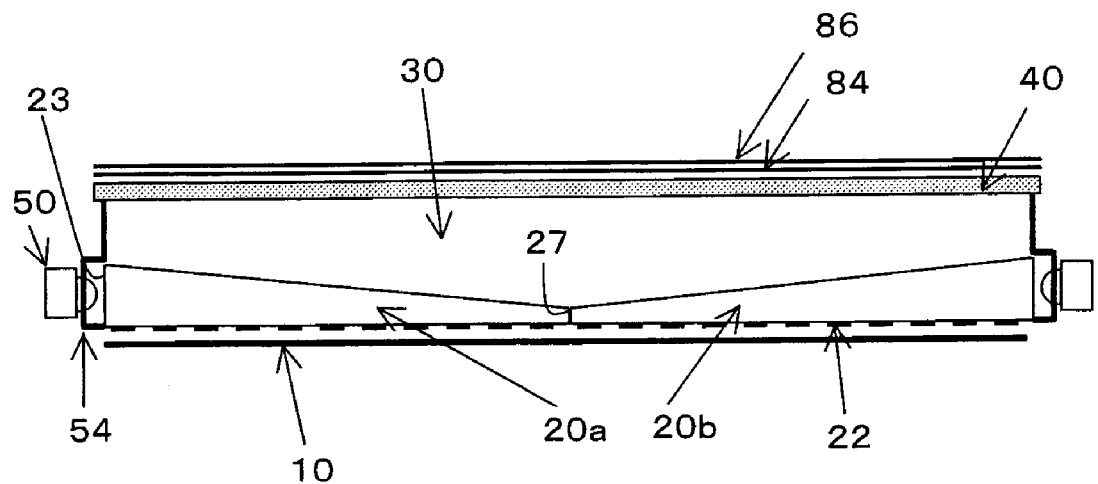
FIG. 26 shows a cross section depicting the configuration of the backlight unit according to example 23 of the first preferred embodiment of the present invention.

FIG. 26 shows the cross sectional configuration of a backlight unit (and optical sheets) according to example 23. As shown in FIG. 26, the backlight unit has two light guide plates 20a and 20b. The two light guide plates 20a and 20b are arranged such that opposing surfaces 27 facing an incident plane 23 are abutted against each other. The light guide plates 20a and 20b have a wedge shape which is thick on the incident plane 23 side and thin on the opposing surface 27 side. For example, the emission plane of LEDs 50 is about 6 mm in diameter, and the thickness on the incident plane 23 side of the light guide plates 20a and 20b is about 6 mm to about 8 mm. Accordingly, the light emitted from the LEDs 50 efficiently enters the light guide plates 20a and 20b. The thickness on the opposing surface 27 side is about 1 mm. Since the thickness of the light guide plates 20a and 20b are reduced while the light having entered the light guide plates 20a and 20b is being guided, the light quantity that is emitted from the opposing surfaces 27 and comes out of the light guide plates 20a and 20b is significantly small. This slight amount of light emitted from the opposing surfaces 27 enters the other light guide plates 20b and 20a, which contributes to the luminance of the backlight although it is small contribution. In the structure according to the examples (for example, example 1) described so far, the light having reached the opposing surface 27 enters the other LEDs 50 disposed on the opposing surface 27 side. On this account, the ratio of rays to be again returned to a light guide plate 20 is small, causing a loss in the light quantity. In the configuration according to the example, since the light quantity passing through the opposing surfaces 27 is greatly reduced, the efficiency to use the light can be improved.

Figure 27:
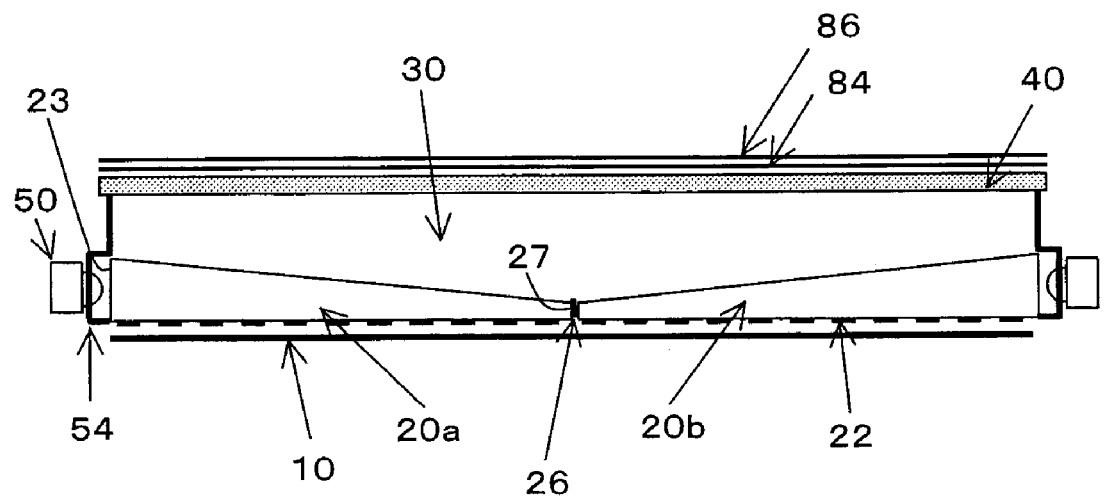
FIG. 27 shows a cross section depicting another configuration of the backlight unit according to example 23 of the first preferred embodiment of the present invention.

FIG. 27 shows another configuration of the backlight unit according to the example. As shown in FIG. 27, a double-sided reflection sheet (or a double-sided diffusion reflection sheet) 26 is sandwiched in the portion in which light guide plates 20a and 20b face each other. In comparison with the configuration shown in FIG. 26 in which the light guide plates 20a and 20b are directly pressed and contacted with each other, the double-sided reflection sheet 26 functions as a cushioning material, whereby cracks and fractures can be prevented from being generated caused by vibrations and drops. In addition, the light reflected and returned from the double-sided reflection sheet 26 is taken out of scatter dots 22 while the light is being guided in the light guide plates 20a and 20b, whereby the efficiency of using the light can be improved.

Figure 28:
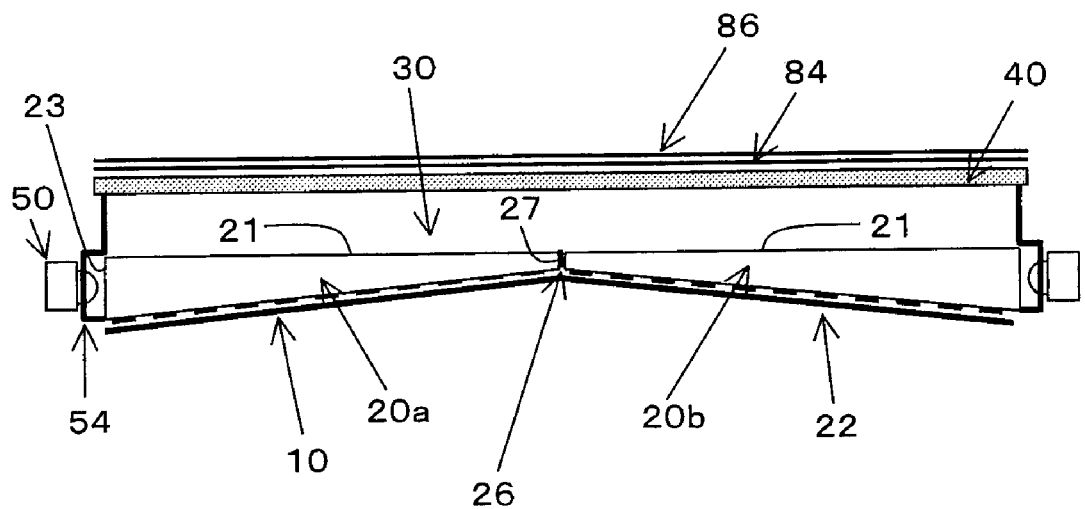
FIG. 28 shows a cross section depicting yet another configuration of the backlight unit according to example 23 of the first preferred embodiment of the present invention.

FIG. 28 shows still another configuration of the backlight unit according to the example. As shown in FIG. 28, light guide plates 20a and 20b are arranged in such a way that light emission planes 21 thereof are in the same plane. Accordingly, the distance between light emission planes 21 of the light guide plates 20a and 20b and a diffuser 40 (the thickness of an air space 30) is made constant, whereby the minimum distance required (the thickness) can be established. When the distance is made long, the luminance of the backlight drops. Therefore, the configuration has the effect of suppressing a luminance drop more than the configurations shown in FIGS. 26 and 27.

Figure 29:
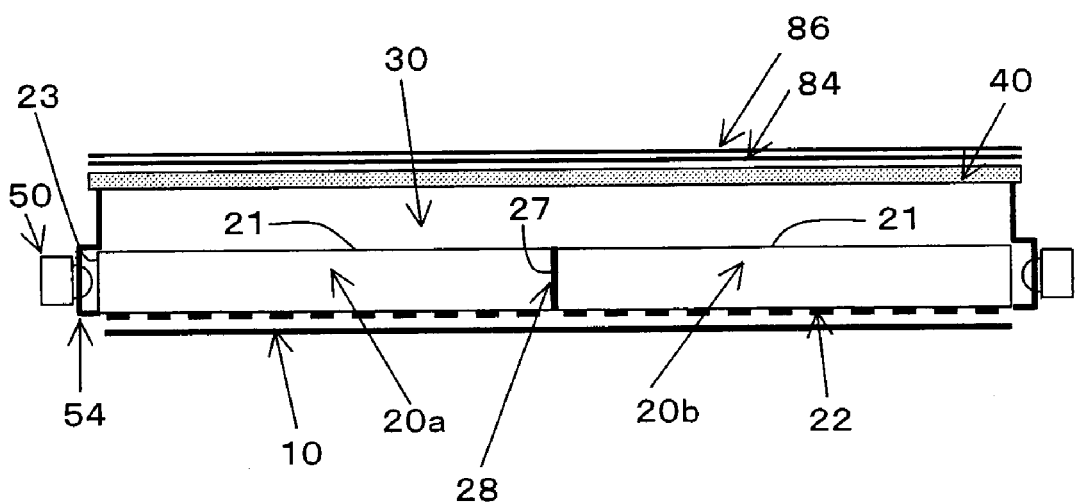
FIG. 29 shows a cross section depicting still yet another configuration of the backlight unit according to example 23 of the first preferred embodiment of the present invention.

FIG. 29 shows yet another configuration of the backlight unit according to the example. As shown in FIG. 29, two light guide plates 20a and 20b have a parallel plate shape, not a wedge shape. A double-sided diffusion reflection sheet 28 is sandwiched between the two light guide plates 20a and 20b. Therefore, since the light returning from the opposing surface 27 is diffused, the light is easily mixed with the light from the other LEDs 50. Accordingly, the color consistency of the backlight unit can be improved.

EXAMPLE 24

Figure 30:
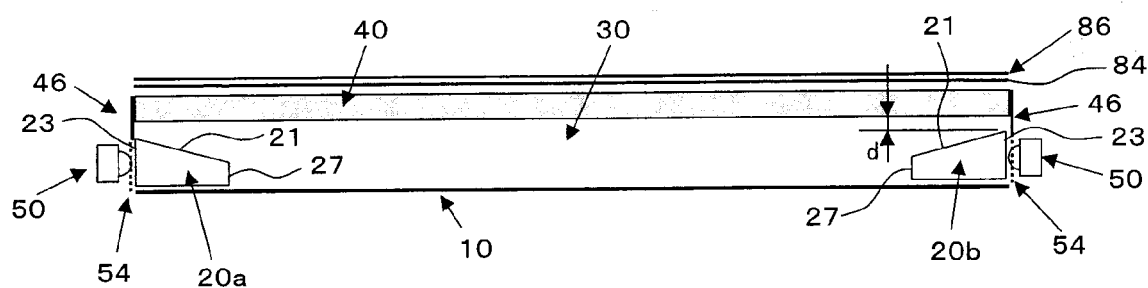
FIG. 30 shows a cross section depicting the configuration of the backlight unit according to example 24 of the first preferred embodiment of the present invention.

FIG. 30 shows the cross sectional configuration of a backlight unit (and optical sheets) according to example 24. As shown in FIG. 30, the backlight unit has two light guide plates 20a and 20b. The two light guide plates 20a and 20b are disposed as a predetermined space provided between an opposing surface 27 facing to an incident plane 23. The light guide plates 20a and 20b have a wedge shape which is thick on the incident plane 23 side and thin on the opposing surface 27 side. In the light guide plates 20a and 20b, a light emission plane 21 is tilted at a predetermined angle with respect to the incident plane of a diffuser 40 and the plane facing to the light emission plane 21 are disposed almost in parallel. The light emission planes 21 of the light guide plates 20a and 20b are disposed at a predetermined distance d from the diffuser 40. In addition, on both end portions of the diffuser 40, a mirror reflector 46 is disposed. Accordingly, the light emitted from the light guide plates 20a and 20b to the air space 30 can be used with no loss.

Figures 31A, 31B:
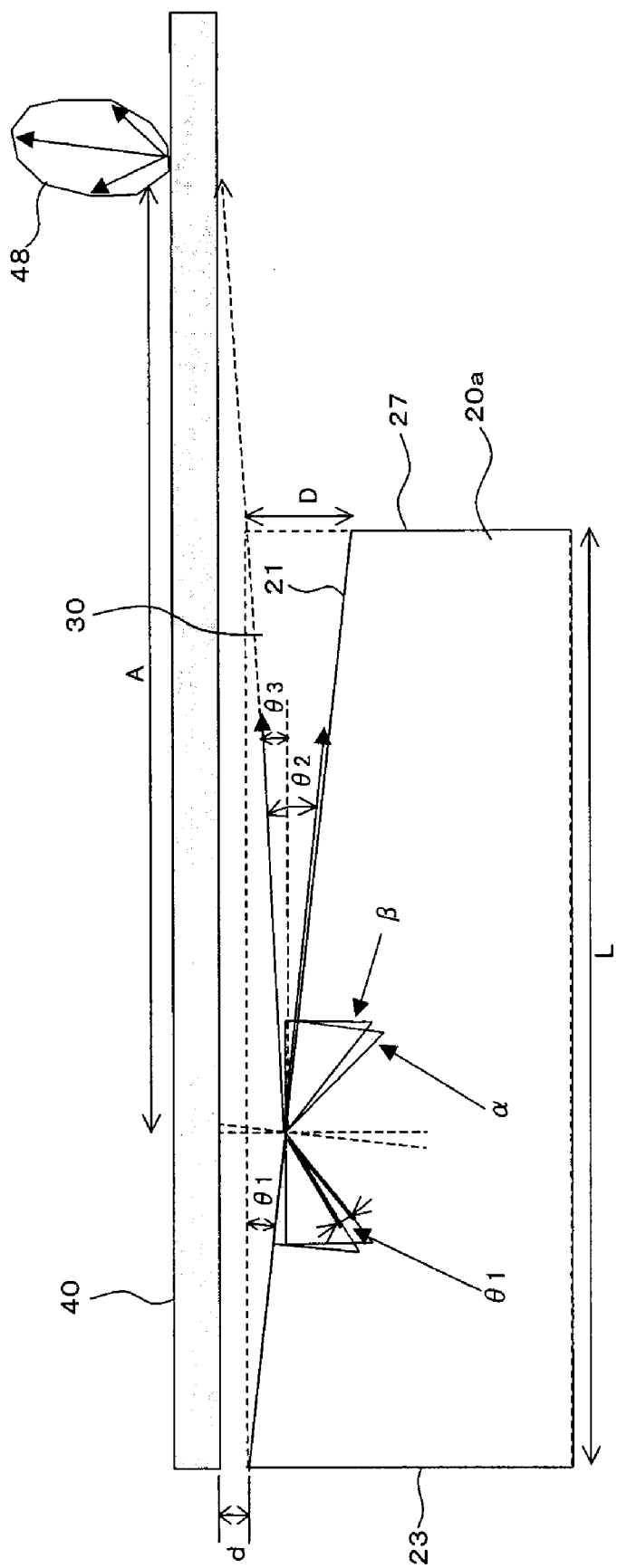
FIGS. 31A and 31B show a cross section depicting the configuration of the backlight unit according to example 24 of the first preferred embodiment of the present invention and a table of the taper angle, respectively.

FIG. 31A shows the vicinity of the light guide plate 20a as it is enlarged. The area indicated by α in the drawing depicts the guided light range when the light emission plane 21 is tilted at a predetermined angle (a taper angle θ1). The area indicated by β in the drawing depicts the guided light range when the light emission plane 21 is not tilted (the taper angle θ1=0°). Since the light emission plane 21 is tilted at the taper angle θ1, the light having entered the light guide plate 20a is partially emitted from the light emission plane 21. For example, the light emitted from the light emission plane 21 at an emission angle θ3 directly enters the diffuser 40. The light emitted at an angle other than the emission angle θ3 in time enters the diffuser 40 as it is reflected by a reflector 10 (not shown in FIG. 31) and the other members. The light emitted at the emission angle θ3 travels as it is spread in the air space 30, and the degree of the spread is decided in accordance with a distance d from the diffuser 40.

LEDs 50 are configured in which a plurality of single color LEDs in red, green, and blue are arranged. The distance d between the light emission plane 21 and the diffuser 40 is decided in such a way that the red light, the green light, and the blue light are mixed with one another while they are traveling in the air space 30 between the diffuser 40 and the light guide plate 20a and they fall in the range of predetermined color irregularities. As shown in FIG. 31B, for example, in the case of a taper angle θ1=5°, in order to set a distance A between the position at which the light is emitted from the light emission plane 21 and the position at which a light 48 is emitted from the diffuser 40 to about 46 mm, the distance d may be about 2 mm. In addition, in order to set the distance A to about 46 mm in the case of the taper angle θ1=10°, the distance d may be about 4 mm.

In addition, for the light that is guided along the light guide plate 20a and emitted from the opposing surface 27, when a length L from the incident plane 23 of the light guide plate 20a to the opposing surface 27 is formed in 50 mm or longer, for example, the red light, the green light, and the blue light are sufficiently mixed with one another in the light guide plate 20a. Thus, the light emitted from the opposing surface 27 has excellent whiteness. The light emitted from the opposing surface 27 enters the diffuser 40 as the light is reflected by the reflector 10 and the other peripheral members.

Figure 32:
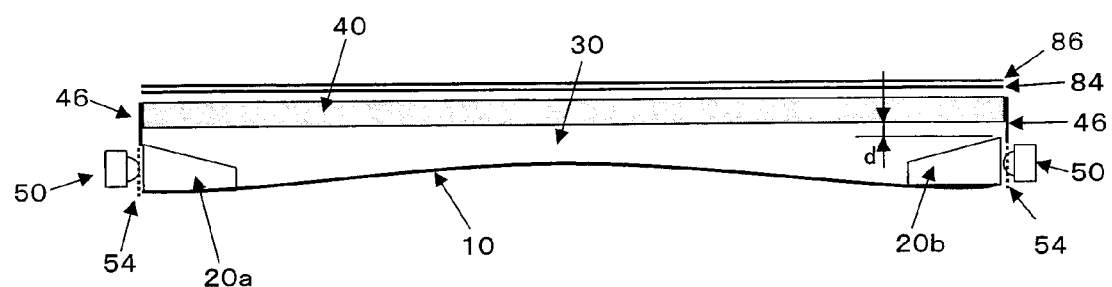
FIG. 32 shows a cross section depicting another configuration of the backlight unit according to example 24 of the first preferred embodiment of the present invention.

FIG. 32 shows another configuration of the backlight unit according to the example. As shown in FIG. 32, a reflector 10 preferably has a projected shape so that the distance from a diffuser 40 is the minimum near the center in the plane. When this is done, the luminance of the backlight unit has the distribution in which the luminance is the maximum in the center of the screen and drops closer to the peripheral portion. As described above, the shape of the reflector 10 is changed to control the consistency of the light quantity emitted from the diffuser 40. In addition, the backlight unit according to the example may or may not have a lens sheet 84 and a polarizer sheet 86 disposed on the light emission plane side of the diffuser 40.

EXAMPLE 25

Figure 33:
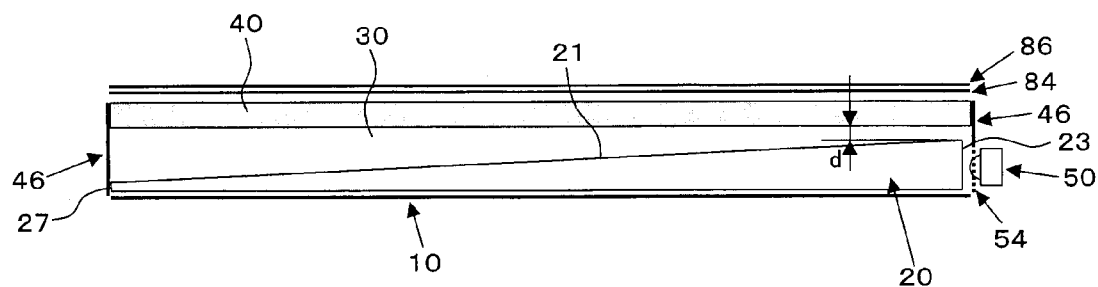
FIG. 33 shows a cross section depicting the configuration of the backlight unit according to example 25 of the first preferred embodiment of the present invention.

FIG. 33 shows the cross sectional configuration of a backlight unit (and optical sheets) according to example 25. As shown in FIG. 33, the backlight unit has LEDs 50 near one side surface of a light guide plate 20. The light guide plate 20 has a wedge shape which is thick on the incident plane 23 side and thin on the opposing surface 27 side. The light guide plate 20 preferably has almost the same length as that of a reflector 10. The taper angle of the light emission plane 21 and the distance d from the diffuser 40 are established based on the similar concepts as those in example 24. Accordingly, the backlight unit according to this example can obtain the similar advantage as that of the backlight unit according to example 24.

Figure 34:
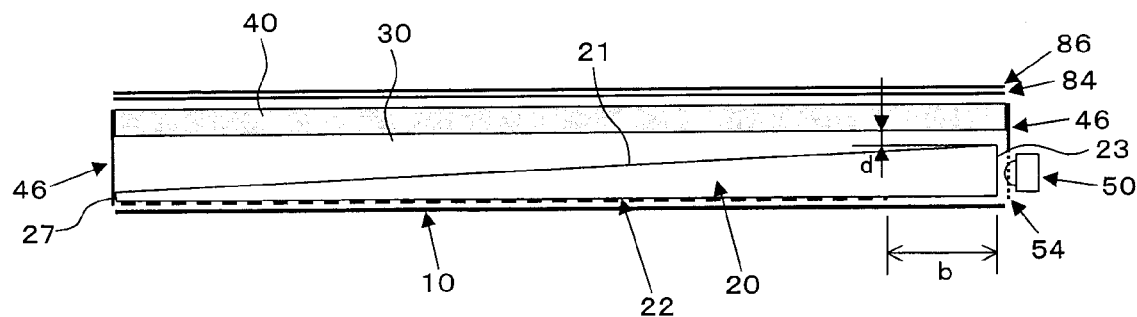
FIG. 34 shows a cross section depicting another configuration of the backlight unit according to example 25 of the first preferred embodiment of the present invention.

FIG. 34 shows another configuration of the backlight unit according to the example. As shown in FIG. 34, a light guide plate 20 is disposed in such a way that the printed surface of scatter dots 22 faces the reflector 10 side. The light guide plate 20 may have fine projecting portions in projections and recesses as a member to change the light guiding conditions instead of the scatter dots 22 (see FIG. 5). The light that is emitted from a light emission plane 21 and enters a diffuser 40 includes the light that is guided in the light guide plate 20 and impinged on the scatter dots 22 to be out of the light guiding conditions, in addition to the light emitted in accordance with the light guiding conditions. Accordingly, the improvement in the efficiency to take the light out of the light guide plate 20 can be achieved. Furthermore, the scatter dots 22 are properly designed to easily control the in-plane distribution of the light emitted from a diffuser 40.

Additionally, in the area at a predetermined distance b from the incident plane 23 (for example, about 10 mm to about 50 mm), the red light, the green light, and the blue light incident from the incident plane 23 are not mixed with one another sufficiently. On this account, when the scatter dots 22 or the fine projecting portions are formed in this area, the light is taken out of the area, and the area is visually recognized as color irregularities. Then, when the scatter dots 22 or the fine projecting portions are used as the member to change the light guiding conditions, the scatter dots 22 or the fine projecting portions are not provided in the area at the predetermined distance b from the incident plane 23. Accordingly, color irregularities can be reduced to the extent that a problem is hardly caused.

EXAMPLE 26

Figure 35:
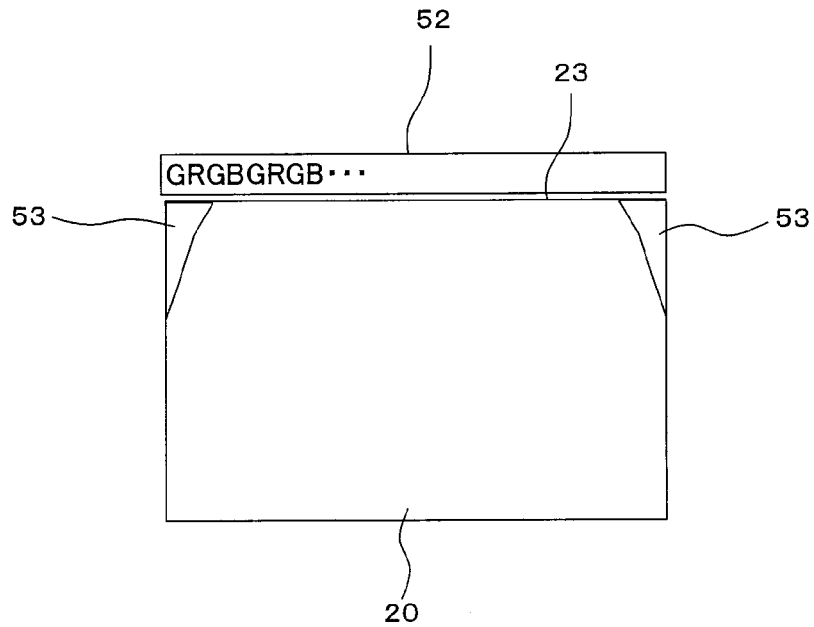
FIG. 35 shows a diagram depicting the configuration of the conventional backlight unit.

FIG. 35 shows the configuration of a conventional backlight unit. As shown in FIG. 35, in the vicinity of an incident plane 23 of a light guide plate 20, from the left in the drawing, a plurality of green LEDs 50 (G), red LEDs 50 (R), green LEDs 50 (G) and blue light LEDs 50 (B) are arranged in this order. When the LEDs 50 are arranged in this order, color irregularities 53 tend to be generated near both end portions of the incident plane 23. In order to reduce the color irregularities 53, the inventors discovered that the LEDs 50 in red, green, and blue are closely adjacent to one another as much as possible near both end portions of the incident plane 23.

Figure 36A:
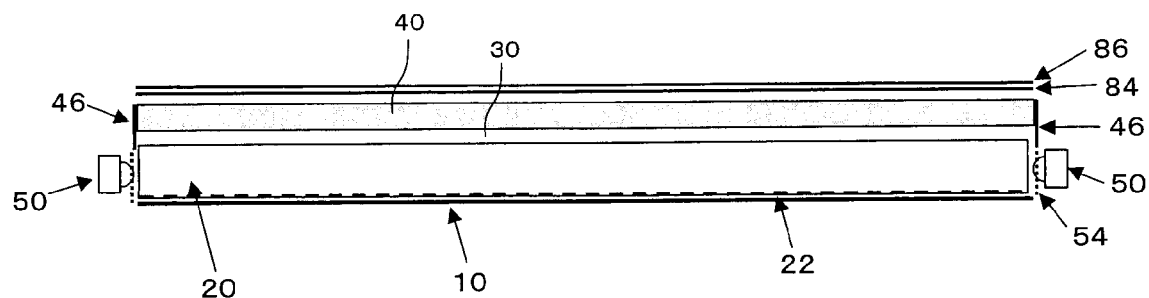
FIGS. 36A and 36B show a cross section and as seen in a normal direction, respectively, depicting the configuration of the backlight unit according to example 26 of the first preferred embodiment of the present invention.
Figure 36B:
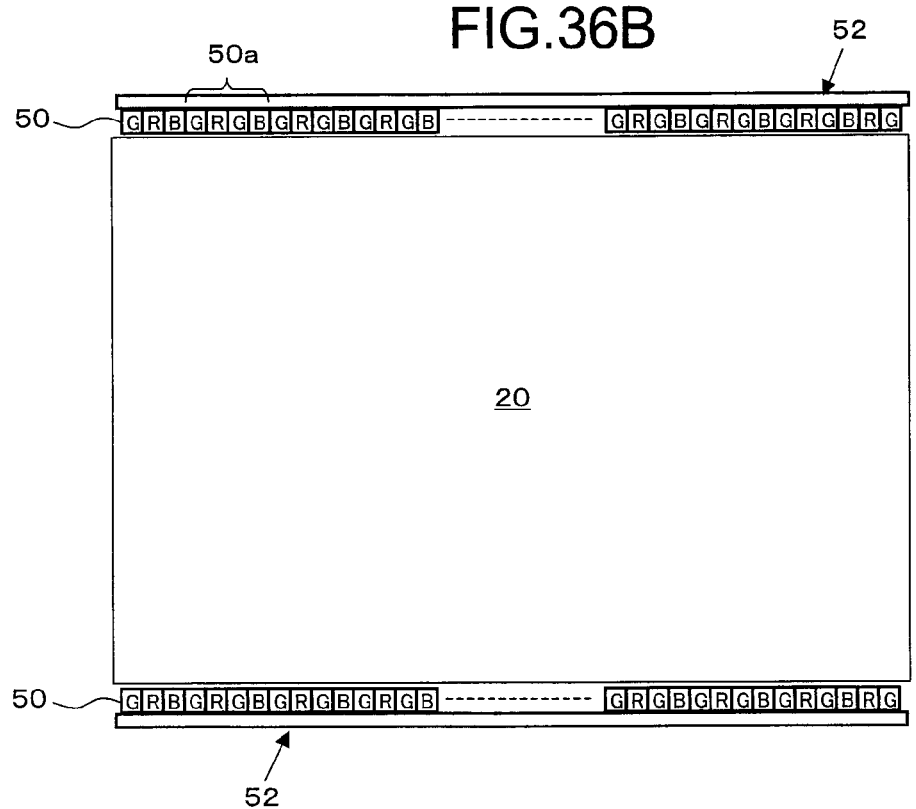

FIGS. 36A and 36B show the configuration of a backlight unit according to example 26. FIG. 36A shows the cross sectional configuration of the backlight unit (and optical sheets). FIG. 36B shows the configuration of the backlight unit in which a light guide plate 20 is seen in the normal direction. As shown in FIG. 36B, an LED module 52 is disposed on both end portions of the light guide plate 20 in the longitudinal direction. The plurality of the LEDs 50 in red, green, and blue are arranged in such a way that the green, red, and blue LEDs are adjacently arranged in this order from one end portion to the other end portion of the incident plane in the longitudinal direction (in the drawing, from the left to the right), and adjacent to the blue LEDs, a plurality of LED groups 50a are arranged in order of green, red, green, and blue LEDs adjacently arranged. Furthermore, as adjacent to the LED group 50a arranged at the rightmost position in the drawing, red and green LEDs are adjacently arranged in this order.

When the LEDs 50 in red, green, and blue are arranged in this manner, the light quantities of red, green, and blue light sufficiently exist near both end portions of the incident plane, whereby a shift in white balance can be suppressed. Accordingly, the color irregularities in the vicinity of both end portions of the incident plane can be reduced to the extent that a problem is hardly caused. In addition, when there is an LED 50 which is not fit in the RGB array of the LED group 50a, the LED 50 may be inserted between the adjacent LED groups 50a randomly. For example, when a single green LED 50 is not fit, LEDs may be arranged in order of the LED group 50a, the green LED 50 and the LED group 50a. In other words, the array of the LEDs 50 in this case is GRGB, G, GRGB, and GRGB.

Figure 37:
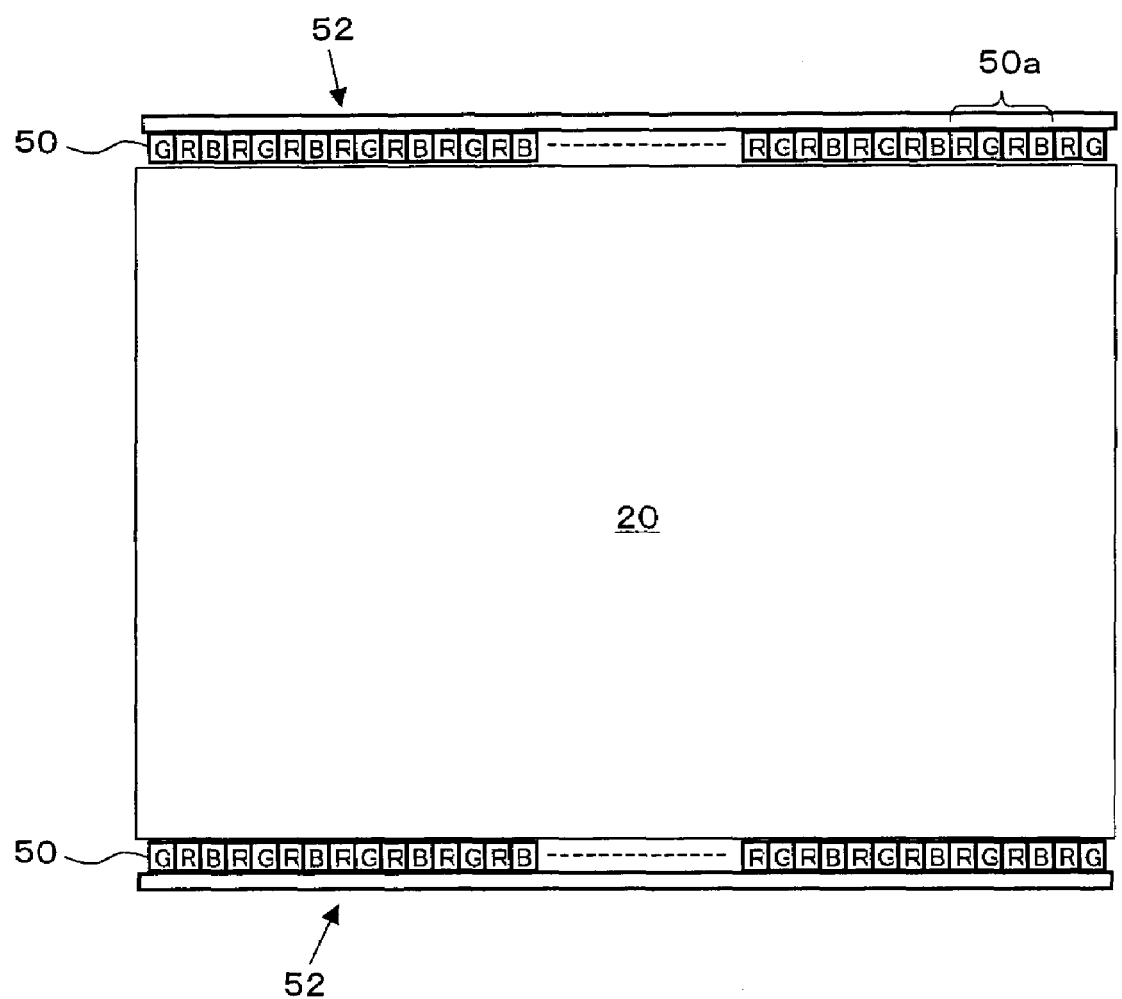
FIG. 37 shows a cross section depicting another configuration of the backlight unit according to example 26 of the first preferred embodiment of the present invention.

FIG. 37 shows another configuration of the backlight unit according to the example. Since the array pattern of the LED group 50a depends on the light emission quantity of LEDs to be used, it may be changed properly. As shown in FIG. 37, for example, LED groups 50a may be adjacently arranged in order of red, green, red, and blue from the left in the drawing.

As described above, according to the present preferred embodiment, color irregularities and luminance variations in the vicinity of the incident plane 23 can be solved with no increase of the backlight unit in size.

Second Preferred Embodiment

A second preferred embodiment of the present invention relates to a backlight unit and a liquid crystal display device including the same.

In most of backlight units distributed in the market, a cold-cathode tube is used for a light source. However, backlight units using LEDs have also been developed. A liquid crystal display device including a backlight unit with LEDs as a light source is mounted on a small-sized electronic device such as a personal digital assistant and a cellular telephone. Additionally, recently, a power LED of high luminance having a self cooling function has been developed. A large screen liquid crystal display device has been shown in an exhibition, which is intended for a monitor and mounted with a backlight unit having the power LED as a light source.

A backlight unit including the cold-cathode tube and a liquid crystal display device including the same have limits in color reproduction. In addition, recently, environmental issues are increasingly sensitive issues, and a cold-cathode tube using mercury is not preferable. Furthermore, the cold-cathode tube is vulnerable to an impact, and is likely to break. Furthermore, in order to drive the cold-cathode tube, a few thousands volts of high voltage is required which is dangerous. Recently, for the light source for the backlight unit replacing the cold-cathode tube, attention has been focused on LEDs. The LED is difficult to break, is driven at a low voltage, and is an environmentally friendly component because it does not use mercury. As described above, the LED can make up for disadvantages of the cold-cathode tube. In a small-sized electronic device such as a personal digital assistant and a cellular telephone, a liquid crystal display device having a backlight unit with an LED as a light source is used and commercially available.

The light emission quantity of the LED is substantially proportional to the amount of current carried therethrough. However, the LED is a chip component, and it is difficult to carry a large current therethrough. On this account, it is not suited for a light source of a backlight unit of a liquid crystal display device for use in a monitor device and a notebook computer which require a large screen and high luminance. However, in recent years, a power LED having a small thermal resistance and high luminance has been developed, and a liquid crystal display device for use in a large screen monitor has also been developed which is mounted with a backlight unit using the power LED for a light source. However, it is inevitable that such a small thermal resistant LED requires a system or a structure which releases the heat transferred to a substrate. It is difficult to cool a light source of a backlight unit for use in a monitor device and a notebook computer, which are particularly demanded to have a reduced size and to have a narrow frame. For example, forced air cooling by a fan can increase the size of a backlight unit. Moreover, a lot of effort is required for replacement or cleaning of the fan due to failure or a clogged filter. On the other hand, in the case of liquid cooling, a cooling medium is necessary to include a possibility of the occurrence of liquid leakage. When a cooling medium other than water is used, it is likely that liquid leakage leads to environmental issues.

In order to overcome the problems described above, preferred embodiments of the present invention provide a backlight unit and a liquid crystal display device including the same which can efficiently dissipate heat generated in a light source and have a long lifetime in a narrow frame with small luminance variations.

According to a second preferred embodiment of the present invention, a backlight unit includes a discrete light source section configured to have individual light sources having different spectra or different light emission quantities; a light guide section configured to have one end surface which is provided with an incident plane which receives a light emitted from the discrete light source section, a light guiding area which guides the light having entered from the incident plane, and a light emission plane which emits the light guided in the light guiding area; a heat conduction section configured to conduct heat generated in the discrete light source section; and a heat dissipation section disposed on the back side of the light emission plane and configured to dissipate heat conducted through the heat conduction section.

According to the second preferred embodiment of the present invention, a backlight unit and a liquid crystal display device including the same can be implemented which can efficiently dissipate heat generated in a light source and have a long lifetime in a narrow frame with small luminance variations.

A backlight unit and a liquid crystal display device including the same according to the second preferred embodiment of the present invention will be described with reference to FIGS. 38A to 51. The backlight unit according to the second preferred embodiment has a discrete light source section configured to have individual light sources having different spectra or different light emission quantities, a light guide section configured to have one end surface provided with an incident plane which receives a light emitted from the discrete light source section, a light guiding area which guides the light having entered from the incident plane, and a light emission plane which emits the light guided in the light guiding area, a heat conduction section configured to conduct heat generated in the discrete light source section, and a heat dissipation section disposed on the back side of the light emission plane and configured to dissipate heat conducted through the heat conduction section.

The backlight unit according to the second preferred embodiment can transfer the heat generated in the discrete light source section to the heat dissipation section by thermally contacting the discrete light source section with the heat dissipation section by a heat conduction section made of a material of high heat conductivity. In addition, the discrete light source section is disposed on the incident plane substantially perpendicular to the light emission plane of the light guide section, and the heat dissipation section is disposed on the back side of the light emission plane, whereby the backlight unit can have a narrow frame.

In addition, the liquid crystal display device according to the second preferred embodiment has the backlight unit, a liquid crystal display panel disposed on the light emission plane side of the backlight unit, and an accommodating section configured to accommodate the backlight unit and the liquid crystal display panel which is made of a high heat radiating material to thermally contact with the backlight unit. Since the accommodating section is thermally contacted with the backlight unit, the heat generated in the discrete light source section is conducted to the accommodating section, and released in the air. As described above, in addition to the heat dissipation section of the backlight unit, the accommodating section is also provided with the heat radiating function, whereby the heat generated in the discrete light source section can be dissipated efficiently.

Hereinafter, descriptions will be made in more detail with reference to examples.

EXAMPLE 1

Figures 38A, 38B:
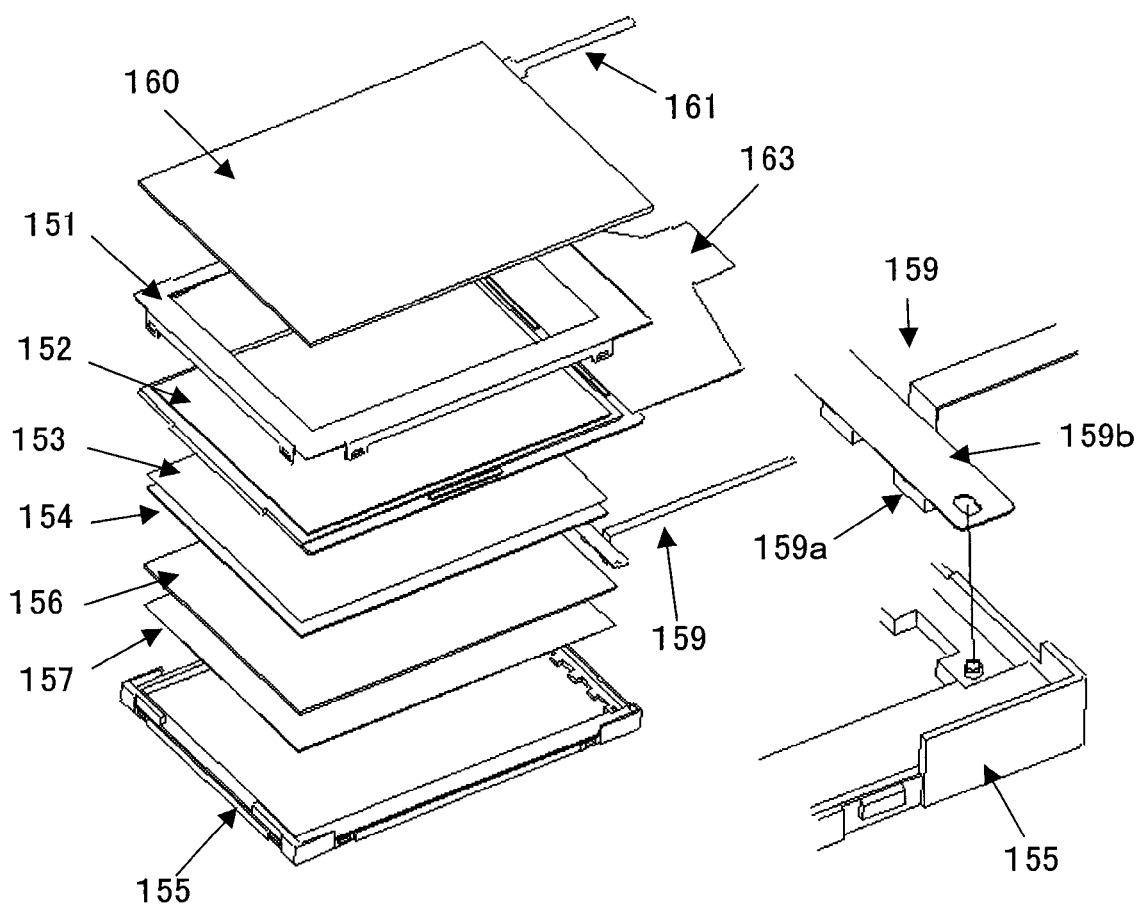
FIGS. 38A and 38B show a diagram and an exploded perspective view, respectively, depicting the schematic structure of the conventional liquid crystal display device.

FIGS. 38A and 38B show an exploded perspective view depicting the configuration of a conventional liquid crystal display device mounted with a backlight unit using LEDs for a light source. The liquid crystal display device is used as a display device for use in a PDA and a cellular telephone. FIG. 38A shows an exploded perspective view depicting the configuration of the liquid crystal display device. FIG. 38B shows an exploded perspective view depicting the configuration of an LED module 159. As shown in FIG. 38B, the LED module 159 has an FPC (flexible printed circuit) 159b and chip type (surface mounted type) LEDs 159a mounted on the FPC 159b. The light emitted from the LEDs 159a enters the side surface of a light guide plate 156 shown in FIG. 38A. The light having entered the light guide plate 156 is emitted by a projection and recess pattern (not shown) formed on the surface of the light guide plate 156 facing a reflection sheet 157 and the reflection sheet 157 toward a diffuser sheet 154. The outgoing light emitted from the light guide plate 156 enters the diffuser sheet 154. The diffuser sheet 154 has a function that makes the luminous light color and the luminous light quantity uniform by mixing the light traveling at different angles and again aligning them angularly in the same point in the plane.

The light made uniform by the diffuser sheet 154 is enhanced in luminance by a lens sheet (not shown) and a polarizer sheet 153, and is emitted in the direction of a liquid crystal display panel 152. To the liquid crystal display panel 152, an image signal and a control signal are inputted from a drive circuit, not shown, through an FPC 163. The light transmittance of the liquid crystal display panel 152 is controlled based on the image signal and the control signal, and a predetermined image is displayed on a display screen.

The liquid crystal display panel 152, the optical sheets (the polarizer sheet 153 and the diffuser sheet 154), the light guide plate 156 and the reflection sheet 157 are housed and held in a plastic frame 155 and a front cover 151. In addition, on the front cover 151, a touch panel 160 for information entry is disposed. To the touch panel 160, an FPC 161 is connected.

Since the chip type LEDs 159*a* have a small amount of electric power to be inputted and cannot provide a large light quantity, it is only used in a backlight unit for use in small-sized electronic appliances such as a PDA and a cellular telephone. The backlight unit using the LEDs 159*a* for a light source is not suited for use in a monitor device or a notebook computer which requires a large screen and high luminance. However, in recent years, a power LED of high luminance having a self cooling function has been developed. A liquid crystal display device for use in a large screen monitor device has also been developed which is mounted with a backlight unit using the power LED as a light source.

Figure 40:
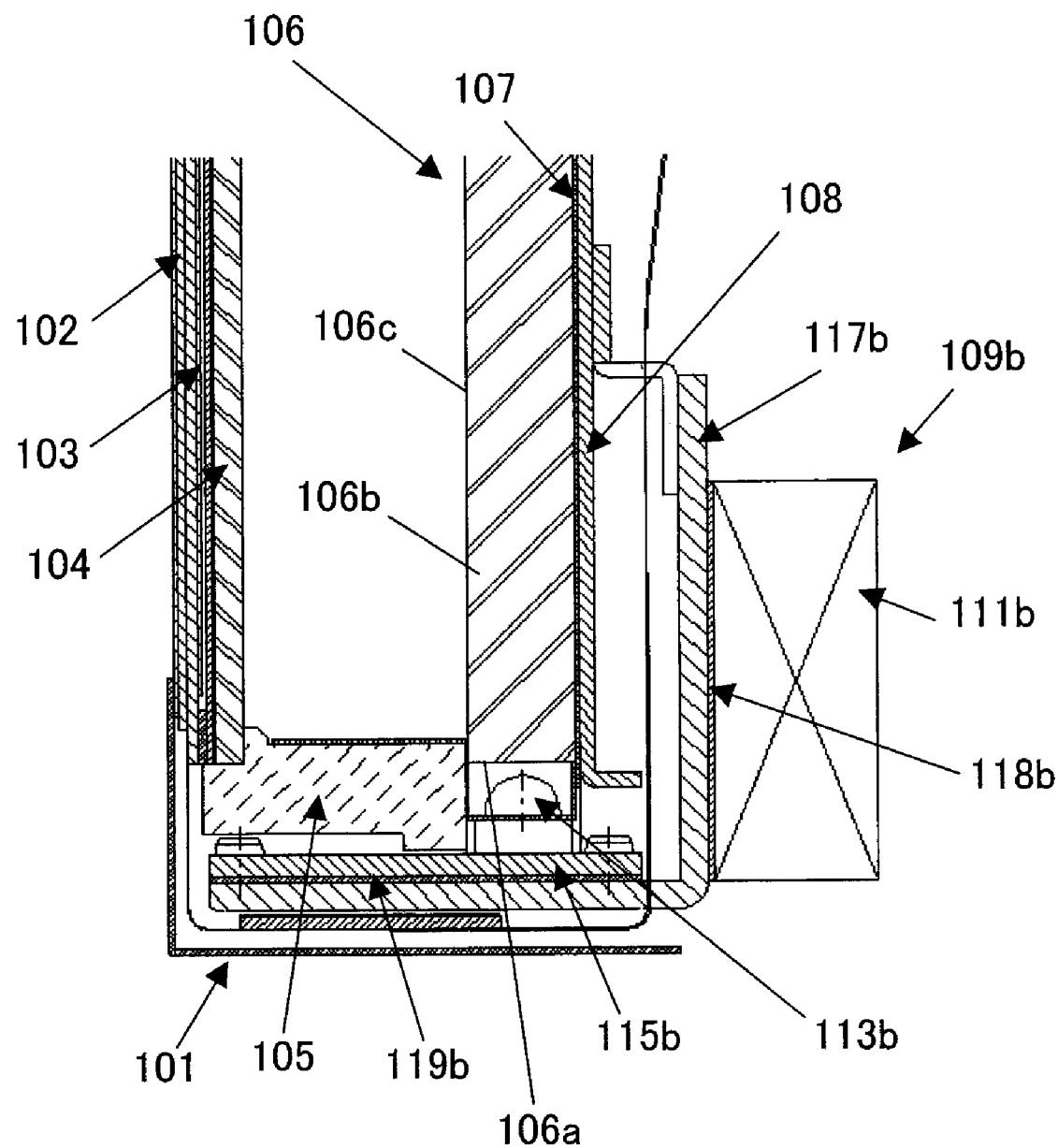
FIG. 40 shows a cross section depicting the essential portion of the configuration of the liquid crystal display device according to example 1 of the second preferred embodiment of the present invention.
Figure 41:
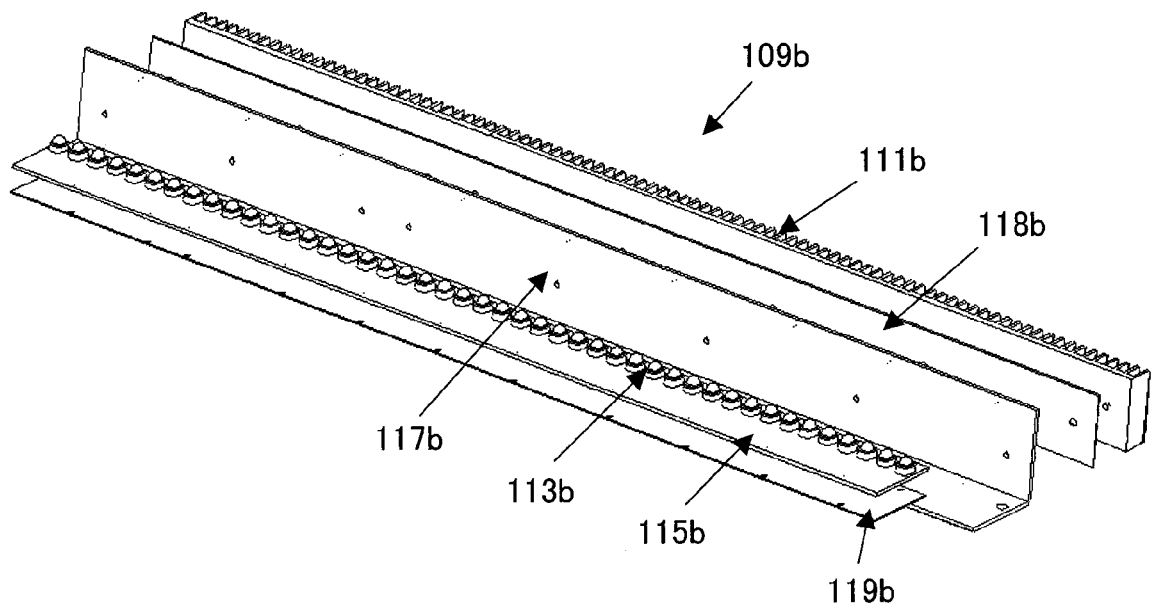
FIG. 41 shows a diagram depicting the configuration of the heat dissipating portion of the backlight unit according to example 1 of the second preferred embodiment of the present invention.

FIGS. 39A to 39D show perspective views depicting the configuration of a liquid crystal display device 130 according to an example. FIG. 39A shows a perspective view depicting the front side of the liquid crystal display device 130. FIG. 39B shows a perspective view depicting the back side of the liquid crystal display device 130. FIG. 39C shows an exploded perspective view depicting the liquid crystal display device 130. FIG. 39D shows an enlarged imaginary circle shown in FIG. 39C. FIG. 40 shows a cross section depicting an essential portion of the liquid crystal display device 130. FIG. 41 shows an exploded perspective view depicting the configuration of a heat dissipating portion 109*b* which dissipates the heat generated in a plurality of LEDs (the discrete light source section) 113*b*.

As shown in FIGS. 39C and 40, the light emitted from the plurality of LEDs 113*b* enters and is taken by an incident plane 106*a* disposed on the side surface of (one end surface) of a light guide plate (the light guide section) 106. The light having entered the light guide plate 106 is guided in a light guide area 106*b*, and emitted from a light emission plane 106*c* in the direction of a diffuser sheet 104 by a projection and recess pattern (not shown) formed on the surface of the light guide plate 106 facing a reflection sheet 107 and the reflection sheet 107. The light emitted from the light guide plate 106 is mixed in color while it is traveling in an air space 30 between the light guide plate 106 and the diffuser sheet 104. The emitted light enters the diffuser sheet 104 and is made uniform. The luminance is enhanced by a lens sheet (not shown) and a polarizer sheet 103, and the light is emitted toward a liquid crystal display panel 102. To the liquid crystal display panel 102, an image signal and a control signal outputted from a liquid crystal drive circuit board 110 (see FIG. 39B) are inputted. The light transmittance of the liquid crystal display panel 102 is controlled based on the image signal and the control signal, and a predetermined image is displayed on a display screen.

Between the reflection sheet 107 and the liquid crystal drive circuit 110, a back plate (protecting section) 108 is disposed which protects the reflection sheet 107, the light guide plate 106, etc. The liquid crystal display panel 102, the polarizer sheet 103, the diffuser sheet 104, the light guide plate 106, and the reflection sheet 107 are housed and held by the back plate 108, the plastic frame 105, and the front cover 101.

As shown in FIGS. 39D and 41, a plurality of the LEDs 113*b* are mounted and fixed to a light source fixing member 115*b* in which a metal having a large heat conductivity preferably has a thin, substantially rectangular shape. On the surface of the light source fixing member 115*b*, an insulating layer is formed, and on the insulating layer, a predetermined wiring is patterned. The light source fixing member 115*b* is thermally contacted with a heat conduction section configured to conduct the heat generated in the LEDs 113*b* to a heatsink (heat dissipation section) 111*b* through a heat conduction sheet 119*b*. As shown in FIG. 40, the heat conduction section has a substantially L-shaped heat conduction member 117*b* which is bent along the light guide plate 106 and is formed in an L shape in cross section. The substantially L-shaped heat conduction member 117*b* is formed of a metal material having a large heat conductivity, such as aluminum. The plurality of the LEDs 113*b* are thermally contacted with the substantially L-shaped heat conduction member 117*b* through the light source fixing member 115*b* and the heat conduction sheet 119*b*.

In addition, the substantially L-shaped heat conduction member 117*b* is thermally contacted and fixed to the heatsink 111*b* which dissipates the heat generated in the LEDs 113*b* outside the backlight unit through a heat conduction sheet 118*b*. As described above, the plurality of the LEDs 113*b* are thermally contacted with the heatsink 111*b* through the substantially L-shaped heat conduction member 117*b*. Accordingly, the backlight unit can sufficiently dissipate the heat generated in the LEDs 113*b* outside. A heat dissipating portion 109*a* (see FIG. 39C) facing a heat dissipating portion 109*b* has a similar configuration as that of the heat dissipating portion 109*b*.

Figure 42A:
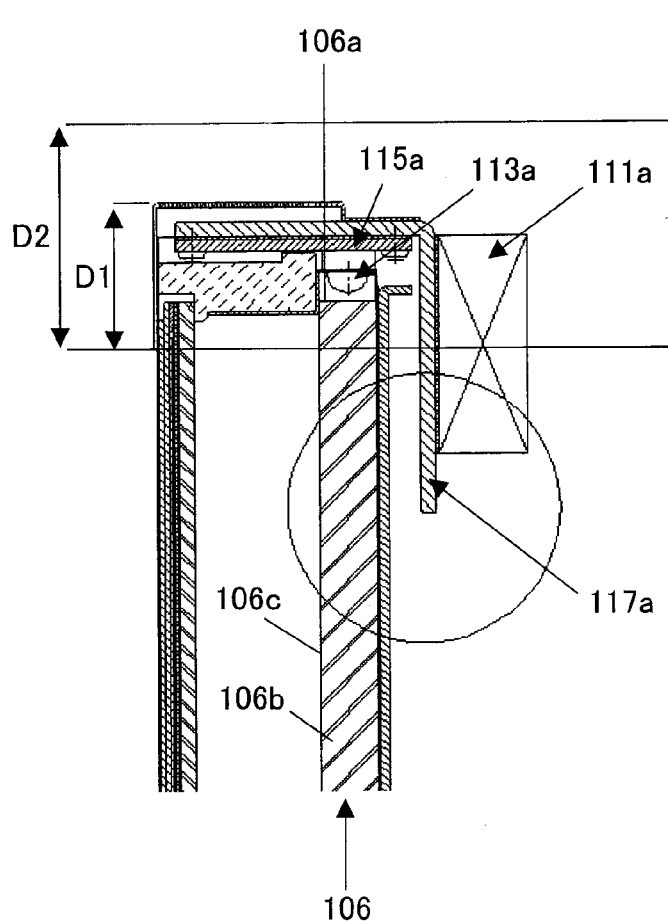
FIGS. 42A and 42B show cross sections depicting the essential portion of the configuration of the liquid crystal display device according to example 1 of the second preferred embodiment of the present invention.
Figure 42B:
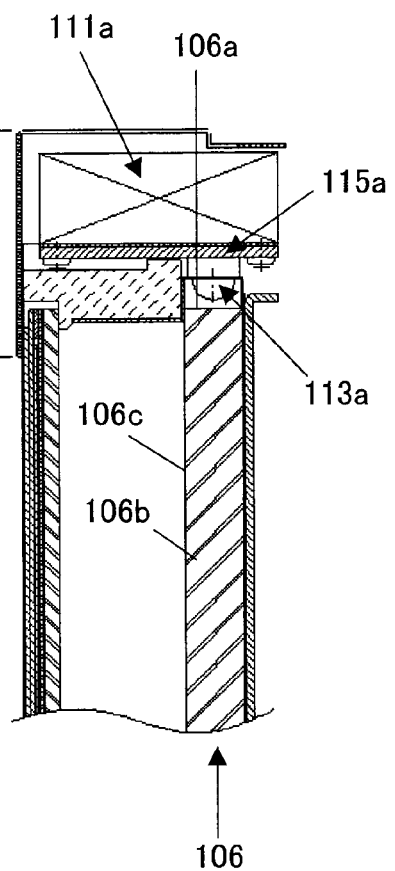

FIGS. 42A and 42B show a cross section depicting the vicinity of the heat dissipating portion 109*a* of the backlight unit. FIG. 42A shows the state of using the substantially L-shaped heat conduction member 117*a*. FIG. 42B shows the state of using no L-shaped heat conduction member 117*a*. Most of the heat generated in LEDs 113*a* is released in the direction on the opposite side of the light emitting portion of LEDs 113*a*. Thus, in order to efficiently release heat, it is preferable to dispose the heatsink 111*a* on the opposite side of the light emitting portion of the LEDs 113*a*. As shown in FIG. 42B, in the conventional backlight unit, since it is preferable to dispose the heatsink 111*a* in the normal direction of the incident plane 106*a* of the light guide plate 106 (on the upper side in the drawing), a length D2 of the frame of the liquid crystal display device is relatively longer.

On the other hand, in the backlight unit according to the example, the substantially L-shaped heat conduction member 117*a* is used to dispose the heatsink 111*a* in the direction that is substantially perpendicular to the normal of the incident plane 106*a* of the light guide plate 106 (the right direction in the drawing). Accordingly, a length D1 (D1<D2) of the frame of the liquid crystal display device can be made relatively short. In addition, since the substantially L-shaped heat conduction member 117*a* is disposed on the opposite side of the light emitting portion of the LED 113*a*, heat can be conducted to the heatsink 111*a* efficiently.

As described above, the backlight unit according to the example has the heat conduction section provided with the substantially L-shaped heat conduction member 117*a* which is thermally contacted with a plurality of the LEDs 113*a* and the heatsink 111*a*. In addition, the backlight unit according to the example has the heat conduction section provided with the substantially L-shaped heat conduction member 117*b* which is thermally contacted with the plurality of the LEDs 113*b* and the heatsink 111*b*. Accordingly, the backlight unit can sufficiently conduct the heat generated in the plurality of LEDs 113*a* and 113*b* to the heatsinks 111*a* and 111*b*, and can efficiently dissipate heat. Furthermore, in the backlight unit, the heatsinks 111*a* and 111*b* can be disposed in the direction that is substantially perpendicular to the incident plane 106*a* of the light guide plate 106 (on the back side of the light emission plane 106*c* of the light guide plate 106), whereby a narrow frame can be provided in the liquid crystal display device.

EXAMPLE 2

Figure 43:
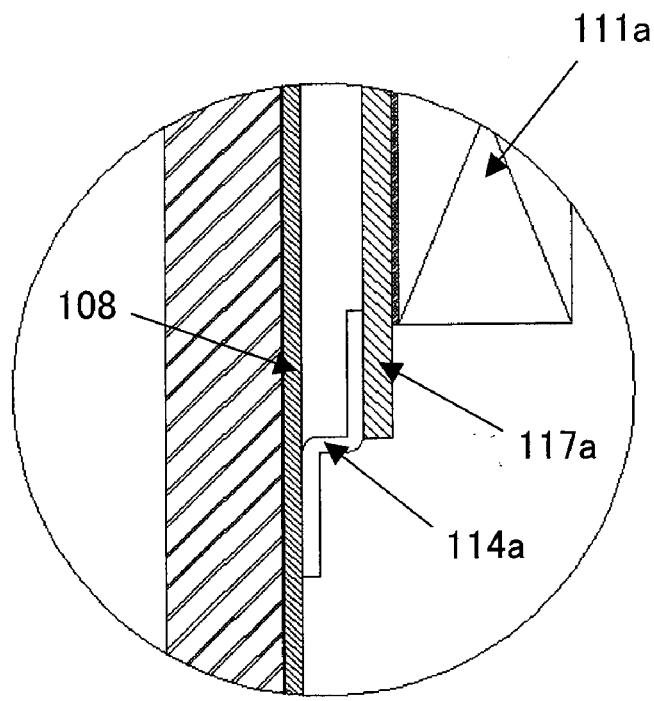
FIG. 43 shows a cross section depicting the essential portion of the configuration of the backlight unit according to example 2 of the second preferred embodiment of the present invention.

FIG. 43 shows a cross section depicting the essential portion of the configuration of a backlight unit according to example 2. FIG. 43 shows a portion corresponding to the portion encircled by an imaginary circle shown in FIG. 42A. As shown in FIG. 43, the backlight unit according to the example has a thermal connecting member 114*a* which thermally contacts a substantially L-shaped heat conduction member 117*a* with a back plate 108. The thermal connecting member 114*a* is fixed to the substantially L-shaped heat conduction member 117*a* and the back plate 108. The thermal connecting member 114*a* is used to thermally contact the substantially L-shaped heat conduction member 117*a* with the back plate 108, whereby the backlight unit can conduct the heat generated in a plurality of LEDs 113*a* to the heatsink 111*a* as well as to the back plate 108 for heat dissipation. In addition, although not shown in the drawing, a thermal connecting member is also disposed on the heat dissipating portion 109*b* side, and a substantially L-shaped heat conduction member 117*b* is thermally contacted with the back plate 108. As described above, the heat generated in a plurality of LEDs 113*a* and 113*b* can be partially dissipated in the back side plate 108, whereby the heatsinks 111*a* and 111*b* can be reduced in size. Accordingly, the backlight unit and the liquid crystal display device 130 can be reduced in size.

Figure 44:
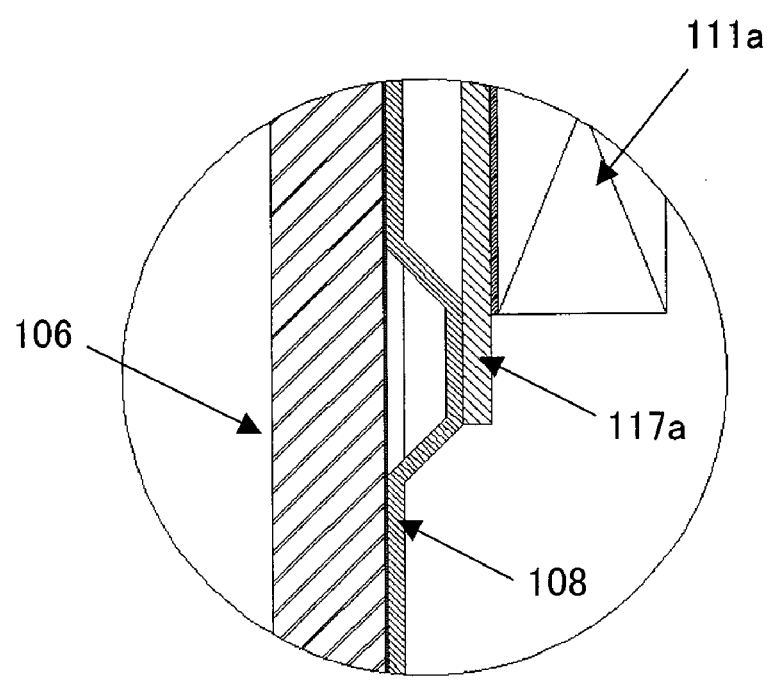
FIG. 44 shows a cross section depicting the essential portion of another configuration of the backlight unit according to example 2 of the second preferred embodiment of the present invention.

FIG. 44 shows another configuration of the backlight unit according to the example. As shown in FIG. 44, a back plate 108 is formed as a projected portion, and is fixed to a substantially L-shaped heat conduction member 117*a*. As described above, the substantially L-shaped heat conduction member 117*a* is thermally contacted with the back plate 108. Accordingly, the backlight unit according to the example can obtain similar advantages as those of the backlight unit shown in FIG. 43. Even when the substantially L-shaped heat conduction members 117*a* and 117*b* are partially projected to secure thermal contact with the back plate 108, similar advantages as those of the backlight unit according to the example can be obtained.

EXAMPLE 3

FIG. 45 shows a cross section depicting the essential portion of the configuration of a backlight unit according to example 3. As shown in FIG. 45, a heat conduction section of the backlight unit according to the example has a light source fixing member 115*a* which is bent along a light guide plate 106 and formed in an L shape in cross section. The light source fixing member 115*a* is fixed and thermally contacted with a heatsink 111*a*. In addition, the light source fixing member 115*a* is fixed to a thermal connecting member 114*a* and thermally contacted with a back plate 108. Although not shown in the drawing, a light source fixing member 115*b* on the heat dissipating portion 109*b* side is also formed in an L shape in cross section, and is thermally contacted with a heatsink 111*b* and the back plate 108.

In the backlight unit according to the example, the light source fixing members 115*a* and 115*b* are formed in an L shape, whereby LEDs 113*a* and 113*b* can be thermally contacted with the heatsinks 111*a* and 111*b* and the back plate 108 without the use of the substantially L-shaped heat conduction members 117*a* and 117*b*. Accordingly, the backlight unit according to the example can obtain similar advantages as those of the backlight units according to examples 1 and 2. In addition, even though the backlight unit does not have the substantially L-shaped heat conduction members 117*a* and 117*b*, it can obtain similar advantages as those of the backlight unit according to the example.

EXAMPLE 4

FIG. 46 shows the state of fixing LEDs 113*a* of a backlight unit to a light source fixing member 115*a* according to example 4. A diagram on the under side in the drawing shows the state of fixing surface mounted LEDs 113*a* to a light source fixing member 115*a*. The LEDs 113*a* have lead terminals 140' which connect the LEDs to a wiring patterned on the light source fixing member 115*a*. The LEDs 113*a* are fixed to the light source fixing member 115*a* by the lead terminals 140'. The lead terminals 140' are formed as projecting from the outer wall of the LEDs 113*a*. Accordingly, the surface mounted LEDs 113*a* have a relatively large mounting pitch L1.

On the other hand, as shown in a diagram on the upper side in the drawing, DIP type LEDs 113*a* have lead terminals 140 formed on the opposite side of the light emitting portion inside from the outer wall. The DIP type LEDs 113*a* are fixed in such a way that the lead terminals 140 are inserted into through holes formed in the light source fixing member 115*a*. A mounting pitch L2 of the DIP type LEDs 113*a* can be made smaller than the mounting pitch L1 of the surface mounted LEDs 113*a*. Therefore, the DIP type LEDs 113*a* can be mounted in a more limited area than the surface mounted LEDs 113*a* are. Accordingly, a backlight unit and a liquid crystal display device 130 of high luminance can be obtained.

EXAMPLE 5

FIGS. 47A and 47B show a perspective view depicting the vicinity of a light source fixing member 170 of a conventional backlight unit having a reflector 172. FIG. 47A shows a perspective view depicting the state of fixing the reflector 172 to the light source fixing member 170. FIG. 47B shows an exploded perspective view depicting the state of removing the reflector 172 from the light source fixing member 170. The reflector 172 is arranged to efficiently guide the light emitted from LEDs 159*a* to a light guide plate 156. The reflector 172 can reflect the light obliquely emitted from the LEDs 159*a* with respect to the normal direction of the incident plane of the light guide plate 156 and guide it to the light guide plate 156. Accordingly, the light emitted from the LEDs 159*a* can be efficiency guided to the light guide plate 156. However, the conventional reflector 172 cannot cool the LEDs 159*a*.

Figures 48A, 48B:
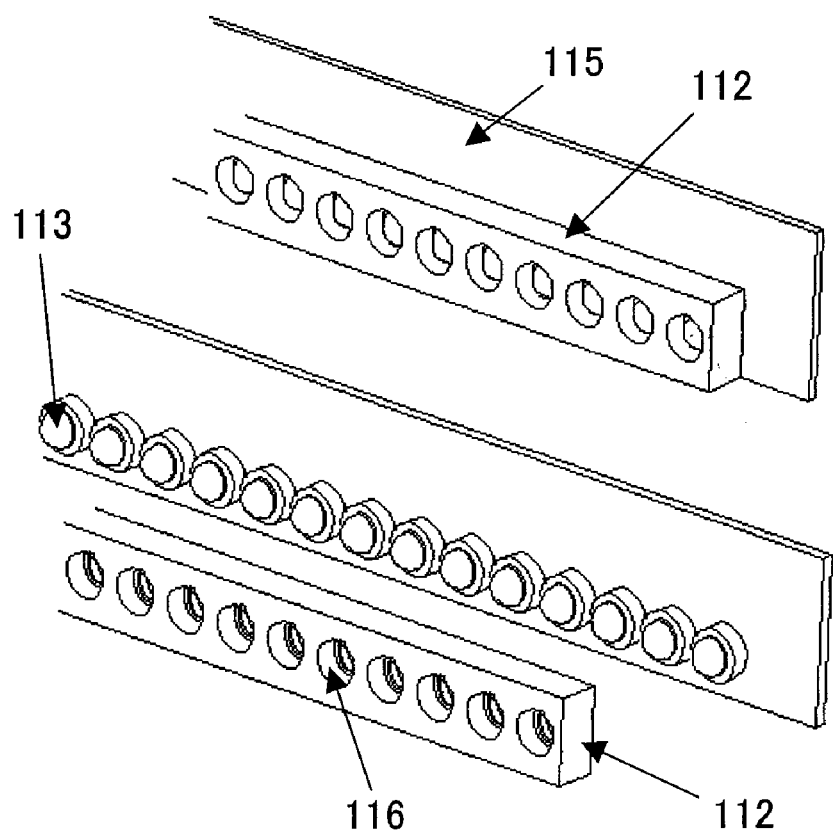
FIGS. 48A and 48B show diagrams depicting the configuration in the vicinity of the light source fixing member of the backlight unit according to example 4 of the second preferred embodiment of the present invention.

FIGS. 48A and 48B show perspective views depicting the vicinity of a light source fixing member 115 of a backlight unit according to example 5. FIG. 48A shows a perspective view depicting the state of fixing a heat conduction reflector 112 to the light source fixing member 115. FIG. 48B shows an exploded perspective view depicting the state of removing the heat conduction reflector 112 from the light source fixing member 115. As shown in FIGS. 48A and 48B, the heat conduction reflector 112 is made of material having high heat conductivity and preferably has a thin, substantially rectangular shape. The heat conduction reflector 112 has a plurality of insertion holes 116 which are formed to have a slightly larger diameter than the outer diameter of LEDs 113 and in which the LEDs 113 can be inserted. The insertion holes 116 are formed to penetrate through the heat conduction reflector 112. The insertion holes 116 are formed to have almost the same pitch as the pitch of a plurality of the LEDs 113 fixed to the light source fixing member 115. Light reflection treatment is applied to the inner wall of the insertion holes 116.

The insertion holes 116 penetrate through the heat conduction reflector 112. Thus, as shown in FIG. 48A, when the heat conduction reflector 112 is fixed to the light source fixing member 115, the light emission side of the LEDs 113 is open. In addition, the insertion holes 116 applied with light reflection treatment cover the surrounding area other than the light emission side of the LEDs 113. Therefore, the heat conduction reflector 112 can reflect the light obliquely emitted from the LEDs 113 with respect to the normal direction of the incident plane of a light guide plate 106 (not shown in FIGS. 48A and 48B), and can guide it to the light guide plate 106. Accordingly, the light emitted from the LEDs 113 can be efficiently guided to the light guide plate 106. In addition, since the heat conduction reflector 112 is made of a material having a high heat conductivity, the heat generated in the LEDs 113 can be efficiently conducted to the heat conduction section (substantially L-shaped heat conduction members 117a and 117b or light source fixing members 115a and 115b) and heatsinks 111a and 111b (both of which are not shown in FIGS. 48A and 48B) through the light source fixing member 115. Accordingly, the backlight unit according to the example can dissipate the heat generated in the LEDs 113 to the air.

EXAMPLE 6

Figure 49:
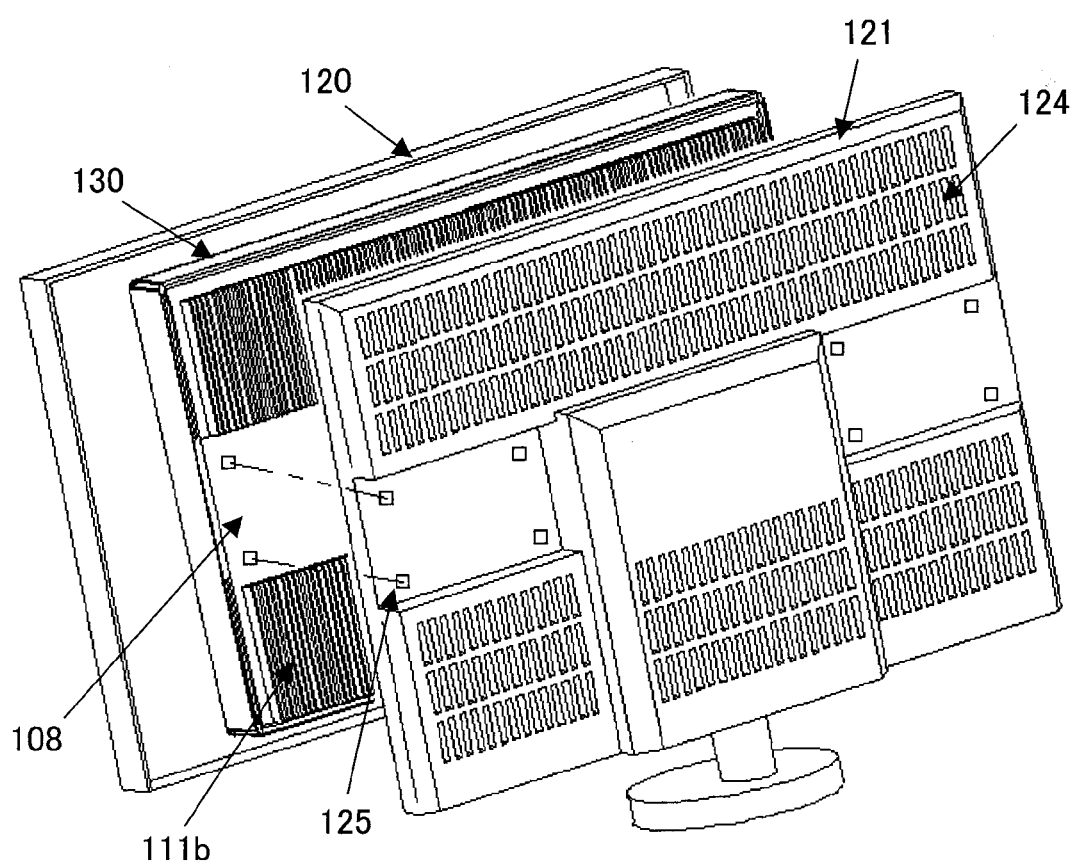
FIG. 49 shows a diagram depicting the configuration of the liquid crystal display device for use in the monitor device according to example 6 of the second preferred embodiment of the present invention.

FIG. 49 shows an exploded perspective view depicting the configuration of a liquid crystal display device for use in a monitor device (monitor liquid crystal display device) according to example 6. As shown in FIG. 49, the monitor liquid crystal display device has an accommodating section formed of a high heat radiating material, and is configured to thermally contact with a backlight unit mounted on a liquid crystal display device 130 and to accommodate the liquid crystal display device 130. In addition, the monitor liquid crystal display device has a power input portion (not shown). The accommodating section has a front cover 120 and a rear cover 121. For example, the rear cover 121 has screw holes 125 so as to be screwed to a back plate 108 of the backlight unit. The rear cover 121 is screwed and fixed to the back plate 108. Since the rear cover 121 is thermally contacted with the back plate 108 of the backlight unit, the heat generated in LEDs 113a and 113b (not shown in FIG. 49) can be dissipated in heatsinks 111a and 111b and the back plate 108 as well as in a heat radiating portion 124 formed in the rear cover 121 of the monitor liquid crystal display device.

Figures 50A, 50B:
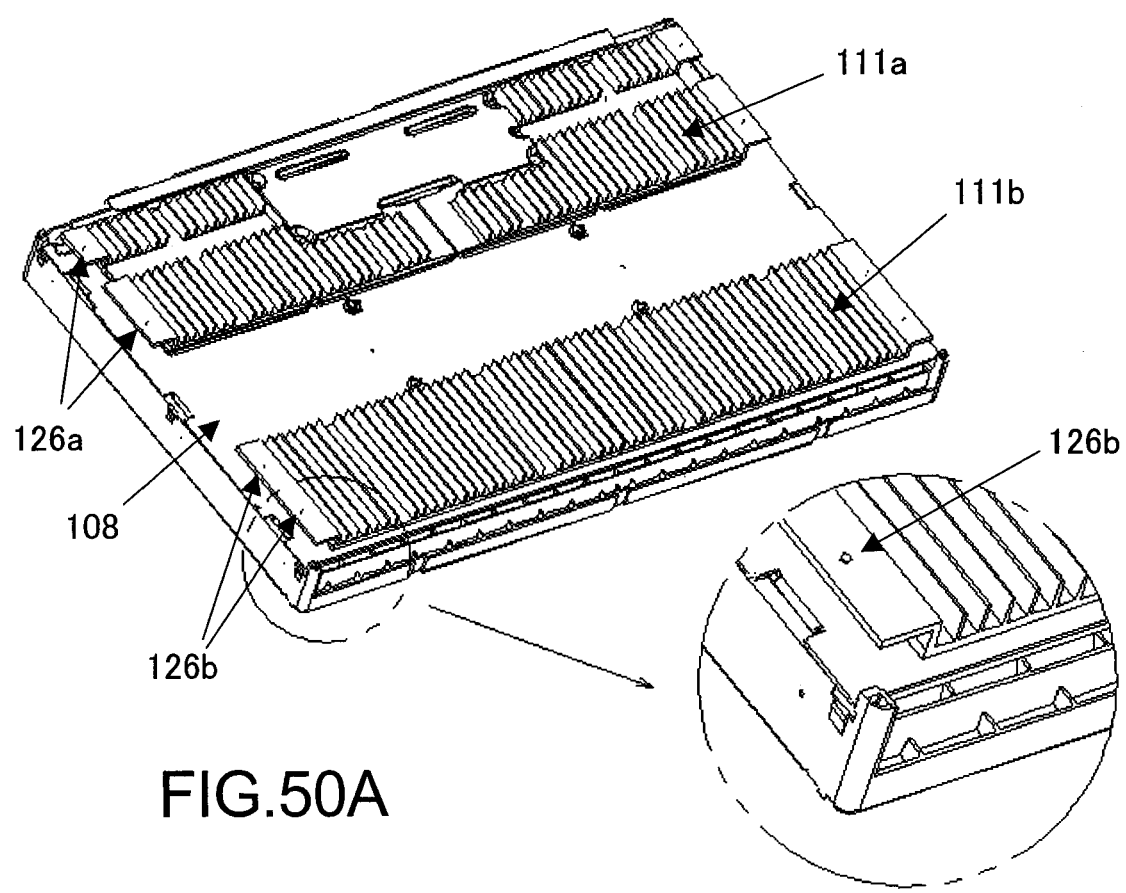
FIGS. 50A and 50B show diagrams depicting another configuration of the liquid crystal display device according to example 6 of the second preferred embodiment of the present invention.

FIGS. 50A and 50B show perspective views depicting another configuration of the monitor liquid crystal display device according to the example. FIG. 50A shows a perspective view depicting the configuration of a liquid crystal display device 130. FIG. 50B shows an enlarged imaginary circle depicting shown in FIG. 50A. As shown in FIG. 50A, in the liquid crystal display device 130 according to the example, screw holes 126a and 126b are formed in heatsinks 111a and 111b to attach a rear cover 121 (not shown in FIG. 50). Since the rear cover 121 can be thermally contacted with the heatsinks 111a and 111b, the heat generated in LEDs 113a and 113b (not shown in FIG. 50) can be dissipated in the heatsinks 111a and 111b and a back plate 108 as well as in a heat radiating portion 124 of the monitor liquid crystal display device.

EXAMPLE 7

Figure 51:
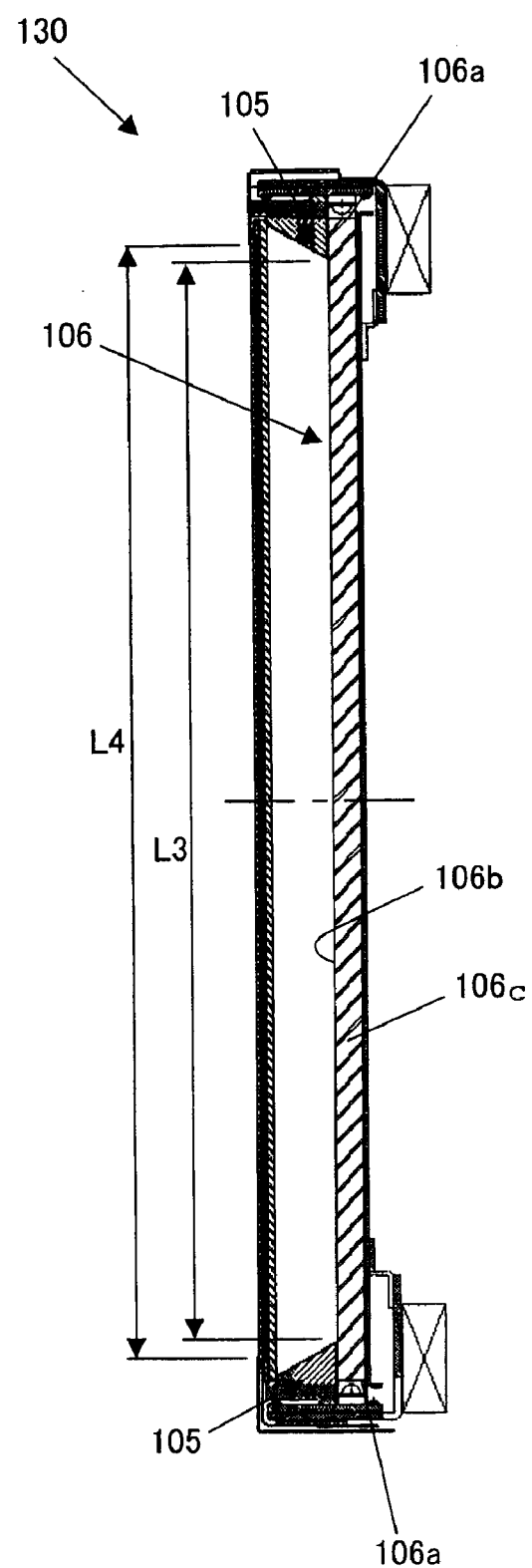
FIG. 51 shows a cross section depicting the configuration of the liquid crystal display device according to example 7 of the second preferred embodiment of the present invention.

FIG. 51 shows a cross section depicting a liquid crystal display device 130 according to example 7. As shown in FIG. 51, in the liquid crystal display device 130 according to the example, a length L3 of a light emission plane 106c of a light guide plate 106 is formed shorter than a length L4 of the display area of a liquid crystal display panel 102. In addition, in the liquid crystal display device 130, the length L3 of the light emission plane 106c of the light guide plate 106 is preferably shorter than the length of a diffuser sheet 104 measured in the same direction. Furthermore, in the liquid crystal display device 130, the area of the light emission plane 106c of the light guide plate 106 is formed smaller than the area of the display area of the liquid crystal display panel 102 or the area of the diffuser sheet 104.

A backlight unit has a plastic frame (frame shaped member) 105 between the light guide plate 106 and the diffuser sheet 104, wherein the plastic frame is formed to have the opening area on the light guide plate 106 narrower than the opening area on the diffuser sheet 104 side. Accordingly, in the liquid crystal display device 130, the length L3 of the light emission plane 106c of the light guide plate 106 can be made shorter than the length L4 of the display area of the liquid crystal display panel 102 or the length of the diffuser sheet 104 measured in the same direction, or the area of the light emission plane 106c of the light guide plate 106 can be made smaller than the area of the display area of the liquid crystal display panel 102 or the area of the diffuser sheet 104. In addition, a reflection film of aluminum, for example, is formed on tilted inner wall surfaces 105a and 105a' of the plastic frame 105, whereby the light emitted from the light emission plane 106c of the light guide plate 106 can efficiently enter the diffuser sheet 104. Furthermore, the LEDs 113a and 113b are arranged on the end surface of the light guide plate 106 to make the outer dimensions of the backlight unit almost equal to the outer dimensions of the liquid crystal display panel 102. Accordingly, the liquid crystal display device 130 can be reduced in size.

In addition, the length between the incident plane of the light guide plate 106 and the plane facing the incident plane is made shorter than the length L4 of the display area of the liquid crystal display panel 102 or the length of the diffuser sheet 104 measured in the same direction, whereby the liquid crystal display device 130 is reduced in size. In addition, it is of course sufficient to use a plastic frame 105 for the liquid crystal display device 130, wherein the plastic frame in which the opening area on the light guide plate 106 side is formed smaller than the opening area on the diffuser sheet 104 side.

As described above, the backlight unit according to the present preferred embodiment has the heat conduction section (the substantially L-shaped heat conduction members 117a and 117b or the light source fixing members 115a and 115b) which conduct the heat generated in a plurality of the LEDs 113a and 113b to the heatsinks 111a and 111b. Accordingly, the backlight unit according to the present preferred embodiment can reduce luminance variations and provide a long lifetime. Furthermore, in the backlight unit, the heatsinks 111a and 111b can be disposed in the direction that is substantially perpendicular to the incident plane 106a of the light guide plate 106 (on the back side of the light emission plane 106c of the light guide plate 106). Accordingly, a narrow frame can be provided in the liquid crystal display device.

In addition, a monitor liquid crystal display device having the liquid crystal display device 130 according to the present preferred embodiment can dissipate the heat generated in the LEDs 113a and 113b in a rear cover 121. As described above, since the monitor liquid crystal display device can sufficiently dissipate the heat generated in the LEDs 113a and 113b without using an air cooling fan, it can be reduced in size.

Third Preferred Embodiment

A third preferred embodiment of the invention relates to a backlight unit (area illuminating device) and a liquid crystal display device including the same.

For the backlight unit provided in the liquid crystal display device, such configurations are proposed: an edge lit configuration in which white LEDs are arranged on a pair of the side surfaces of light guide plates preferably having a thin, substantially rectangular shape, and a hollow configuration in which white LEDs are arranged to face each other at a predetermined space with no use of a light guide plate. Furthermore, for the backlight unit, such configurations are proposed: a direct backlight configuration in which a set of LEDs in three primary colors combining LEDs in different light emission colors is arranged on the opposite side of the display plane of a liquid crystal display panel, and a sub-light guide plate configuration in which a sub-light guide plate is used which mixes the light of LEDs in different light emission colors.

The white LED is formed to combine a yellow fluorescent material with a blue light (B) LED, having the characteristic that unevenness in emission color is relatively small. In a set of LED in three primary colors in which a red (R) LED, a green (G) LED, and a blue (B) LED are combined for use, the width of a single LED is as great as about 10 mm. Therefore, when LEDs are arranged in order of the red LED, the green LED, and the blue LED, for example, the LEDs in the same color are arranged apart at about 30 mm or greater. On this account, a scheme is required to mix emission colors emitted in each of the LEDs. Lumileds Lighting Company, LLC. discloses a backlight unit in the configuration in which a light guiding area for mixing emission colors is not used as a display area (the sub-light guide plate configuration). In addition, in the backlight unit in the direct backlight configuration, it is necessary to provide the thickness of an air layer to a diffuser of about 50 mm or greater in order to sufficiently mix emission colors.

In the conventional backlight unit using a set of LED in three primary colors, it is necessary to provide an optical mixing space which mixes the lights emitted from each of the LEDs in addition to the area which applies light onto the display plane of the liquid crystal display panel. When the optical mixing space is not provided, the lights emitted from each of the LEDs are not mixed with each other sufficiently. Therefore, a problem arises that color irregularities are generated in the area which applies light onto the display plane of the liquid crystal display panel to greatly degrade the display quality of the liquid crystal display device.

In order to overcome the problems described above, a third preferred embodiment provides excellent color consistency and a small-sized backlight unit and a liquid crystal display device including the same.

According to another preferred embodiment of the present invention, a backlight unit includes a discrete light source section, a reflecting section A, a light guide section, an optical mixing section A, and an optical mixing section B, wherein the reflecting section A, the light guide section, the optical mixing section A, and the optical mixing section B are overlaid in this order, the discrete light source section is a section in which individual light sources having different spectra or different light emission quantities are arranged near an incident plane of the light guide section, and a light drawing section configured to take a light propagating through the light guide section out on the reflecting section A side or on the optical mixing section A side is provided on a surface of the light guide section facing the reflecting section A or a surface facing the optical mixing section A, wherein a relationship, $0 \leq Lp/H \leq 2.5$ is maintained, where a height of the optical mixing section A is H, and a length of a minimum unit of a cycle of an array of the discrete light source section is Lp.

According to the third preferred embodiment of the present invention, excellent color consistency and a small-sized backlight unit and a liquid crystal display device having same the can be implemented.

Figure 52A:
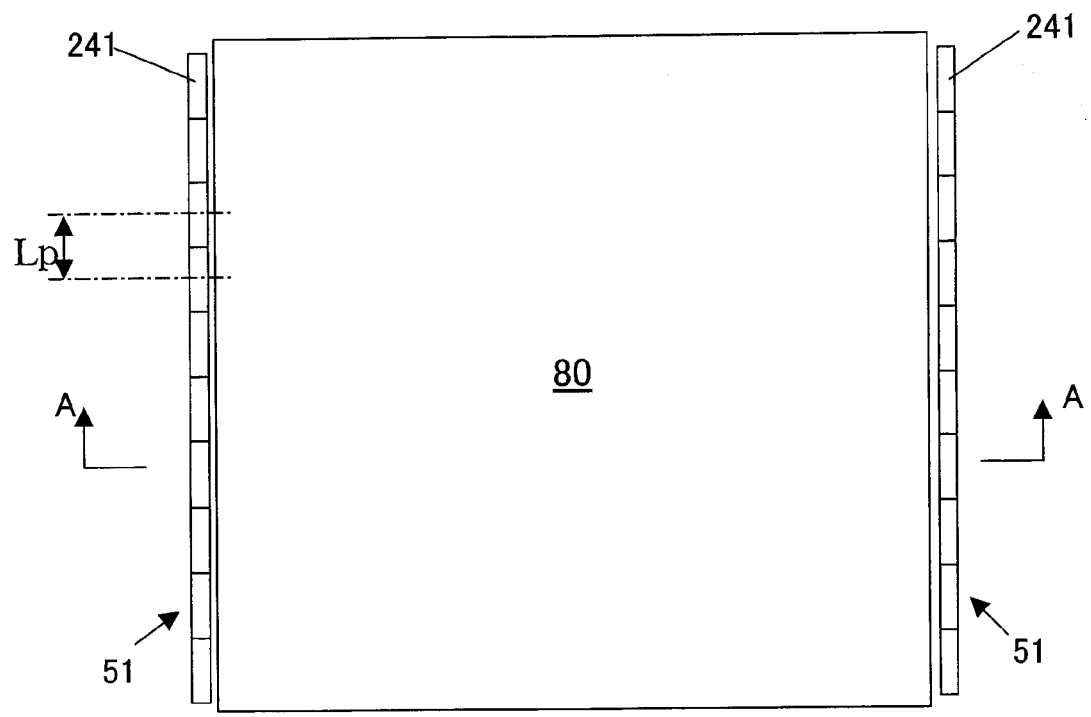
FIGS. 52A and 52B show diagrams depicting the schematic basic configuration of the liquid crystal display device according to example 1 of the third preferred embodiment of the present invention.
Figure 52B:
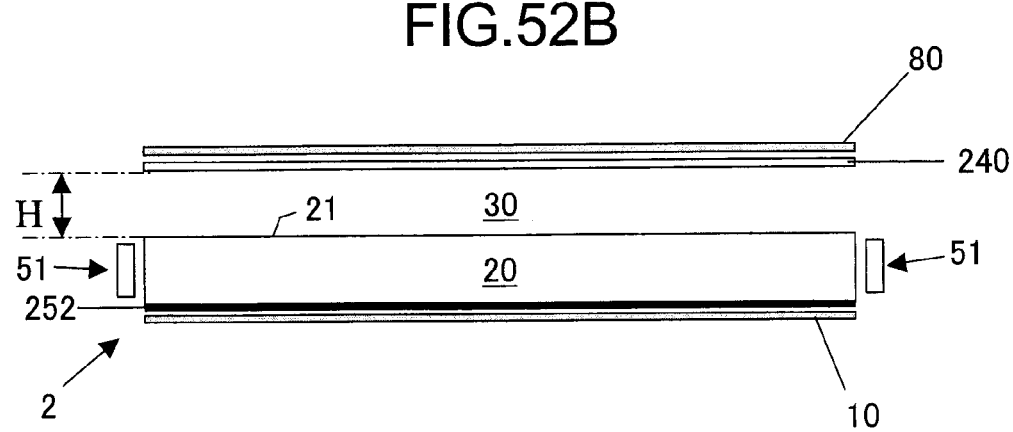

A backlight unit and a liquid crystal display device including the same according to the third preferred embodiment will be described with reference to FIGS. 52A to 59. FIGS. 52A and 52B show the schematic basic configuration depicting the backlight unit and the liquid crystal display device including the same according to the present preferred embodiment. FIG. 52A shows the state of the liquid crystal display device seen from the display screen side, and FIG. 52B shows a cross section cut at an imaginary line A-A shown in FIG. 52A.

As shown in FIGS. 52A and 52B, the liquid crystal display device has a liquid crystal display panel 80 which has a pair of substrates disposed facing each other (not shown) and liquid crystals (not shown) sealed between the pair of the substrates, and a backlight unit 2 which is disposed on the back side of the liquid crystal display panel 80. The backlight unit 2 which is an area light source has an area light guide plate (a light guide section) 20 having a substantially rectangular plate shape, for example. Near a pair of the side end surfaces of the light guide plate 20, light sources (discrete light source section) 51 are disposed, respectively. For example, the light source 51 has an LED array unit group 241 provided with at least one LED. The LED array unit groups 241 are arranged at regular intervals at a pitch length Lp. The pitch length Lp of the LED array unit group 241 is the minimum unit length of a cycle of the array of the light sources 51. A plurality of LEDs configuring the light source 51 have the light emission wavelength of different spectra, for example. Alternatively, the plurality of the LEDs have different light emission quantities.

As shown in FIG. 52B, on the upper side of the light emission plane 21 of the light guide plate 20 in the drawing, optical sheets such as a transmissive diffuser (an optical mixing section B) 240 are disposed, and further thereabove, the liquid crystal display panel 80 is disposed. Between the light emission plane 21 of the light guide plate 20 and the transmissive diffuser 240, an air space (an optical mixing section A) 30 is disposed. On the lower side of the light guide plate 20 in the drawing, a reflection sheet (a reflecting section A) 10 is disposed. More specifically, the backlight unit has the configuration in which the reflection sheet 10, the light guide plate 20, the air space 30, and the transmissive diffuser 240 are overlaid in this order. On the surface of the light guide plate 20 on the reflection sheet 10 side, a predetermined scattering plane 252 is disposed as a light drawing section.

The light guide plate 20 and the transmissive diffuser 240 are disposed in such a way that a relationship $0 \leq Lp/H \leq 2.5$ is maintained between a height H of the air space 30 and the pitch length Lp of the LED array unit group 241. With this configuration, as described later, in the backlight unit 2, color irregularities can be prevented from being generated in the area which applies light onto the display plane of the liquid crystal display panel 80 with no provision of the optical mixing space. Accordingly, a backlight unit and a liquid crystal display device excellent in color consistency can be obtained.

Hereinafter, a backlight unit and a liquid crystal display device including the same according to the third preferred embodiment of the present invention will be described in more detail with examples.

EXAMPLE 1

A backlight unit and a liquid crystal display device including the same according to this example will be described with reference to FIGS. 53A to 56. FIGS. 53A to 55B show the schematic configuration of the liquid crystal display device according to the example. FIGS. 53A to 55A show cross sections depicting the liquid crystal display device, and FIGS. 53B to 55B show an enlarged scattering plane as a light drawing section of the backlight unit.

As shown in FIGS. 53A to 55A, backlight units 2a, 2b, and 2c provided in the liquid crystal display device according to the example have the basic configuration of the backlight unit 2 shown in FIGS. 52A and 52B as well as side wall reflectors (reflecting sections B) 245 disposed on the side surfaces of an air space 30. The side wall reflector 245 is a specular reflection mirror sheet such as a silver reflection sheet. Accordingly, the light emitted from a light guide plate 20 to the air space 30 can be utilized with no loss. For example, the transmissive diffuser 240 is a bulk type which scatters light with scattering materials dispersed inside, and which is formed to have a transmittance of about 65% and a plate thickness of about 2 mm.

The backlight units 2a, 2b, and 2c have different shapes of the light drawing section. As shown in FIGS. 53A and 53B, the light drawing section of the backlight unit 2a has a printed scatter surface 252a. For example, the printed scatter surface 252a is formed in such a way that a transparent resin (printing ink) mixed with fine particles of titanium oxide is screen printed over substantially the entire surface of the light guide plate 20 on the reflection sheet 10 side.

As shown in FIGS. 54A and 54B, the light drawing section of the backlight unit 2b has a plurality of internal scattering printed surfaces 252b. For example, the internal scattering printed surface 252b is formed in such a way that fine particles of titanium oxide are not exposed to the surface. In addition, in the internal scattering printed surface 252b, for example, the surface on the reflection sheet 10 side is curved so that the incident light is not reflected in the direction substantially perpendicular to a light emission plane 21 of a light guide plate 20. Accordingly, the optical properties of the backlight unit 2b are improved.

As shown in FIGS. 55A and 55B, the light drawing section of the backlight unit 2c has a plurality of transparent lenses 252c. In the transparent lens 252c, for example, the surface on the reflection sheet 10 side is curved so that the incident light is not reflected in the direction substantially perpendicular to the light emission plane 21 of the light guide plate 20. Accordingly, the optical properties of the backlight unit 2c are improved. Instead of the transparent lens 252c, transparent dots may be formed as the light drawing section of the backlight unit 2c.

Figure 56:
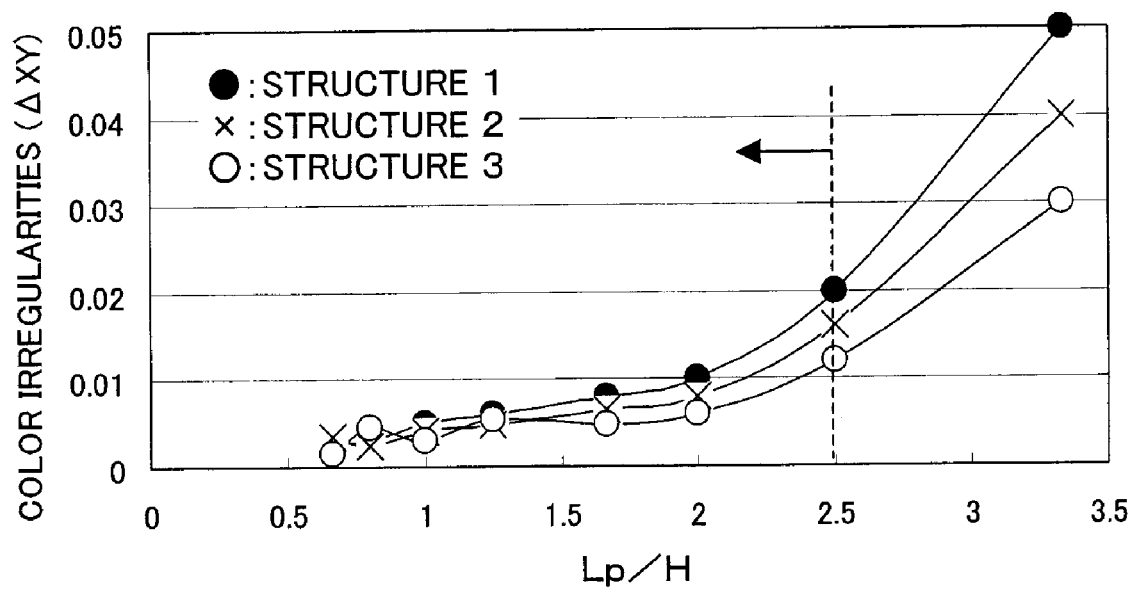
FIG. 56 shows a graph depicting the relation between the ratio Lp/H between the pitch length Lp of the LED array unit group and the height H of the air space and color irregularities in the light emission plane of the backlight unit according to example 1 of the third preferred embodiment of the present invention.

FIG. 56 shows a graph depicting the relation between a ratio Lp/H of the pitch length Lp of the LED array unit group 241 to the height H of the air space 30 and color irregularities in the light emission plane of the backlight unit. The horizontal axis shows the ratio Lp/H, and the vertical axis shows the color irregularities ($\Delta xy$). In the drawing, a curve connecting black circles depicts the properties of the backlight unit 2a (a structure 1), a curve connecting crosses depicts the properties of the backlight unit 2b (the structure 2), and a curve connecting white circles depicts the properties of the backlight unit 2c (a structure 3).

Suppose that the chromaticity (x, y) at two different points on the light emission plane of the backlight unit in the xy chromaticity coordinate system is a chromaticity (x1, y1) and a chromaticity (x2, y2), $\Delta xy$ is determined as below.

$$\Delta xy = \{(x1-x2)^2 + (y1-y2)^2\}^{1/2} \quad (1)$$

A plurality of chromaticities (x, y) in the light emission plane of the backlight unit are measured, and $\Delta xy$ between individual measurement points is computed with Equation (1). For the color irregularities on the vertical axis shown in FIG. 56, the maximum value of $\Delta xy$ thus computed is used.

According to another result of experimental study, it is known that the limit value of $\Delta xy$ at which color irregularities are visually recognized in the backlight unit is about 0.01. Then, as shown in FIG. 56, in order that $\Delta xy$ is about 0.01 or below in at least any one of the structures 1 to 3, it is sufficient that the pitch length Lp of the LED array unit group 241 and the height H of the air space 30 are selected so as to be $0 \leq Lp/H \leq 2.5$. For example, when the pitch length Lp of the LED array unit group 241 is determined in accordance with the constraints of the package size of the LED, the height H of the air space 30 is adjusted to be $0 \leq Lp/H \leq 2.5$, whereas when the height H of the air space 30 is determined in accordance with the constraints of the thickness of the backlight unit, the pitch length Lp of the LED array unit group 241 is adjusted to be $0 \leq Lp/H \leq 2.5$. Accordingly, color consistency in the light emission plane of the backlight unit is significantly improved.

As described above, according to the example, in the backlight units 2a, 2b, and 2c, the ratio Lp/H between the pitch length Lp of the LED array unit group 241 and the height H of the air space 30 is optimized to improve the color consistency and the luminance consistency in the display area with no provision of the optical mixing space. Accordingly, the backlight units 2a, 2b, and 2c can be reduced in size. In addition, the backlight units 2a, 2b, 2c according to the example are used to significantly improve display quality and to reduce the liquid crystal display device in size.

EXAMPLE 2

Figure 57A:
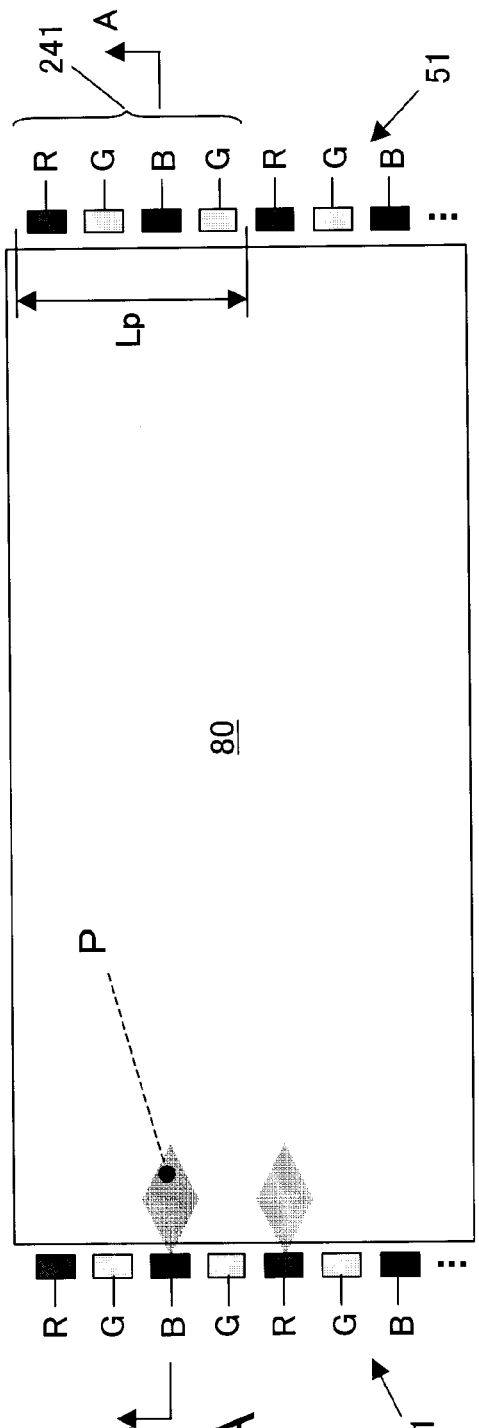
FIGS. 57A and 57B show diagrams depicting the schematic configuration of the liquid crystal display device according to example 2 of the third preferred embodiment of the present invention.
Figure 57B:
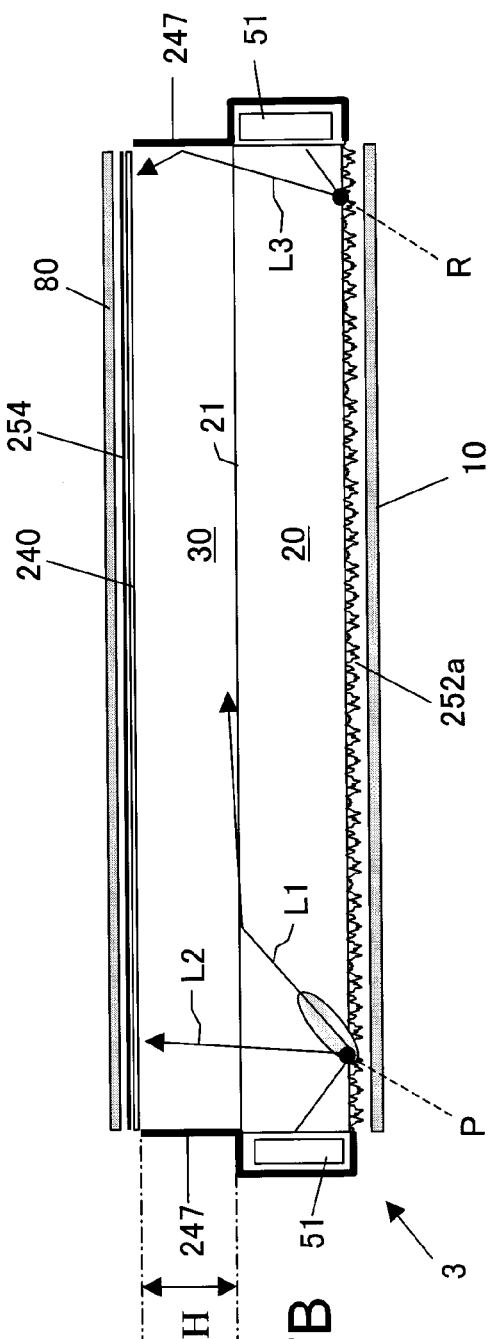

A backlight unit and a liquid crystal display device including the same according to this example will be described with reference to FIGS. 57A to 59. FIGS. 57A and 57B show the schematic configuration of the liquid crystal display device according to the example. FIG. 57A shows the state of the liquid crystal display device seen from the display screen side, and FIG. 57B shows a cross section cut at an imaginary line A-A shown in FIG. 57A.

As shown in FIGS. 57A and 57B, the liquid crystal display device according to the example has a liquid crystal display panel 80 and a backlight unit 3. The backlight unit 3 has light sources 51 arranged near a pair of the side end surfaces of a light guide plate 20. The light source 51 has a plurality of LED array unit groups 241 which are arranged at regular intervals at a pitch length Lp. The LED array unit group 241 is configured of a red LED (R), a green LED (G), a blue LED (B) and a green LED (G). In addition, the backlight unit 3 has a prism sheet (a reflecting section C) 254 which is arranged adjacently to a transmissive diffuser 240. For the prism sheet 254, for example, a Brightness Enhancement Film produced by Minnesota Mining & Manufacturing Co. is used. The prism sheet 254 preferably has a substantially rectangular plate shape, and is disposed between the transmissive diffuser 240 and the liquid crystal display panel 80. Furthermore, the backlight unit 3 has scattering side wall reflectors 247. The side wall reflector 247 is preferably formed of a white PET or a polycarbonate resin.

Next, the effect of the prism sheet 254 will be described. As shown in FIG. 57A, in the vicinity of the incident plane of the light guide plate 20, the light emitted from the red LED (R), the green LED (G), and the blue LED (B) (the lights in three primary colors) are not mixed with each other sufficiently. For example, at the position at a point P, blue is a dominant color. The light emitted from the light source 51 is reflected in a printed scatter surface 252a of a light guide plate 20 or a reflection sheet 10, and is scattered in the various directions. As shown in FIG. 57B, for example, the light emitted from the light source 51 on the left side in the drawing and reflected at the point P includes a reflected light L1 that is reflected at a reflection angle almost the same as the incident angle, and a reflected light L2 that is reflected in the direction substantially perpendicular to a light emission plane 21 of the light guide plate 20. In the reflected light L1, since the light in three primary colors are mixed while they are obliquely propagating through an air space 30 to reach a transmissive diffuser 240, color irregularities are reduced. The reflected light L1 is varied at its angle by the prism sheet 254 for emission, and it has the mixed color of excellent color consistency when it contributes to the display luminance in the direction substantially perpendicular to the prism sheet 254.

In the meantime, the display area near the light source 51 arranged on the left side in the drawing is illuminated by the white light of a predetermined chromaticity which is emitted from the light source 51 arranged on the right side in the drawing, and passes through the light guide plate 20 and the air space 30 to sufficiently mix the lights of the red LED (R), the green LED (G), and the blue LED (B). Without the prism sheet 254 like the conventional backlight unit, the reflected light L2 is mixed in the white light of a predetermined chromaticity, and thus color irregularities are generated near the light source 51 on the left side in the drawing. However, the prism sheet 254 is formed in a predetermined shape so as to reflect the color light distribution incident in the substantially perpendicular direction. Thus, the reflected light L2 is reflected in the prism sheet 254, and returned to the air space 30 side. Accordingly, the color consistency of the transmitted light transmitted through the prism sheet 254 is improved near the light source 51 on the left side in the drawing. Accordingly, color irregularities in the liquid crystal display device can be reduced.

Next, the effect of the side wall reflector 247 will be described. The light emitted from the light source 51 on the right side in the drawing and reflected at a point R includes a reflected light L3 that is reflected in the direction of the side wall reflector 247. When the side wall reflector is a specular reflection mirror sheet such as a silver reflection sheet as in the backlight units 2a to 2c according to the example, the reflected light L3 is reflected in the side wall reflector at almost the same reflection angle as the incident angle, and enters the transmissive diffuser 240. In the reflected light L3, the light in three primary colors are not mixed with each other sufficiently. Therefore, when the prism sheet 254 is not used, color irregularities are generated near the light source 51 due to the reflected light L3 having transmitted through the transmissive diffuser 240. However, when the scattering side wall reflector 247 is used, the reflected light L3 is reflected in the various directions for scattering. Thus, the light quantity of the reflected light L3 that enters and transmits through the transmissive diffuser 240 near the light source 51 is reduced. Accordingly, color irregularities near the light source 51 can be reduced.

Figure 58:
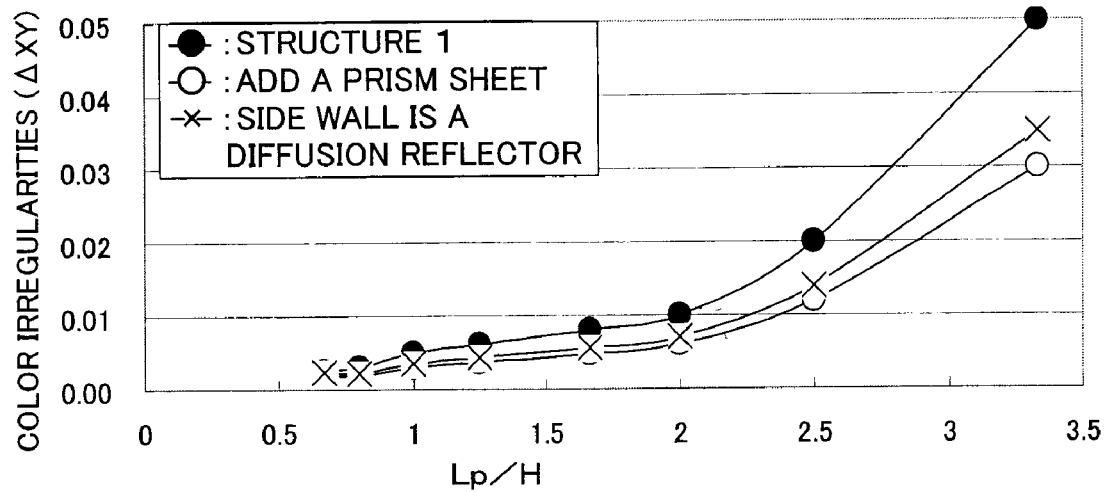
FIG. 58 shows a graph depicting the relationship between the ratio Lp/H between the pitch length Lp of the LED array unit group and the height H of the air space and color irregularities in the light emission plane of the backlight unit according to example 2 of the third preferred embodiment of the present invention.

FIG. 58 shows a graph depicting the relationship between the ratio Lp/H of the pitch length Lp of the LED array unit group 241 to the height H of the air space 30 and color irregularities in the emission plane of the backlight unit. The horizontal axis depicts the ratio Lp/H, and the vertical axis depicts the color irregularities ($\Delta xy$). The color irregularities are determined by a similar method as that of the example above. In the drawing, a curve connecting black circles shows the properties of the backlight unit 2a (the structure 1), a curve connecting white circles shows the properties of a backlight unit in which only the prism sheet 254 is added to the backlight unit 2a, and a curve connecting crosses shows the properties of a backlight unit in which the side wall reflector 245 of the backlight unit 2a is changed to the side wall reflector 247 (diffusion reflector).

As shown in FIG. 58, the prism sheet 254 is added to the backlight unit 2a, or the scattering side wall reflector 247 is used therein to reduce color irregularities, whereby the color consistency of the backlight unit can be improved.

As shown in FIGS. 57A and 57B, when the prism sheet 254 is combined with the side wall reflector 247 for use, color irregularities in the display area of the backlight unit 3 are further reduced, whereby the display quality of the liquid crystal display device can be further improved.

Figure 59:
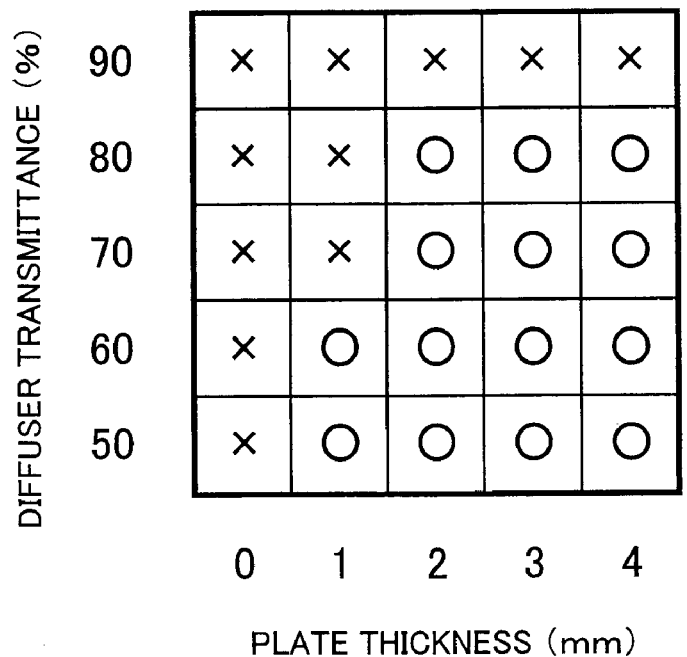
FIG. 59 shows a diagram depicting the relation between the transmittance (%) and the plate thickness (mm) of the transmissive diffuser and color irregularities in the backlight unit according to example 2 of the third preferred embodiment of the present invention.

FIG. 59 shows the relationship between the transmittance (%) and the plate thickness (mm) of the transmissive diffuser 240 and color irregularities. In the drawing, white circles show that color irregularities are hardly visually recognized, and in the drawing, crosses show that color irregularities can be visually recognized. As shown in FIG. 59, a transmissive diffuser 240 having the transmittance of about 80% or below and the plate thickness of about 2 mm or greater is used to further reduce color irregularities in the display area of the backlight unit 3.

As described above, according to the example, since color irregularities in the backlight unit 3 are significantly reduced, a backlight unit 3 and a liquid crystal display device excellent in color consistency can be obtained.

The third preferred embodiment is not limited to the examples, which can be modified variously. Also in the backlight units 2a to 2c according to the example 1, the transmittance of the transmissive diffuser 240 is about 80% or below and the plate thickness is about 2 mm or greater, whereby color irregularities in the display area can be reduced.

Fourth Preferred Embodiment

A fourth preferred embodiment of the present invention relates to a backlight unit (an area illuminating device) and a liquid crystal display device including the same.

For the backlight unit provided in the liquid crystal display device, such configurations are proposed: an edge lit configuration in which white LEDs are arranged on a pair of the side surfaces of light guide plates preferably having a thin, substantially rectangular shape, and a hollow configuration in which white LEDs are arranged and surface each other at a predetermined space with no use of the light guide plate. Furthermore, for the backlight unit, such configurations are proposed: a direct backlight configuration in which a set of LEDs in three primary colors combining LEDs in different light emission colors is arranged on the opposite side of the display plane of a liquid crystal display panel, and a sub-light guide plate configuration in which a sub-light guide plate is used which mixes the lights of LEDs in different light emission colors.

The white LED is formed to combine a yellow fluorescent material with a blue light (B) LED, having the characteristic that unevenness in emission color is relatively small. In a set of LED in three primary colors in which a red (R) LED, a green (G) LED, and a blue LED (B) are combined for use, the width of a single LED is as great as about 10 mm. Therefore, when LEDs are arranged in order of the red LED, the green LED, and the blue LED, for example, the LEDs in the same color are arranged apart at about 30 mm or greater. On this account, a scheme is required to mix emission colors emitted in each of the LEDs. Lumileds Lighting Company, LLC. proposes a backlight unit having a configuration in which a light guiding area for mixing emission colors is not used as a display area (the sub-light guide plate configuration). In addition, in the backlight unit of the direct backlight configuration, it is preferable to provide the thickness of an air layer to a diffuser as about 50 mm or greater in order to sufficiently mix emission colors.

In the conventional backlight unit, the back side of an LED module substrate on which LEDs are mounted is forcedly air cooled, or directly cooled by a heatsink. As a result, temperature variations in the LED module become great so as to cause light emission irregularities in every LED. Accordingly, a problem arises that color irregularities and luminance variations are generated in the area illumination region in the backlight unit. Furthermore, since LEDs of higher temperatures tend to deteriorate, the luminance of the LED drops earlier than the luminance of the other LEDs. Accordingly, a problem arises that color irregularities and luminance variations are generated in the area illumination region in the backlight unit over time.

In the backlight units in the direct backlight configuration and the sub-light guide plate configuration, an LED module is disposed on the back side of the liquid crystal display panel in which the LED module substrate or the back side of a metal plate which holds the LED module substrate is directly cooled. In the backlight units in the hollow configuration and the edge lit configuration, an LED module light source is disposed on the end portion of the area illumination region. In a side emitter backlight unit, since an LED module substrate on which LEDs are arranged is directly oriented toward the back side of the liquid crystal display panel, it is directly air cooled from the back side. An LED module substrate on which top view LEDs are arranged is disposed on the side surface of the light guide plate. Since the LED module substrate is directly exposed to outside for forced air cooling, or a heatsink is mounted for forced air cooling, a problem arises that the width of the frame of the liquid crystal display device is about 50 mm or greater to increase the liquid crystal display device in size.

In order to overcome the problems described above, a fourth preferred embodiment provides a backlight unit and a liquid crystal display device including the same provided with a narrow frame excellent in color consistency.

According to another preferred embodiment, a backlight unit includes a discrete light source section configured to have individual light sources having different spectra or different light emission quantities; a light guide section configured to have one end surface provided with an incident plane which receives a light emitted from the discrete light source section, a light guiding area which guides the light having entered from the incident plane, and a light emission plane which emits the light guided in the light guiding area; a heat conduction section configured to conduct heat generated in the discrete light source section; and a heat insulating section configured to have a contact surface which covers and thermally contacts with a portion of an outer surface of the heat conduction section and to insulate heat as a temperature of the heat conduction section substantially uniformly.

According to the present preferred embodiment, a backlight unit and a liquid crystal display device including the same provided with a narrow frame excellent in color consistency can be implemented.

A backlight unit and a liquid crystal display device including the same according to this preferred embodiment will be described with reference to FIGS. 60 to 69B.

EXAMPLE 1

Figure 60:
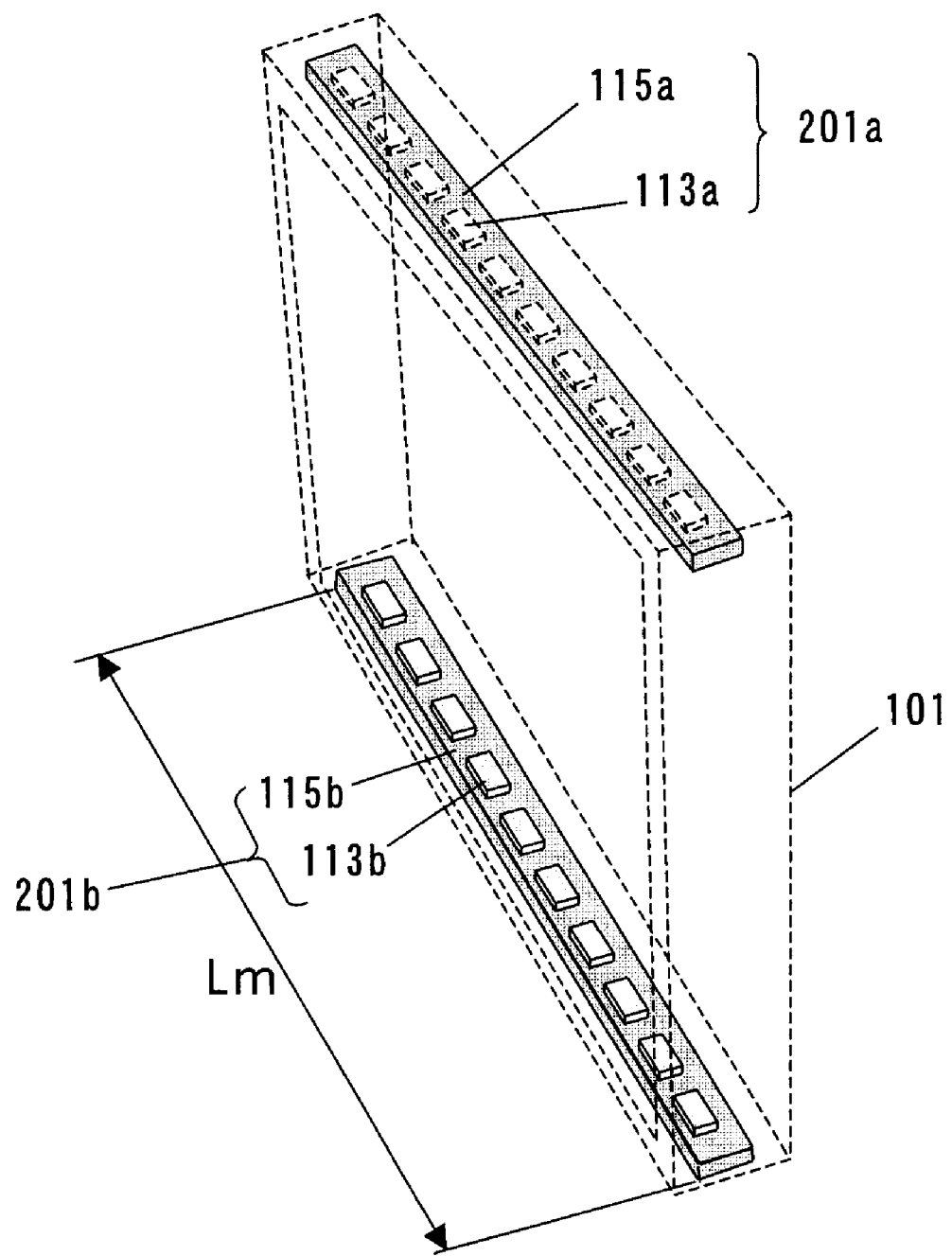
FIG. 60 shows a perspective view depicting the liquid crystal display device according to the fourth preferred embodiment of the present invention.
Figure 61:
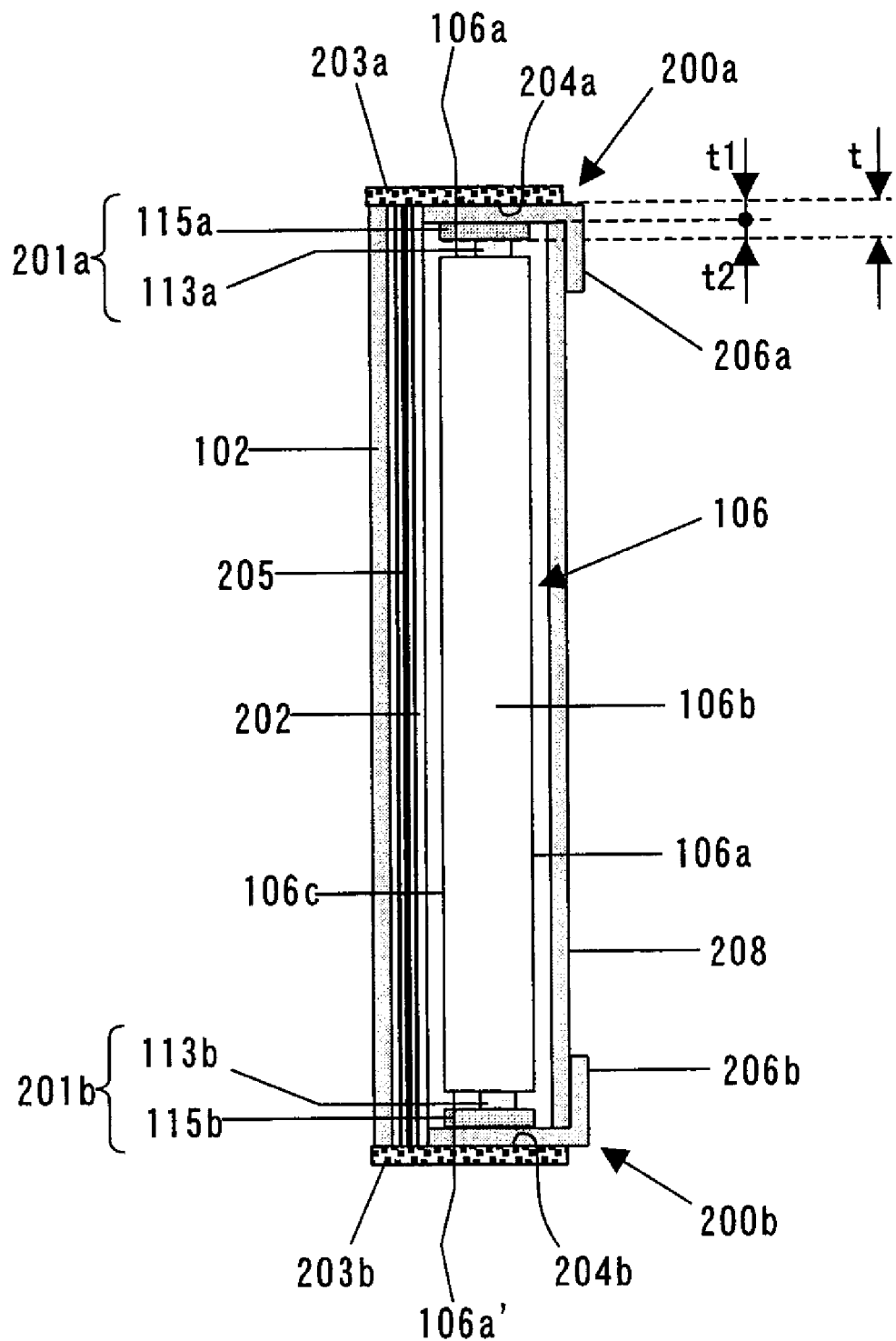
FIG. 61 shows a cross section depicting the liquid crystal display device according to example 1 of the fourth preferred embodiment of the present invention.

A backlight unit and a liquid crystal display device according to this example will be described with reference to FIGS. 60 to 63. FIGS. 60 and 61 show the schematic configuration of the liquid crystal display device according to the present preferred embodiment. FIG. 60 schematically shows the state of the liquid crystal display device provided with LED modules (discrete light source sections) 201a and 201b seen obliquely. In FIG. 60, for easy understanding, a front cover 101 is depicted by broken lines, and a liquid crystal display panel, a light guide plate and other components are omitted.

FIG. 61 shows the cross sectional configuration of the liquid crystal display device. In FIG. 61, the front cover 101 is omitted.

As shown in FIG. 60, the LED modules 201a and 201b are disposed near the side walls in the longitudinal direction of the front cover 101, respectively. The LED modules 201a and 201b face each other in the front cover 101. The LED modules 201a and 201b each have light source fixing members 115a and 115b preferably having a thin, substantially rectangular shape having the length in the longitudinal direction as Lm, and a plurality of LEDs (individual light sources) 113a and 113b mounted as they are aligned substantially on the straight line in the longitudinal direction of the light source fixing members 115a and 115b. For example, the light source fixing members 115a and 115b are formed of a metal having a large heat conductivity such as aluminum. On the surfaces of the light source fixing members 115a and 115b, for example, an insulating layer having a film thickness of a few tens to a few hundreds μm is formed, and a predetermined conductive wiring is patterned on the insulating layer. Accordingly, the light source fixing members 115a and 115b function as circuit boards for LEDs 113a and 113b.

As shown in FIG. 61, the liquid crystal display device has a liquid crystal display panel 102 provided with a pair of substrates disposed facing each other (not shown) and liquid crystals (not shown) sealed between the pair of the substrates, and a backlight unit disposed on the back side of the liquid crystal display panel 102. The backlight unit has the LED modules 201a and 201b facing each other, and a light guide plate (a light guide section) 106 having incident planes 106a and 106a' which receive the light emitted from the LED modules 201a and 201b, and a light emission plane 106c which emits the light guided in a light guiding area 106b. The incident plane 106a is formed on one end surface of the light guide plate 106, and the incident plane 106a' is formed in the opposing surface facing the one end surface of the light guide plate 106. Furthermore, the backlight unit has substantially L-shaped heat conduction members 200a and 200b as a heat conduction section configured to conduct the heat generated in the LED modules 201a and 201b, and heat insulating members (heat insulating sections) 203a and 203b which partially cover and thermally contact with the outer surfaces of the substantially L-shaped heat conduction members 200a and 200b to thermally insulate the temperature of the substantially L-shaped heat conduction members 200a and 200b substantially uniformly. For example, the heat insulating members 203a and 203b are preferably formed of a polycarbonate resin having a thin, substantially rectangular shape extending in the normal direction in the drawing. The heat insulating members 203a and 203b have contact surfaces 204a and 204b which thermally contact with the substantially L-shaped heat conduction members 200a and 200b, respectively.

The substantially L-shaped heat conduction members 200a and 200b are preferably formed in an L shape in the planes substantially perpendicular to each of the light emission plane 106c of the light guide plate 106 and to the contact surfaces 204a and 204b of the heat insulating members 203a and 203b. For example, the substantially L-shaped heat conduction members 200a and 200b are preferably formed of an aluminum material. The substantially L-shaped heat conduction members 200a and 200b have heat dissipation surfaces 206a and 206b on the opposite side of the surface facing the back side of the light emission plane 106c, the heat dissipation surfaces dissipate the heat generated in the LED modules 201a and 201b. On the heat dissipation surfaces 206a and 206b, a surface treatment such as anodizing and coating is applied so as to provide high infrared emissivity, for example. In addition, in the substantially L-shaped heat conduction members 200a and 200b, the heat dissipation surfaces 206a and 206b are exposed to outside air, whereby heat dissipation properties are improved.

Between the substantially L-shaped heat conduction members 200a and 200b and the light source fixing members 115a and 115b, a deformable material such as a heat dissipation sheet is sandwiched therebetween in order to reduce thermal resistance. For a scheme to reduce the thermal resistances between the substantially L-shaped heat conduction members 200a and 200b and the light source fixing members 115a and 115b, it is not limited to sandwiching a heat dissipation sheet, etc. For example, such schemes may be done such that the substantially L-shaped heat conduction members 200a and 200b are screwed to the light source fixing members 115a and 115b, are bonded with an adhesive or with a sticky material, or are fused with a silver paste material.

The thermal resistance of the heat insulating member 203a from the contact surface 204a to the back side of the contact surface 204a is higher than the thermal resistance of the substantially L-shaped heat conduction member 200a from the inflow portion of the heat generated in the LED module 201a to the heat dissipation surface 206a. Furthermore, the thermal resistance of the heat insulating member 203a is higher than the thermal resistance of the substantially L-shaped heat conduction member 200a in the plane in parallel with the contact surface 204a. Similarly, the thermal resistance of the heat insulating member 203b from the contact surface 204b to the back side of the contact surface 204b is higher than the thermal resistance of the substantially L-shaped heat conduction member 200b from the inflow portion of the heat generated in the LED module 201b to the heat dissipation surface 206b. Furthermore, the thermal resistance of the heat insulating member 203b is higher than the thermal resistance of the substantially L-shaped heat conduction member 200b in the plane in parallel with the contact surface 204b.

Accordingly, the heat conducted to the heat insulating members 203a and 203b through the substantially L-shaped heat conduction members 200a and 200b is hard to dissipate from the back sides of the contact surfaces 204a and 204b contacting with outside air, and the heat is insulated in the heat insulating members 203a and 203b. With no provision of the heat insulating members 203a and 203b, the heat conducted to the substantially L-shaped heat conduction members 200a and 200b is dissipated from the heat dissipation surfaces 206a and 206b as well as the back side of the contact surface with the LED modules 201a and 201b. As a result, heat is dissipated outside before the heat is transferred from a high temperature portion to a low temperature portion in the substantially L-shaped heat conduction members 200a and 200b, and the temperatures are made uniform. Thus, temperature variations tend to occur. However, in the backlight according to the example, heat is minimally dissipated from the back side of the contact surfaces of the LED modules 201a and 201b because of the heat insulating members 203a and 203b. As a result, heat is transferred from the high temperature portion to the low temperature portion in the substantially L-shaped heat conduction members 200a and 200b, and temperature variations in the plane in parallel with the contact surfaces 204a and 204b are minimized. Accordingly, the temperatures in the substantially L-shaped heat conduction members 200a and 200b are substantially made uniform. In addition, the temperatures are made uniform in the substantially L-shaped heat conduction members 200a and 200b, whereby the temperatures in the LED modules 201a and 201b are made substantially uniform.

In the conventional backlight unit, the incident plane of the light guide plate is formed in a rough cut surface. On the other hand, in the backlight unit according to the example, the incident planes 106a and 106a' have mirror-finished surfaces in order to utilize the mirror inversion effect of the LED array. A reflection sheet, not shown, disposed on the outside of the incident planes 106a and 106a' (the side wall of the light guide plate 106) functions as it returns the light having passed through the light guide plate 106 to the light guiding area 106b. The back side of the light emission plane 106c of the light guide plate 106 is formed in a scattering plane by screen printing. On the scattering plane side, the reflection sheet, not shown, and a supporting member (a supporting section) 208 which supports the substantially L-shaped heat conduction members 200a and 200b in a predetermined space are disposed in this order. For example, the supporting member 208 is preferably formed of an aluminum material to have a thin, substantially rectangular shape. The supporting member 208 is thermally contacted with the substantially L-shaped heat conduction members 200a and 200b on the back sides of the heat dissipation surfaces 206a and 206b. On at least a portion of a plane of the supporting member 208 thermally contacted with the substantially L-shaped heat conduction members 200a and 200b, a similar surface treatment as the heat dissipation surfaces 206a and 206b is applied. Accordingly, in the backlight unit, the heat generated in the LED modules 201a and 201b is more easily dissipated.

A transmissive diffuser 202 having a thin, substantially rectangular shape with a thickness of about 2 mm is arranged to face the light emission plane 106c of the light guide plate 106. On the light emission plane side of the transmissive diffuser 202, an optical sheet 205 such as a polarizer sheet and a diffuser sheet and the liquid crystal display panel 102 are disposed in this order.

Figure 62:
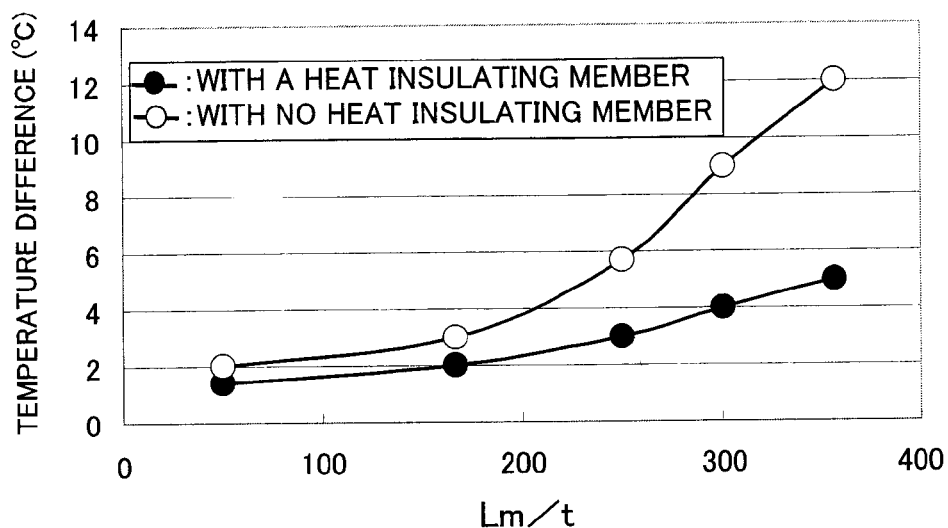
FIG. 62 shows a graph depicting the temperature variations in the LED modules depending on the presence of the heat insulating members in the backlight unit according to example 1 of the fourth preferred embodiment of the present invention.

FIG. 62 shows a graph depicting the temperature variations in the LED modules 201a and 201b depending on the presence of the heat insulating members 203a and 203b. The horizontal axis shows a ratio (Lm/t) between a length Lm of the light source fixing members 115a and 115b and a total thickness t of a thickness t1 of the light source fixing members 115a and 115b and a thickness t2 of the substantially L-shaped heat conduction members 200a and 200b, and the vertical axis shows a temperature difference (° C.) between the maximum temperature and the minimum temperature in the LED modules 201a and 201b. In the drawing, a curve connecting black circles depicts the properties when the heat insulating members 203a and 203b are provided, and a curve connecting white circles depicts the properties when the heat insulating members 203a and 203b are not provided.

As shown in FIG. 62, in the light source fixing members 115a and 115b having a thickness of about 2 mm and the length Lm of about 300 mm, when the heat insulating members 203a and 203b are provided, the temperatures of the substantially L-shaped heat conduction members 200a and 200b are made uniform. Thus, the temperature difference in each of the LED modules 201a and 201b can be suppressed to about 4° C. On the other hand, when the heat insulating members 203a and 203b are not provided, the temperature differences in the LED modules 201a and 201b are as great as about 9° C. Additionally, for example, when the temperature differences in the LED modules 201a and 201b are about 10° C., in the LED emitting red light (the red LED), a difference of about 12% is generated in the light emission quantity among individual LEDs, whereas in the LED emitting blue light (the blue LED), little difference is generated as about 0% in the light emission quantity among individual LEDs. As a result, white chromaticity of the mixed color thereof is varied by 0.01 or greater in the xy chromaticity coordinate system. Thus, color irregularities and luminance variations in the illuminating area (the area illumination region) in which the backlight unit illuminates the display area of the liquid crystal display panel 102 are clearly visually recognized.

In addition, for example, when a temperature difference of about 10° C. is generated for every red LED, the light emission quantity of the red LED at a high temperature with respect to the light emission quantity of the red LED at a low temperature is reduced by about 5% after about 50 thousand hours, and by about 10% after about 100 thousand hours. The variation over time in the light emission quantity of the red LED causes an increase in color irregularities in the area illumination region. In the present preferred embodiment, the temperature difference in each of the LED modules 201a and 201b can be suppressed to about 4° C. by the heat insulating members 203a and 203b. Accordingly, color irregularities and luminance variations in the area illumination region in the backlight unit can be reduced significantly.

Figure 63:
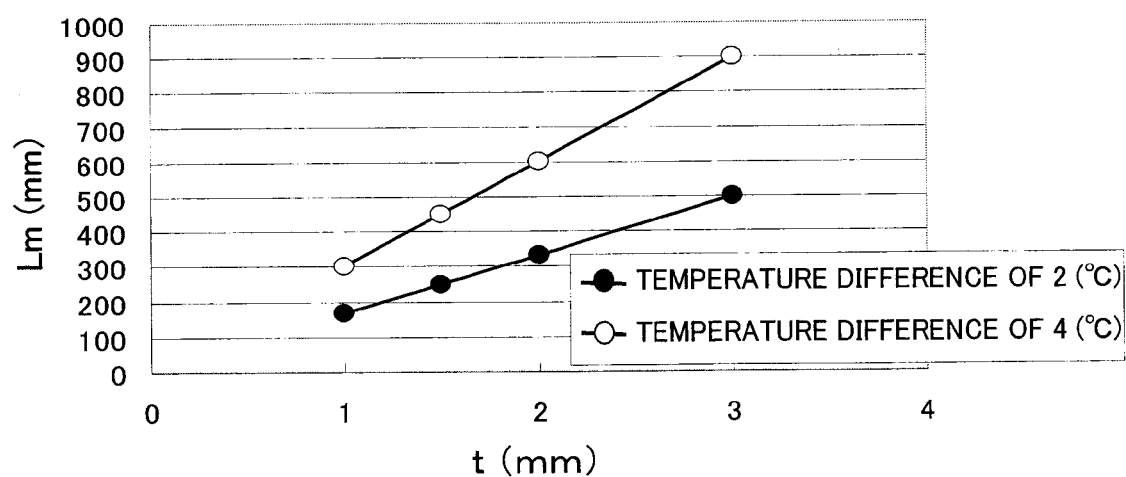
FIG. 63 shows a graph depicting the relationship between the length Lm and the total thickness t of the light source fixing members in which the temperature differences in the LED modules are equal to a predetermined temperature or below in the backlight unit according to example 1 of the fourth preferred embodiment of the present invention.

FIG. 63 shows the relationship between the length Lm and the total thickness t of the light source fixing members 115a and 115b where the temperature differences in the LED modules 201a and 201b are equal to or below a predetermined temperature. The horizontal axis shows the total thickness t of the light source fixing members 115a and 115b and the substantially L-shaped heat conduction members 200a and 200b, and the vertical axis shows the length Lm (mm) of the light source fixing members 115a and 115b. In the drawing, a straight line connecting black circles depicts the properties that the temperature difference is 2° C., and in the drawing, a curve connecting white circles depicts the properties that the temperature difference is 4° C.

As shown in FIG. 63, when the length Lm of the light source fixing members 115a and 115b is made short with respect to the total thickness t of the light source fixing members 115a and 115b and the substantially L-shaped heat conduction members 200a and 200b, the temperature difference can be made small. In addition, when the relation Lm/t≦300 is maintained between the length Lm of the light source fixing members 115a and 115b and the total thickness t (mm) of the light source fixing members 115a and 115b and the substantially L-shaped heat conduction members 200a and 200b, the temperature difference in the LED modules 201a and 201b can be reduced to about 4° C. or below. The LED modules 201a and 201b and the substantially L-shaped heat conduction members 200a and 200b are formed so as to satisfy the equation, whereby color irregularities and luminance variations in the area illumination region in the backlight unit can be reduced significantly. In addition, since the variation over time in color irregularities and luminance variations is also decreased, the backlight unit and the liquid crystal display device can have a long lifetime.

As described above, according to the backlight unit of the example, the temperature differences in the LED modules 201a and 201b can be made small and substantially uniform by the heat insulating members 203a and 203b in thermal contact with the substantially L-shaped heat conduction members 200a and 200b, respectively. Accordingly, since the light emission irregularities for each of the LEDs 113a and 113b and the variation over time in the light emission quantity are decreased, color irregularities and luminance variations in the area illumination region in the backlight unit are significantly reduced, and a backlight unit and a liquid crystal display device including the same can have a long lifetime. Furthermore, since heat can be dissipated by the heat dissipation surfaces 206a and 206b of the substantially L-shaped heat conduction members 200a and 200b disposed on the back side of the light emission plane 106c of the light guide plate 106, it is unnecessary to dispose a heat cooling section such as a heatsink on the side of the incident plane 106a and 106a' of the light guide plate 106, and the backlight unit and the liquid crystal display device can have a narrow frame.

EXAMPLE 2

Figure 64:
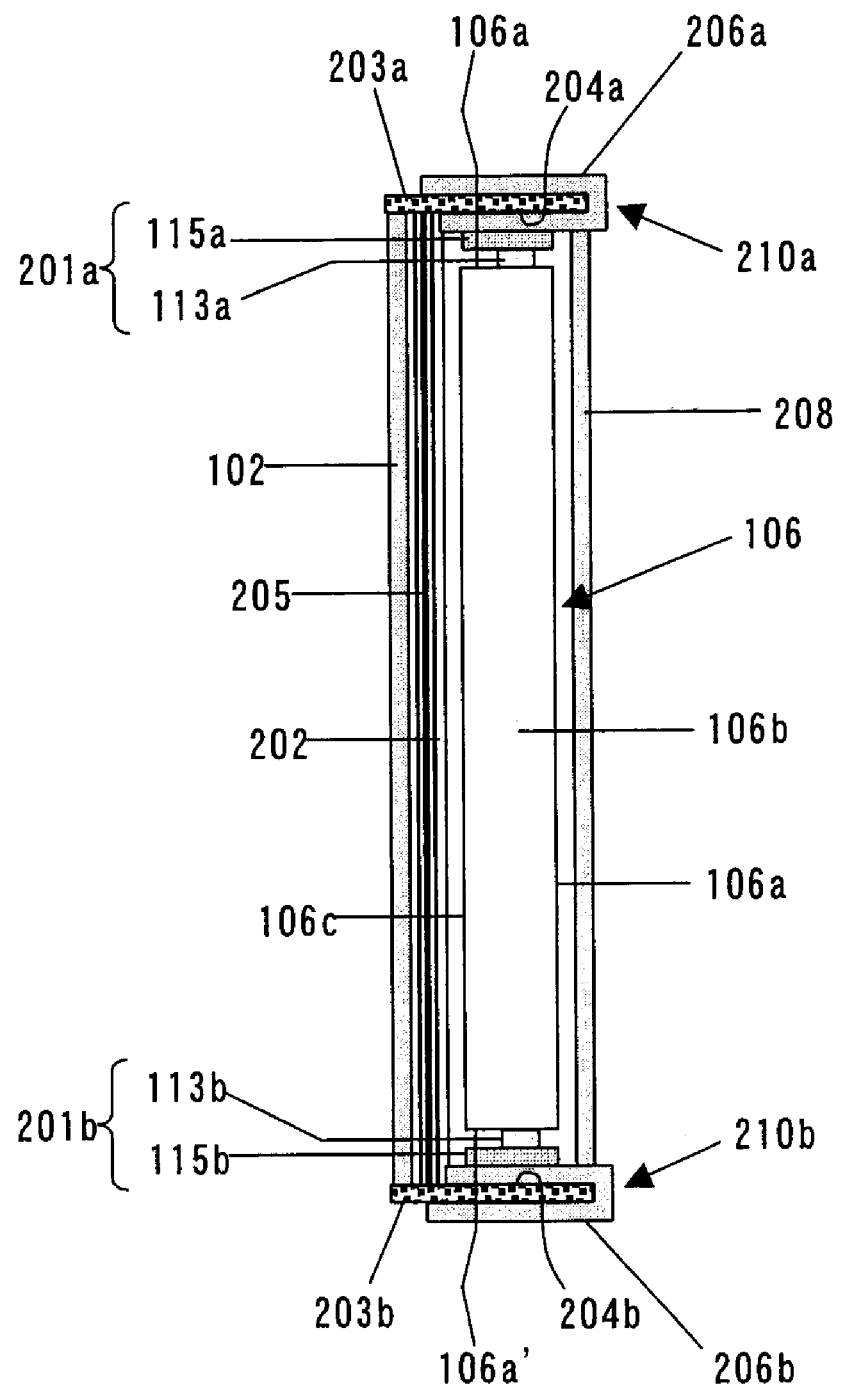
FIG. 64 shows a cross section depicting the liquid crystal display device according to example 2 of the fourth preferred embodiment of the present invention.

Next, a backlight unit and a liquid crystal display device including the same according to example 2 of the preferred embodiment will be described with reference to FIG. 64. FIG. 64 shows a cross section depicting the liquid crystal display device according to the example. As shown in FIG. 64, the backlight unit provided in the liquid crystal display device according to the example is characterized in that inclusion type heat conduction members 210a and 210b are provided which are folded in the plane substantially in parallel with incident planes 106a and 106a' of a light guide plate 106 to sandwich and include heat insulating members 203a and 203b, respectively. The inclusion type heat conduction members 210a and 210b have heat dissipation surfaces 206a and 206b, respectively, in the plane substantially in parallel with contact surfaces 204a and 204b of the heat insulating members 203a and 203b. On the heat dissipation surfaces 206a and 206b, surface treatment such as anodizing and coating is preferably applied in order to increase infrared emissivity, for example. The inclusion type heat conduction members 210a and 210b are provided with high heat dissipation properties by contacting the heat dissipation surfaces 206a and 206b with outside air.

The thermal resistances of the heat insulating members 203a and 203b from the contact surfaces 204a and 204b to the back side of the contact surfaces 204a and 204b are higher than the thermal resistances of the inclusion type heat conduction members 210a and 210b from the inflow portion of the heat generated in the LED modules 201a and 201b to the heat dissipation surfaces 206a and 206b. Accordingly, the temperature in the inclusion type heat conduction members 210a and 210b can be made substantially uniform to dissipate heat. Furthermore, the thermal resistances of the heat insulating members 203a and 203b are higher than the thermal resistances of the inclusion type heat conduction members 210a and 210b in the plane substantially in parallel with the contact surfaces 204a and 204b. In addition, since heat is conducted to a supporting member 208 thermally contacted with the inclusion type heat conduction members 210a and 210b, the temperatures in the entire LED modules 201a and 201b can be reduced as the temperatures in the LED modules 201a and 201b are made substantially uniform. Accordingly, the backlight unit according to the example can obtain similar advantages as those of the example.

EXAMPLE 3

Figure 65:
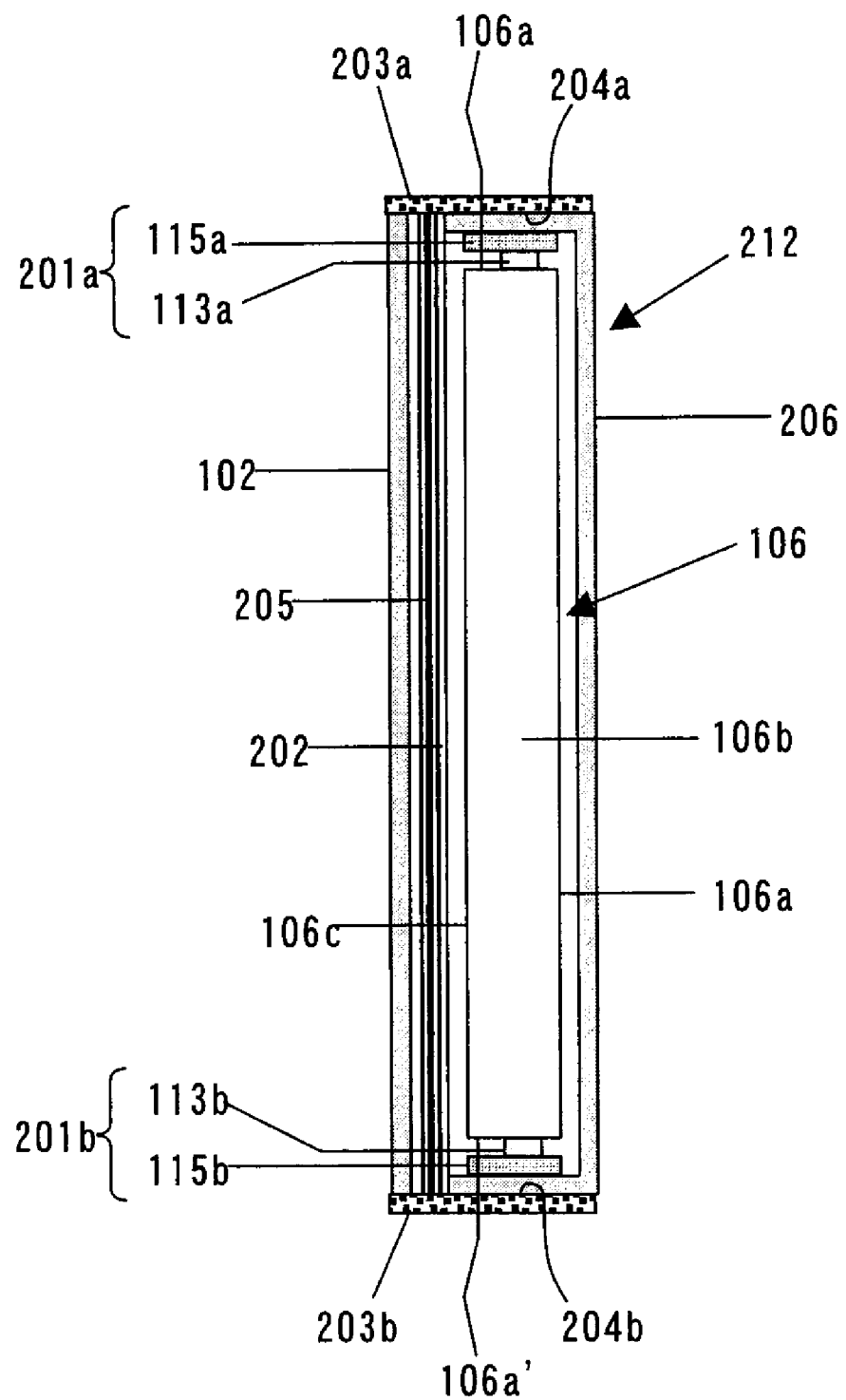
FIG. 65 shows a cross section depicting the liquid crystal display device according to example 3 of the fourth preferred embodiment of the present invention.

Next, a backlight unit according to example 3 of the present preferred embodiment will be described with reference to FIG. 65. FIG. 65 shows a cross section depicting the backlight unit according to the example. As shown in FIG. 65, the backlight unit according to the example is characterized in that a substantially U-shaped heat conduction member 212 is provided which is formed in one piece so as to conduct the heat generated in both of LED modules 201a and 201b and preferably has a substantially U-shaped configuration in the planes that are substantially perpendicular to each of a light emission plane 106c and contact surfaces 204a and 204b. The substantially U-shaped heat conduction member 212 has a heat dissipation surface 206 on the opposite side of the plane facing the back side of a light emission plane 106c. For example, a surface treatment such as anodizing and coating is preferably applied to the heat dissipation surface 206 in order to increase infrared emissivity. The substantially U-shaped heat conduction member 212 is provided with high heat dissipation properties by contacting the heat dissipation surface 206 with outside air.

The thermal resistances of the heat insulating members 203a and 203b from the contact surfaces 204a and 204b to the back side of the contact surfaces 204a and 204b are higher than the thermal resistance of the substantially U-shaped heat conduction member 212 from the inflow portion of the heat generated in the LED modules 201a and 201b to the heat dissipation surface 206. Furthermore, the thermal resistances of the heat insulating members 203a and 203b are higher than the thermal resistance of the substantially U-shaped heat conduction member 212 in the plane substantially in parallel with the contact surfaces 204a and 204b. Accordingly, the backlight unit according to the example can obtain similar advantages as those of the example. In addition, in the substantially U-shaped heat conduction member 212, the heat conduction section is combined with the supporting section as one piece, and thus the heat generated in the LED modules 201a and 201b is easily conducted to the back side of the light emission plane 106c. Furthermore, since the heat dissipation surface 206 is formed on the entire surface of the substantially U-shaped heat conduction member 212 is positioned on the back side of the light emission plane 106c, heat can be more efficiently dissipated than in the examples 1 and 2, and the temperatures in the entire LED modules 201a and 201b can be further reduced.

Furthermore, since a supporting section is unnecessary, the number of components in the backlight unit is reduced. The assembly process of the heat conduction section and the supporting section is also unnecessary. Therefore, the backlight unit and the liquid crystal display device can be decreased in cost.

EXAMPLE 4

Figure 66:
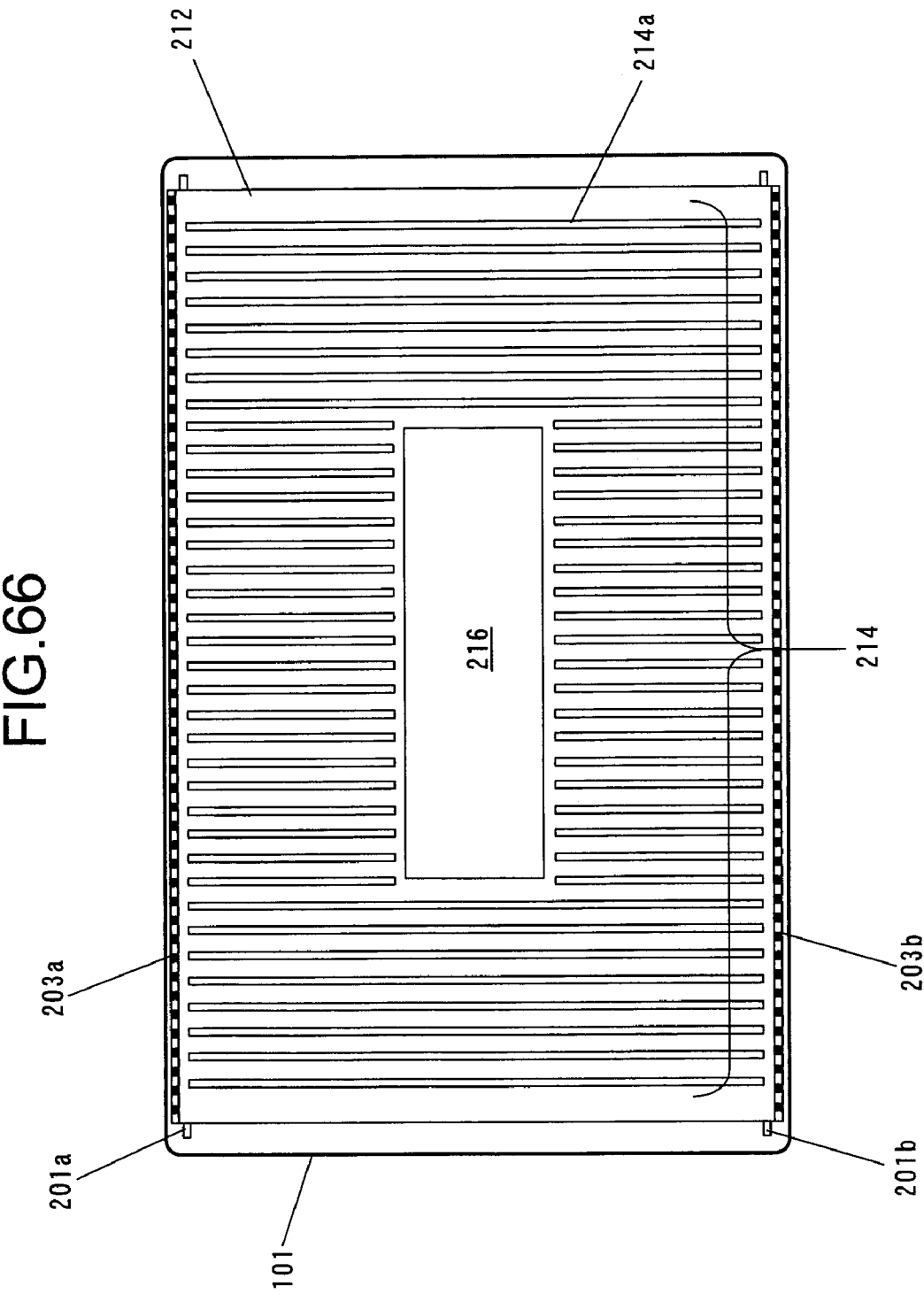
FIG. 66 shows a diagram depicting the state of the liquid crystal display device seen from the back side of the display screen according to example 4 of the fourth preferred embodiment of the present invention.

Next, a backlight unit and a liquid crystal display device including the same according to example 4 of the present preferred embodiment will be described with reference to FIGS. 66 to 69B. FIG. 66 shows the state of the liquid crystal display device according to the example seen from the back side of a display screen. As shown in FIG. 66, the backlight unit provided in the liquid crystal display device according to the example is characterized in that it is provided with a substantially U-shaped heat conduction member 212 as a heat conduction section and a heatsink 214 as a heat dissipation section which dissipates the heat conducted to the substantially U-shaped heat conduction member 212.

As shown in FIG. 66, at least a portion of the heatsink 214 is extended from the vicinity of an LED module 201a to the vicinity of an LED module 201b, and is formed in one piece with the substantially U-shaped heat conduction member 212. In addition, radiation fins 214a of the heatsink 214 extend from the vicinity of the LED module 201a to the vicinity of the LED module 201b. On at least a portion of the outer surface of the heatsink 214, a similar surface treatment as a heat dissipation surface 206 of the substantially U-shaped heat conduction member 212 according to the example above is applied. In the area substantially at the center portion of the substantially U-shaped heat conduction member 212 in the drawing, the area to dispose a circuit board (not shown) which is mounted with a predetermined circuit to drive the LED modules 201a and 201b and other components is allocated. The circuit board is covered with a protection cover 216 having the outer surface on which a similar surface treatment as the heat dissipation surface 206 is applied.

Figure 67:
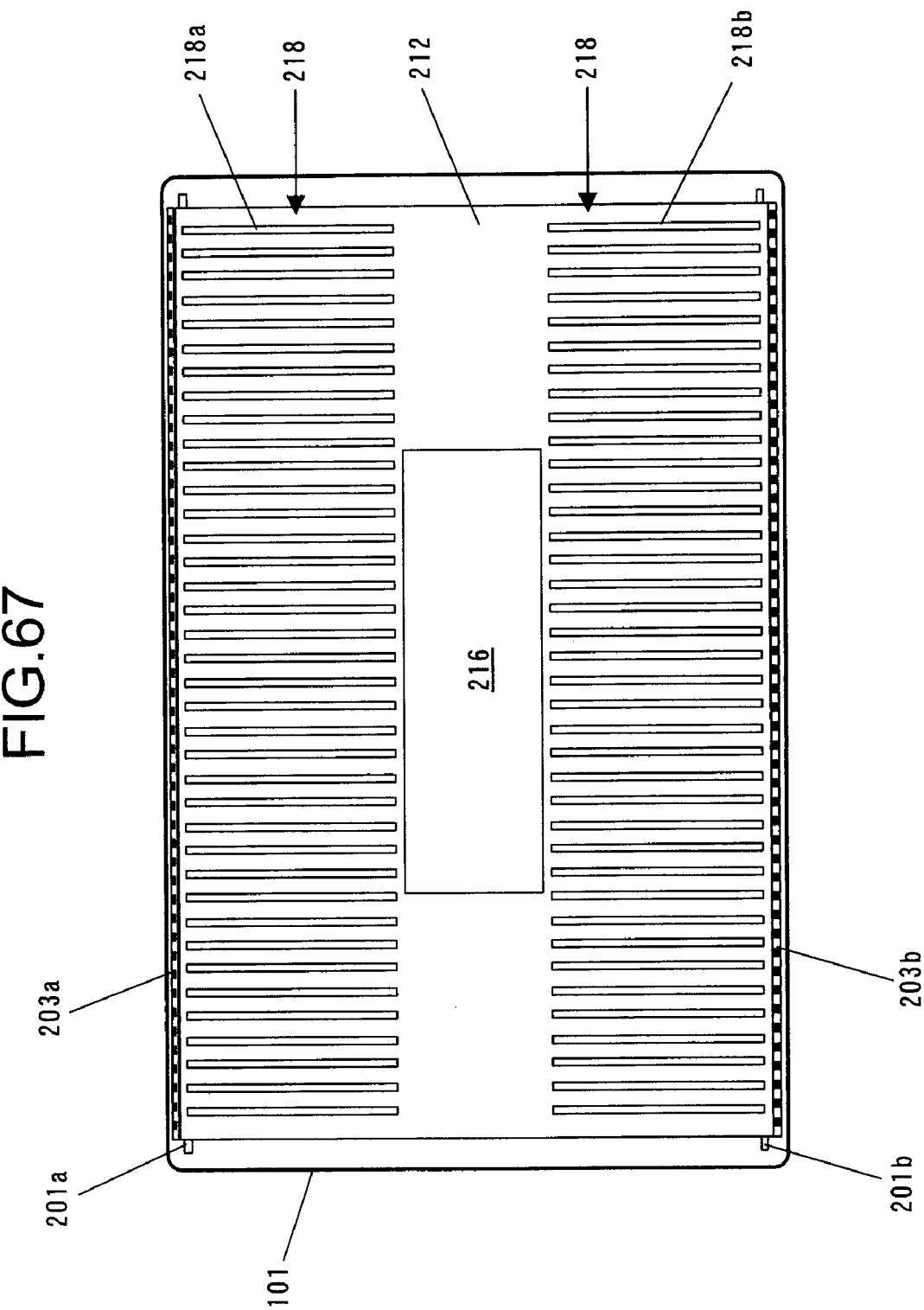
FIG. 67 shows a diagram depicting the state of the liquid crystal display device seen on the back side of the display screen as the comparative example with the liquid crystal display device according to example 4 of the fourth preferred embodiment of the present invention.

FIG. 67 shows the state of a liquid crystal display device as a comparative example seen from the back side of a display screen. As shown in FIG. 67, the backlight unit provided in the liquid crystal display device has heatsinks 218 which are disposed in a substantially U-shaped heat conduction member 212 substantially symmetrical to the area in which the protection cover 216 is extended in the longitudinal direction. The heatsink 218 has radiation fins 218a and 218b which are extended in the short direction of the backlight unit and are formed in one piece with the substantially U-shaped heat conduction member 212.

In the backlight unit according to the comparative example, the temperature difference between the LED modules 201a and 201b is about 8° C., whereas in the backlight unit according to the example, the temperature difference between the LED modules 201a and 201b is about 4° C. The heatsink 214 is formed in one piece to decrease the temperature difference between the LED modules 201a and 201b to about a half. Accordingly, color irregularities and luminance variations in the light emission plane of the backlight unit can be significantly reduced, and the backlight unit and the liquid crystal display device including the same can have a long lifetime.

Furthermore, in the conventional backlight unit, electric power (32 W) is uniformly inputted to the LED modules 201a and 201b in order to eliminate the temperature difference of 4° C. between the LED modules 201a and 201b. In the backlight unit according to the example, the power is about 30 W that is reduced by about 2 W in an LED module (for example, the LED module 201a) disposed on the upper side in which the temperature tends to relatively rise, and the power is about 34 W that is increased by about 2 W in an LED module (for example, the LED module 201b) disposed on the lower side in which the temperature tends to relatively drop. Accordingly, the temperature of LEDs 113a of the LED module 201a drops by about 2° C., and the temperature of LEDs 113b of the LED module 201b rises by about 2° C. Accordingly, the temperatures of the LED modules 201a and 201b can be made almost the same.

Figure 68:
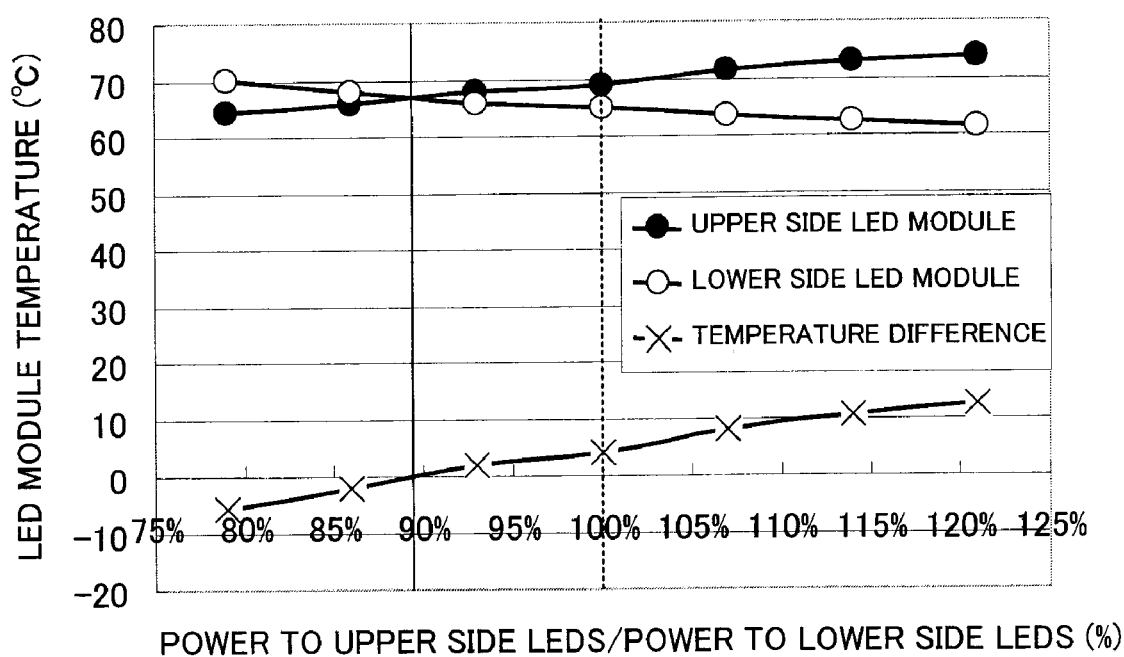
FIG. 68 shows a graph depicting the temperature change with respect to the input electric power to the LED modules in the backlight unit according to example 4 of the fourth preferred embodiment of the present invention.
Figure 69:
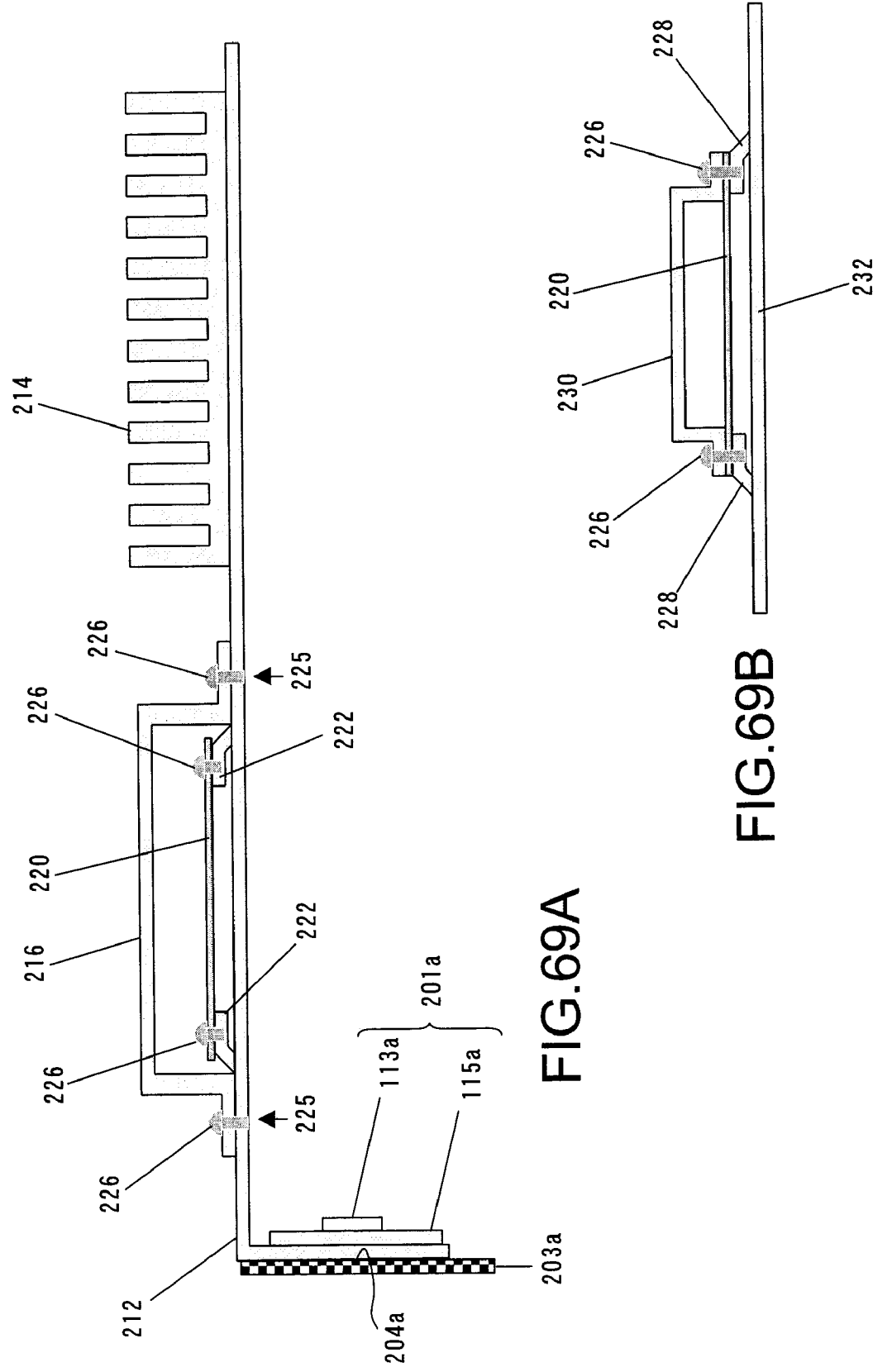
FIGS. 69A and 69B show diagram illustrative of the structure of mounting the protection cover on the substantially U-shaped heat conduction member in the backlight unit according to example 4 of the fourth preferred embodiment of the present invention.
Figure 70:
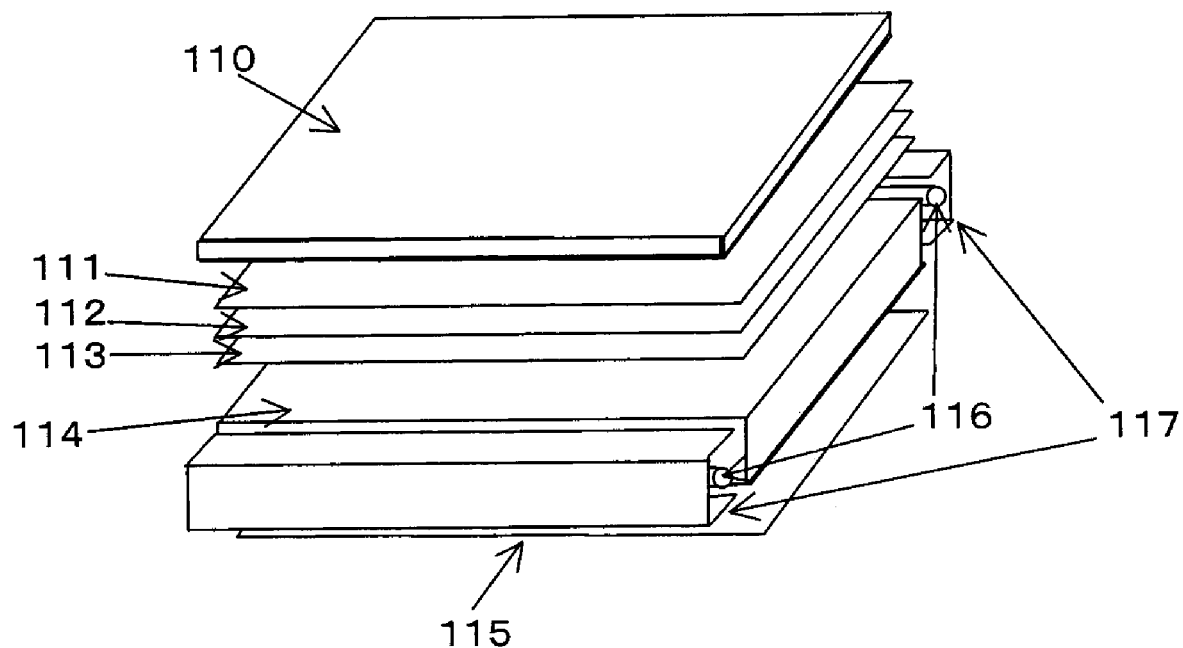
FIG. 70 shows a diagram depicting the schematic structure of the conventional liquid crystal display device.

FIG. 68 shows a graph depicting the temperature change with respect to the input electric power to the LED modules 201a and 201b. The horizontal axis shows a ratio (%) between the input electric power to the LED module 201a (upper side LED module) and the input electric power to the LED module 201b (lower side LED module), and the vertical axis shows the temperatures (° C.) of the LED modules 201a and 201b. In the drawing, a curve connecting black circles depicts the temperature properties of the LED module 201a (on the upper side), a curve connecting white circles depicts the temperature properties of the LED module 201b (on the lower side), and a curve connecting crosses depicts the properties of the temperature differences in the LED modules 201a and 201b.

As shown in FIG. 68, for example, when the input electric power of each of the LED modules 201a and 201b is equal to 32 W and the electric power ratio is 100%, the temperature difference between the LED modules 201a and 201b is about 4° C. In this state, the temperature of the LED module 201a is higher than the temperature of the LED module 201b. Then, the input electric power to the LED module 201a is reduced by about 2 W, whereas the input electric power to the LED module 201b is increased by about 2 W, and the ratio of the input electric power to the LED modules 201a and 201b is about 90%.

Accordingly, the temperature difference between the LED modules 201a and 201b can be made substantially 0° C. The highest temperature of the LED module 201a is reduced by about 2° C. whereas the highest temperature of the LED module 201b is increased by about 2° C. However, the temperature difference between the LED modules 201a and 201b can be made substantially 0° C., whereby color irregularities and luminance variations in the area illumination region in the backlight unit can be significantly reduced, and the backlight unit and the liquid crystal display device including the same can have a long lifetime. In addition, the total electric power inputted to the LED modules 201a and 201b is 64 W, the same as that of the conventional backlight unit. Therefore, the luminance of the backlight unit and the luminance of the display screen of the liquid crystal display device are hardly increased or decreased.

For a scheme to vary the input electric power to each of the LED modules 201a and 201b, such schemes may be done in which the total input electric power to all the LEDs 113a mounted on the LED module 201a is varied from the total input electric power to all the LEDs 113b mounted on the LED module 201b, and the input electric power to LEDs of a predetermined emission color (for example, red LEDs) in all the LEDs 113a mounted on the LED module 201a is varied from the input electric power to LEDs in the same color of the LEDs of predetermined emission color (for example, red LEDs) in all the LEDs 113b mounted on the LED module 201b.

FIGS. 69A and 69B schematically show a cross section depicting an essential portion of the backlight unit in order to explain the structure of mounting the protection cover 216 on the substantially U-shaped heat conduction member 212. FIG. 69A shows a cross section depicting an essential portion of the backlight unit according to the example, and FIG. 69B shows a cross section depicting an essential portion of a conventional backlight unit as a comparative example. In addition, for easy understanding, FIG. 69A shows the heatsink 214 rotated at an angle of 90 degrees as the normal direction of the heat dissipation surface of the substantially U-shaped heat conduction member 212 is the rotation axis.

As shown in FIG. 69B, in the conventional backlight unit, a protection cover 230 is fixed to a fixing portion 228 formed in a supporting member 232 along with a circuit board 220.

On the other hand, as shown in FIG. 69A, in the backlight unit according to the example, the protection cover 216 is fixed to the substantially U-shaped heat conduction member 212 at the position different from the circuit board 220.

More specifically, the substantially U-shaped heat conduction member 212 has circuit board fixing portions 222 which thermally contact and fix the circuit board 220, and a protection cover fixing portion 225 which thermally contacts and fixes the protection cover 216 of the circuit board 220 at a position different from the circuit board fixing portions 222. For example, the circuit board fixing portions 222 is formed in such a way that a portion of the substantially U-shaped heat conduction member 212 is cut and raised. The circuit board 220 is screwed to the circuit board fixing portions 222 with screws 226. In addition, the protection cover 216 is screwed to the protection cover fixing portion 225 with screws 226. Thus, the protection cover 216 is directly contacted with the substantially U-shaped heat conduction member 212. A scheme of fixing the circuit board 220 and the protection cover 216 is not limited to fixing with screws. For example, such schemes may be done in which a deformable material such as a heat dissipation sheet to reduce the thermal resistance is sandwiched between the circuit board 220 and the protection cover 216 and the fixing portions 222 and 225, and between the circuit board 220 and the protection cover 216 and the fixing portions 222 and 225, they are bonded with an adhesive or with a sticky material, or they are fused with a silver paste material.

The structure in which the protection cover 216 is directly fixed to the substantially U-shaped heat conduction member 212 like the backlight unit according to the example can more improve heat conduction to the protection cover 216 than the structure in which the protection cover 230 is fixed to the supporting member 232 through the circuit board 220 like the conventional backlight unit. In other words, since the thermal resistances of the substantially U-shaped heat conduction member 212 and the protection cover 216 are made small, a great heat transfer from the substantially U-shaped heat conduction member 212 to the protection cover 216 is achieved.

Furthermore, on at least a portion of the surface of the substantially U-shaped heat conduction member 212 on which the circuit board fixing portions 222 and others are formed, the front and back sides of the protection cover 216, and the outer surface of the heatsink 214, a surface treatment such as anodizing and coating is preferably applied in order to improve infrared emissivity. Accordingly, the heat dissipation effect of the backlight unit can be improved.

The surface treatment is applied to improve infrared emissivity, whereby the temperature increase in the substantially U-shaped heat conduction member 212 from room temperature is reduced from about 80% to about 85% as compared with the case in which the surface treatment is not applied. More specifically, the temperature increases in the protection cover 216 and the heatsink 214 before being anodized are about 23° C. and about 31° C., respectively, but the temperature rises drop to about 20° C. and about 25° C., respectively, by anodizing. Furthermore, when the protection cover 216 is directly fixed to the substantially U-shaped heat conduction member 212, the temperature increase in the protection cover 216 is increased to about 23° C., but the temperature increase in the heatsink 214 thermally coupled to the LED module 201a drops to about 24° C.

As described above, according to the example, the temperatures of the LED modules 201a and 201b can be made substantially uniform and heat can be efficiently dissipated, whereby color consistency and luminance consistency of the backlight unit and the liquid crystal display device can be significantly improved, and the backlight unit and the liquid crystal display device can have a long lifetime.

The present preferred embodiment is not limited to the examples, which can be modified variously.

In the examples, the backlight unit preferably has any one of the substantially L-shaped heat conduction members 200*a* and 200*b*, the inclusion type heat conduction members 210*a* and 210*b*, and the substantially U-shaped heat conduction member 212 as the heat conduction section, but the preferred embodiments are not limited thereto. For example, in the backlight unit, the light source fixing members 115*a* and 115*b* may have the same shape of the substantially L-shaped heat conduction members 200*a* and 200*b* as the heat conduction section, and may have the heat dissipation surface. The heat insulating members 203*a* and 203*b* are thermally contacted with the light source fixing members 115*a* and 115*b*, whereby similar advantages as those of the present preferred embodiment can be obtained.

In addition, the backlight unit according to example 4 has the substantially U-shaped heat conduction member 212, but the preferred embodiments are not limited thereto. For example, the backlight unit may have the substantially L-shaped heat conduction members 200*a* and 200*b* or the inclusion type heat conduction members 210*a* and 210*b*, whereby similar advantages as those of example 4 can be obtained.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A backlight unit comprising:
   a discrete light source section configured to have individual light sources having different spectra or different light emission quantities;
   a light guide section configured to have one end surface which is provided with an incident plane which receives a light emitted from the discrete light source section, a light guiding area which guides the light having entered from the incident plane, and a light emission plane which emits the light guided in the light guiding area;
   a heat conduction section configured to conduct heat generated in the discrete light source section; and
   a heat dissipation section disposed on a back side of the light emission plane and configured to dissipate heat conducted through the heat conduction section; wherein
   the heat conduction section has a substantially L-shaped heat conduction member which is bent along the light guide section and is substantially L-shaped in cross section.

2. The backlight unit according to claim 1, wherein the heat conduction section has a light source fixing member which is bent along the light guide section and has a substantially L-shaped configuration in cross section, and which fixes the discrete light source section.

3. The backlight unit according to claim 2, wherein at least one of the substantially L-shaped heat conduction member and the light source fixing member is thermally contacted with the heat dissipation section.

4. The backlight unit according to claim 2, further comprising a protecting section configured to protect the light guide section between the light guide section and the heat dissipation section, wherein the protecting section is thermally contacted with the heat conduction section.

5. The backlight unit according to claim 4, wherein the protecting section is thermally contacted with at least one of the substantially L-shaped heat conduction member and the light source fixing member.

6. The backlight unit according to claim 1, wherein the discrete light source section has an LED.

7. The backlight unit according to claim 6, wherein the LED is a dual in-line package type.

8. The backlight unit according to claim 1, wherein the discrete light source section is covered with a heat conduction reflection member, wherein the heat conduction reflection member is made of a material having a high heat conductivity to conduct heat to the heat conduction section and reflect and guide emitted light to the light guide section in which an emission side of the light is opened.

9. The backlight unit according to claim 8, wherein the heat conduction reflection member has a light reflecting section on an inner wall surface covering the discrete light source section.

10. A liquid crystal display device comprising:
    a backlight unit provided with a discrete light source section configured to have individual light sources having different spectra or different light emission quantities, a light guide section configured to have one end surface provided with an incident plane which receives a light emitted from the discrete light source section, a light guiding area which guides the light having entered from the incident plane, and a light emission plane which emits the light guided in the light guiding area, a heat conduction section configured to conduct heat generated in the discrete light source section, and a heat dissipation section disposed on a back side of the light emission plane and configured to dissipate heat conducted through the heat conduction section;
    a liquid crystal display panel disposed on a light emission plane side of the light guide plate; and
    an accommodating section configured to accommodate the backlight unit and the liquid crystal display panel which is made of a high heat radiating material to thermally contact with the backlight unit to dissipate heat generated in the discrete light source section; wherein
    the heat conduction section has a substantially L-shaped heat conduction member which is bent along the light guide section and is substantially L-shaped in cross section.

11. The liquid crystal display device according to claim 10, wherein the accommodating section is thermally contacted with a protecting section configured to protect the light guide section, which is disposed between the light guide section and the heat dissipation section.

12. The liquid crystal display device according to claim 10, wherein the accommodating section is thermally contacted with the heat dissipation section.

13. The liquid crystal display device according to claim 11, wherein at least one of the protecting section or the heat dissipation section is screwed and fixed to the accommodating section.

14. The liquid crystal display device according to claim 10, wherein the backlight unit has a diffusing section between the light guide section and the liquid crystal display panel, and an area of the light emission plane of the light guide section is smaller than an area of a display area of the liquid crystal display panel or an area of the diffusing section.

15. The liquid crystal display device according to claim 14, wherein a length of the incident plane of the light guide section and a plane facing the incident plane is shorter than a length of the display area of the liquid crystal display panel or a length of the diffusing section measured in a same direction.

16. The liquid crystal display device according to claim 14, wherein the backlight unit has a frame shaped member between the light guide section and the diffusing section, in which an opening area on the light guide section side is narrower than an opening area on the diffusing section side.

17. A backlight unit comprising:
a discrete light source section configured to have individual light sources having different spectra or different light emission quantities;
a light guide section configured to have one end surface provided with an incident plane which receives a light emitted from the discrete light source section, a light guiding area which guides the light having entered from the incident plane, and a light emission plane which emits the light guided in the light guiding area;
a heat conduction section configured to conduct heat generated in the discrete light source section; and
a heat insulating section configured to have a contact surface which covers and thermally contacts with a portion of an outer surface of the heat conduction section and to insulate heat as a temperature of the heat conduction section substantially uniformly.

18. The backlight unit according to claim 17, wherein the heat conduction section has a heat dissipation surface which dissipates heat.

19. The backlight unit according to claim 18, wherein a surface treatment is applied to the heat dissipation surface in order to increase infrared emissivity.

20. The backlight unit according to claim 19, wherein the surface treatment includes an anodized surface.

21. The backlight unit according to claim 19, wherein the surface treatment includes a coated surface.

22. The backlight unit according to claim 18, wherein a thermal resistance of the heat insulating section from the contact surface to the back side of the contact surface is higher than a thermal resistance of the heat conduction section from an inflow portion of the heat to the heat dissipation surface.

23. The backlight unit according to claim 22, wherein a thermal resistance of the heat insulating section is higher than a thermal resistance of the heat conduction section in a plane in parallel with the contact surface.

24. The backlight unit according to claim 17, wherein the heat insulating section is made of a plastic or resin.

25. The backlight unit according to claim 18, wherein the light guide section further has the incident plane on an opposing surface of the one end surface, and the discrete light source section is disposed on the one end surface side and on the opposing surface side.

26. The backlight unit according to claim 25, wherein a total electric power input to the discrete light source section disposed on the one end surface side is varied from a total electric power inputted to the discrete light source section disposed on the opposing surface side.

27. The backlight unit according to claim 25, wherein electric power supplied to each of the individual light sources having different spectra or different light emission quantities in the discrete light source section is varied between the discrete light source section disposed on the one end surface side and the discrete light source section disposed on the opposing surface side.

28. The backlight unit according to claim 25, further comprising a holding section disposed on the back side of the light emission plane and configured to hold the heat conduction section in a predetermined space.

29. The backlight unit according to claim 28, wherein the holding section is thermally contacted with the heat conduction section.

30. The backlight unit according to claim 28, wherein the holding section has the heat dissipation surface on the opposite side of a plane facing the back side of the light guide section.

31. The backlight unit according to claim 18, further comprising a heat dissipation section disposed on the back side of the light emission plane and configured to dissipate the heat conducted through the heat conduction section.

32. The backlight unit according to claim 25, further comprising a heat dissipation section disposed on the back side of the light emission plane and configured to dissipate the heat conducted through the heat conduction section, wherein the heat dissipation section extends to near the discrete light source sections disposed on the one end surface side and on the opposing surface side.

33. The backlight unit according to claim 31, wherein at least a portion of an outer surface of the heat dissipation section includes the heat dissipation surface.

34. The backlight unit according to claim 31, wherein the heat dissipation section includes a heatsink.

35. The backlight unit according to claim 34, wherein at least a portion of an outer surface of the heatsink includes the heat dissipation surface.

36. The backlight unit according to claim 18, wherein the heat conduction section has a substantially L-shaped heat conduction member which is formed in an L shape in planes substantially perpendicular to each of the light emission plane and the contact surface.

37. The backlight unit according to claim 36, wherein the substantially L-shaped heat conduction member includes the heat dissipation surface on the opposite side of a plane facing the back side of the light emission plane.

38. The backlight unit according to claim 18, wherein the heat conduction section has an inclusion type heat conduction member which sandwiches and includes the heat insulating section.

39. The backlight unit according to claim 38, wherein the inclusion type heat conduction member includes the heat dissipation surface in a plane substantially in parallel with the contact surface.

40. The backlight unit according to claim 25, wherein the heat conduction section has an integral, substantially U-shaped heat conduction member to conduct the heat generated on the discrete light source sections disposed on the one end surface side and on the opposing surface side and having a substantially U-shaped configuration in planes substantially perpendicular to each of the light emission plane and the contact surfaces.

41. The backlight unit according to claim 40, wherein the substantially U-shaped heat conduction member includes the heat dissipation surface on the opposite side of a plane facing the back side of the light emission plane.

42. The backlight unit according to claim 18, wherein the heat conduction section has a substantially L-shaped light source fixing member which has a substantially L-shaped configuration in planes substantially perpendicular to each of the light emission plane and the contact surface and fixes the discrete light source section.

43. The backlight unit according to claim 42, wherein the substantially L-shaped light source fixing member includes the heat dissipation surface on the opposite side of a plane facing the back side of the light emission plane.

44. The backlight unit according to claim 25, wherein the heat conduction section has a substantially U-shaped light source fixing member which has a substantially U-shaped configuration in planes substantially perpendicular to each of the light emission plane and the contact surfaces, wherein the substantially U-shaped light source fixing member fixes the discrete light source sections disposed on the one end surface side and on the opposing surface side.

45. The backlight unit according to claim 44, wherein the substantially U-shaped light source fixing member includes the heat dissipation surface on the opposite side of a plane facing the back side of the light emission plane.

46. The backlight unit according to claim 18, wherein the heat dissipation surface includes:
   a circuit board fixing portion which thermally contacts and fixes a circuit board mounted to a predetermined electric circuit; and
   a protection cover fixing portion which thermally contacts the heat conduction section at a position different from the circuit board fixing portion and fixes a protection cover of the circuit board.

47. The backlight unit according to claim 46, wherein at least a portion of front and back sides of the protection cover includes the heat dissipation surface.

48. The backlight unit according to claim 17, wherein the equation:

$$Lm/(t1+t2) \leqq 300$$

is maintained, and a thickness of the heat conduction section is t1, a thickness of the light source fixing member fixing the discrete light source section is t2, and a length of the light source fixing member in a direction of arranging the individual light sources is Lm (where t1, t2, and Lm are in the same units).

49. A liquid crystal display device comprising:
   a liquid crystal display panel provided with a pair of substrates disposed facing each other, and liquid crystals sealed between the pair of the substrates; and
   the backlight unit according to claim 17 disposed on the back side of the liquid crystal display panel.

* * * * *